(12) United States Patent
Gosain

(10) Patent No.: US 10,378,204 B2
(45) Date of Patent: Aug. 13, 2019

(54) SYSTEM FOR FORMING AN INSULATED STRUCTURAL CONCRETE WALL

(71) Applicant: AMBE ENGINEERING PTY LTD, Gungahlin (AU)

(72) Inventor: Sanjiv Gosain, Gungahlin (AU)

(73) Assignee: AMBE ENGINEERING PTY LTD, Gungahlin (AU)

( * ) Notice: Subject to any disclaimer, the term of this patent is extended or adjusted under 35 U.S.C. 154(b) by 0 days.

(21) Appl. No.: 15/561,951

(22) PCT Filed: Mar. 29, 2016

(86) PCT No.: PCT/AU2016/050234
§ 371 (c)(1),
(2) Date: Sep. 26, 2017

(87) PCT Pub. No.: WO2016/154670
PCT Pub. Date: Oct. 6, 2016

(65) Prior Publication Data
US 2018/0119419 A1    May 3, 2018

(30) Foreign Application Priority Data

Mar. 27, 2015   (AU) ................................ 2015901106

(51) Int. Cl.
*E04B 2/00* (2006.01)
*E04B 2/86* (2006.01)
*E04G 17/06* (2006.01)

(52) U.S. Cl.
CPC ...... *E04B 2/8652* (2013.01); *E04B 2002/867* (2013.01); *E04B 2002/8682* (2013.01); *E04G 2017/0646* (2013.01)

(58) Field of Classification Search
CPC ........ E04B 2/8647; E04B 2/86; E04B 2/8652; E04B 2002/867; E04B 2/8617; E04B 2/8641; E04G 17/0758; E04G 17/14
See application file for complete search history.

(56) References Cited

U.S. PATENT DOCUMENTS

| 3,959,940 A | 6/1976 | Ramberg | |
| 4,234,156 A * | 11/1980 | Wepf | E04C 5/168 249/214 |
| 4,433,520 A * | 2/1984 | Maschhoff | E04B 2/32 52/275 |

(Continued)

FOREIGN PATENT DOCUMENTS

GB          781052        8/1957

OTHER PUBLICATIONS

Australian Patent Office, International Search Report and Written Opinion, dated May 23, 2016, 14 pages, Australia.

*Primary Examiner* — Gisele D Ford
(74) *Attorney, Agent, or Firm* — Haynes and Boone, LLP

(57) ABSTRACT

Disclosed herein is a system 100 for constructing an insulated thermal mass concrete structure comprising four or more walls 100*a*, 100*b*, 100*c*, 100*d*. The system 100 comprises interconnected frame members 30, 30', 30", 30''', 30*, cross-ties 40 and corner members 33, 33', which reduces the need for props or stays to support the walls 100*a*, 100*b*, 100*c*, 100*d* during curing of a concrete core poured between inner and outer layers, 20, 21, 22, 23, 25 attached to the frame members 30, 30', 30", 30''', 30*.

20 Claims, 48 Drawing Sheets

(56) References Cited

U.S. PATENT DOCUMENTS

| | | | | |
|---|---|---|---|---|
| 4,866,891 A * | 9/1989 | Young | E04B 2/8641 | 52/105 |
| 4,889,310 A * | 12/1989 | Boeshart | E04B 2/8641 | 249/134 |
| 4,936,540 A * | 6/1990 | Boeshart | E04B 2/8647 | 249/216 |
| 5,497,592 A * | 3/1996 | Boeshart | E04B 2/8647 | 249/43 |
| 5,658,483 A * | 8/1997 | Boeshart | E04B 2/8652 | 249/191 |
| 5,852,907 A * | 12/1998 | Tobin | E04B 2/8652 | 52/714 |
| 5,890,337 A * | 4/1999 | Boeshart | E04B 2/8652 | 249/191 |
| 5,896,714 A * | 4/1999 | Cymbala | E04B 2/8617 | 52/426 |
| 5,956,922 A * | 9/1999 | Liuska | E04G 11/065 | 249/216 |
| 5,992,114 A * | 11/1999 | Zelinsky | E04B 2/8652 | 249/216 |
| 6,293,067 B1 * | 9/2001 | Meendering | E04B 2/8652 | 52/426 |
| 6,308,484 B1 * | 10/2001 | Severino | E04B 2/8652 | 249/216 |
| 6,349,520 B2 * | 2/2002 | Kubica | E04G 11/10 | 52/425 |
| 6,698,710 B1 | 3/2004 | Vanderwerf | | |
| 7,415,804 B2 * | 8/2008 | Coombs | E04B 2/8617 | 52/309.2 |
| 8,800,227 B2 * | 8/2014 | LeBlang | E04B 1/165 | 52/309.11 |
| 2003/0029106 A1 * | 2/2003 | Cooper | E04B 2/8617 | 52/309.11 |
| 2003/0213198 A1 * | 11/2003 | Bentley | E04B 2/8617 | 52/415 |
| 2004/0055237 A1 * | 3/2004 | Bravinski | E04B 2/8647 | 52/426 |
| 2005/0028467 A1 * | 2/2005 | Bentley | E04B 2/8617 | 52/474 |
| 2005/0120659 A1 * | 6/2005 | Nickerson | E04B 2/44 | 52/506.01 |
| 2005/0204679 A1 * | 9/2005 | Pfeiffer | E04B 2/8635 | 52/602 |
| 2005/0223669 A1 * | 10/2005 | Cymbala | E04B 2/8635 | 52/426 |
| 2006/0151677 A1 * | 7/2006 | McIvor | E04B 2/8617 | 249/36 |
| 2007/0094973 A1 * | 5/2007 | Zhu | E04B 1/161 | 52/415 |
| 2007/0094974 A1 * | 5/2007 | Velickovic | E04B 2/8652 | 52/426 |
| 2007/0107341 A1 * | 5/2007 | Zhu | E04B 1/161 | 52/309.12 |
| 2007/0294970 A1 * | 12/2007 | Marshall | E02D 27/02 | 52/309.11 |
| 2008/0022619 A1 * | 1/2008 | Scherrer | E04B 2/8641 | 52/407.5 |
| 2008/0028709 A1 * | 2/2008 | Pontarolo | E04B 2/8647 | 52/426 |
| 2008/0155925 A1 * | 7/2008 | Pfeiffer | E04B 2/8617 | 52/426 |
| 2009/0013629 A1 * | 1/2009 | Boeshart | E04B 2/8617 | 52/426 |
| 2009/0107065 A1 * | 4/2009 | LeBlang | E04B 1/165 | 52/252 |
| 2009/0107074 A1 * | 4/2009 | Boeshart | E04B 2/8617 | 52/426 |
| 2009/0249725 A1 * | 10/2009 | McDonagh | E04G 11/085 | 52/378 |
| 2010/0058700 A1 * | 3/2010 | LeBlang | E04B 1/165 | 52/506.05 |
| 2010/0251651 A1 * | 10/2010 | Mahe | E04B 2/8652 | 52/426 |
| 2011/0057090 A1 | 3/2011 | Spude et al. | | |
| 2011/0131911 A1 * | 6/2011 | McDonagh | E04G 11/062 | 52/426 |
| 2011/0272556 A1 * | 11/2011 | Lin | E04B 2/8647 | 249/190 |
| 2011/0277410 A1 * | 11/2011 | Richardson | E04G 23/0218 | 52/426 |
| 2012/0186174 A1 * | 7/2012 | LeBlang | E04B 1/165 | 52/220.1 |
| 2013/0036688 A1 * | 2/2013 | Gosain | E04B 2/8641 | 52/220.1 |
| 2013/0074432 A1 * | 3/2013 | Ciuperca | E04B 1/21 | 52/309.4 |
| 2013/0074433 A1 * | 3/2013 | Ciuperca | E04B 1/355 | 52/426 |
| 2013/0326980 A1 * | 12/2013 | Hilliard, Sr. | E04B 2/8652 | 52/309.1 |
| 2014/0157704 A1 | 6/2014 | McDonagh | | |
| 2014/0260055 A1 * | 9/2014 | Pfeiffer | E04G 17/12 | 52/582.1 |
| 2015/0167295 A1 * | 6/2015 | Baader | E04B 2/8635 | 249/40 |
| 2015/0354234 A1 * | 12/2015 | Kang | E04B 2/8647 | 29/525.01 |
| 2017/0254072 A1 * | 9/2017 | Howorth | E04B 2/8641 | |

* cited by examiner

SYSTEM FOR FORMING AN INSULATED STRUCTURAL CONCRETE WALL

CROSS-REFERENCE TO RELATED APPLICATIONS

This application is a U.S. national stage patent application of International Patent Application No. PCT/AU2016/050234, filed on 29 Mar. 2016, which claims priority from Australian Provisional Patent Application No 2015901106 filed on 27 Mar. 2015, the content of each of which is incorporated herein by reference.

TECHNICAL FIELD

The present disclosure relates to a system for forming an insulated structural concrete wall. The system has been developed for use in walls in a variety of structures, such as commercial, residential, industrial, institutional and health care buildings, hotels, condominiums, and a variety of other building types, including basements, retaining walls, acoustic walls and multi story structures.

BACKGROUND

There are several problems in the global building construction industry, such as increasing environmental impact due to growing demand and production of energy, increases in cost of energy consumption, mandatory compliance to new and tougher building energy codes and legislation, increasing impact of climate change and natural disasters, including cyclones, tsunamis and bush fires, all of which are predicted to continue to grow into the future.

A significant source of energy consumption is in the heating and cooling of buildings and one way to combat the increasing cost and environmental impact of energy production is to make buildings more thermally efficient so that they use energy more efficiently.

Accordingly, buildings of the future need to be super strong to withstand the vagaries of nature and highly thermally energy efficient, whilst maintaining exceptional occupant comfort.

Conventional building technologies tend not to be energy efficient and not to comply to increasingly stringent energy codes and legislation.

Super insulation is an approach to building design and construction that dramatically reduces heat loss (and gain) by using much higher levels of insulation and air tightness than is conventional. Super insulation is one of the key elements of the passive house design approach.

A super insulated building is intended to reduce heating needs very significantly, and may be heated predominantly by intrinsic heat sources (waste heat generated by appliances and body heat of occupants) with only a very small amount of actively generated backup heat being required to maintain occupant comfort. In addition to requiring little or no actively generated heat to moderate the temperature of the building interior, a super insulated building also takes longer to cool in the event of an extended power failure during cold weather, for example after a severe ice storm disrupts electric transmission, because heat loss is much less than normal buildings, without compromising on thermal storage capacity.

The additional cost of super insulation is offset by a reduction in size and capital cost of heating and cooling systems required for a building, along with drastic reductions in ongoing heating and cooling energy consumption and costs.

The human body perceives temperature in several ways. Air temperature, air movement, and room surface temperatures all affect how we feel in a space. A super-insulated building shell addresses comfort by limiting the movement of air and increasing room surface temperatures at a given room air temperature. Meticulous efforts to increase insulation and reduce air leakage within the building envelope facilitate occupants feeling much more comfortable within the building and a reduction in energy usage/operating costs.

Heat losses through external walls account for more than 40% of the total heat losses in buildings. Therefore, improving thermal insulation of external walls is a highly effective way to save energy. In low-energy buildings, the entire building envelope can be super insulated. The building envelope consists of all the building elements that separate the building interior from the exterior environment. A major purpose of superinsulation is to provide a comfortable indoor climate, irrespective of the outdoor climate which is affected by the weather. However, restricting heat flow in any building, irrespective of the climate, can improve its energy efficiency. In summary, quality super insulation can facilitate affordable energy savings.

For the past century, reinforced concrete has been the preferred choice for constructing buildings because of its very high structural strength, which results in solid, strong and durable building structures that are better suited to withstand severe cyclonic weather conditions and have superior ability to withstand hush fires and other natural disasters. However, people often perceive concrete to be a cold unfriendly material, and concrete buildings to be uncomfortable to live in because they get very cold in the winter and very hot in the summer. Accordingly, people perceive concrete buildings to be expensive to heat and cool.

One way to improve the energy efficiency and comfort levels of a concrete building is to super insulate its concrete walls, which dramatically improves the thermal performance of the building and makes it highly energy efficient by reducing energy consumption required for heating and cooling.

Passive House standards typically require sufficient insulation to achieve a U-Value of 0.11 W/(m$^2$K) or an equivalent R-Value of R 9.

Currently available concrete wall systems are not able to meet the Passive House standards because they are unable to achieve the required insulation thickness. Moreover, poor design of currently available concrete wall systems creates thermal bridges, which disadvantageously allow heat energy to bypass the insulation and pass through the wall, again preventing compliance with Passive House standards. Thermal bridges can also cause condensation, which can lead to mold growth and moisture damage. Elimination of thermal bridges is therefore critical to maintaining building air quality and durability, as well as to achieving the necessary levels of super insulation required for Passive House compliance.

There are very few modular systems available for forming of super insulated structural concrete walls. Accordingly, builders tend to form super insulated structural concrete walls using conventional poured in place methods with removable formwork, which is subsequently stripped to allow insulation to be installed, or with stay in place insulated concrete form systems commonly known as ICFs. Both these options have severe technical and commercial drawbacks and are very labour intensive and expensive.

In conventional poured-in-place construction with removable formwork, a crew erects spaced apart inner and outer forms of plywood, steel, or aluminum that define a cavity therebetween for receiving wet concrete. After placing rebar in the cavity to reinforce the wall, the crew pours concrete inside the cavity. Once the concrete hardens, the crew strips the forms to leave the reinforced concrete walls. Insulation is then mechanically attached to the walls as a secondary operation by using construction anchors, which is a very time consuming and labour intensive process. The installation of insulation is also prone to defects, such as gaps and thermal bridging, which limit the overall insulation performance of the wall. Some systems use plastic anchors to secure the insulation to the concrete wall, but none of the commercially available plastic anchors are long enough or structurally strong enough to secure insulation of the thickness required to meet Passive House standards. Another disadvantage with conventional systems is that there is no provision for attaching external cladding to the insulation. Accordingly, builders have to install timer batons on the exterior of the insulation and affix the batons using long metal screws extending through the insulation and into the concrete core. These screws act as thermal bridges, which result in the disadvantages mentioned above.

Known ICFs are made of foam insulation and, unlike removable forms, are designed to stay in place as a permanent part of the wall assembly. ICFs typically comprise expanded polystyrene foam sheets with a thickness of about 50 mm (2 inches). The ICF sheets on each side of the forming cavity are held together by plastic or metal ties and are stacked and interlocked one on top of the other, almost like children's building blocks. The internal and external ICF layers therefore provide a total insulation thickness of only 100 mm (4 inches), providing a total R-Value of only R3, which is well below the insulation thickness of 350 mm (14 inches) required to provide an R-Value of R9 to meet Passive House standards. The use of metal ties also introduces thermal bridges, which result in the disadvantages mentioned above. Another disadvantage of ICFs is that it is not possible to leave the interior side of the concrete core free of insulation, which can provide enhanced thermal performance in certain circumstances, and which facilitates installing fiber cement, magnesium oxide, calcium silicate or other dry wall material sheets on the interior side of the concrete core. Another drawback with ICFs is that they use shape moulded expanded polystyrene beads, which have very poor thermal, fire and structural ratings and do not meet the high performance criteria for buildings of the future. The shape moulding process does not allow the use of different types of high performance sheet based insulation materials, such as extruded polystyrene, polyurethane, polyisocyanurate (PIR) or phenolic insulation materials. Another drawback is the presence of a large number of joints, both horizontal and vertical, in the insulation, which result in leakage of air and thermal energy and reduce the overall insulation value of the building, as well as allowing water and moisture ingress. Another drawback is that it is difficult to build corners in any desired angles with ICFs, and builders often have to resort to manual forming to build corners, which is both time consuming and expensive. Another drawback with ICFs is that they are not strong enough for the attachment of heavy weight external cladding such as bricks, stone, fiber cement or similar heavy weight materials, and do not have any structural system which can transfer the weight of the heavy exterior cladding to the concrete core without forming a thermal bridge. Some known ICFs have plastic webs for the attachment of external cladding using screws. However, the webs do not have enough screw pull out resistance to handle negative wind pressure in high winds and cyclone conditions, and the screws also loosen over time, which leads to sagging of the external cladding. Another drawback with known ICFs is that they are not suitable for extended fire rating situations and cannot be used in egress paths or other high risk areas of buildings. Another problem with known ICFs is water seeping through exterior stucco or render finishes and remaining embedded in the external insulation layer for extended periods of time, causing long term condensation and mould growth problems. Another drawback with many known ICFs is that they require external covering and finishing on site, which is very labour intensive and expensive. Another drawback with many known ICFs is that the internal and external insulation layers are installed prior to the installation of steel reinforcement for the concrete core, which makes it virtually impossible to tie the vertical reinforcement to the starter bars, which can seriously compromise the structural integrity of the wall, and to check and inspect the reinforcement prior to pouring the concrete core. Another drawback with known ICFs is that concrete footings for the wall need to be manually formed, which in not only very labour intensive and expensive but also makes it very difficult to level the wall with the footings. Moreover, providing adequate structural connection between known ICF walls and their footings can be very difficult and time consuming.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

In a first aspect, there is provided a frame member for interconnecting an outer insulation layer and an inner layer in an insulated structural concrete wall in which the outer and inner layers and the frame member extend substantially the full height of the wall, said frame member comprising:

an elongate outer member defining a longitudinal axis and adapted to have the outer insulation layer connected thereto;

an elongate inner member substantially parallel to the outer member and adapted to have the inner layer connected thereto;

a plurality of tie members each having a first end for connection to the inner member and a second end for connection to the outer member, the tie members extending in a transverse direction between the outer and inner members at longitudinally spaced apart locations to interlock the outer and inner members together in a spaced apart, substantially parallel relationship, wherein at least one opening is defined between the tie members and the outer and inner members, the at least one opening being sized to permit flow therethrough of uncured concrete poured between the outer and inner layers to form a concrete core;

at least one outer anchor associated with the outer member for securing the outer layer relative to the outer member;

at least one inner anchor associated with the inner member for securing the inner layer relative to the inner member substantially parallel to the outer layer;

wherein the at least one outer anchor is configured to facilitate connection of outer thermally insulating layers of various thicknesses, including thicknesses of at least 300 mm (12 inches), to the outer member to permit tailoring of insulation performance to site requirements.

The at least one outer anchor may be adjustable in the transverse direction to facilitate the connection of outer thermally insulating layers of various thicknesses. The at least one outer anchor may comprise a longitudinally extending outer flange that is connectable to the outer member and that defines an anchor surface extending substantially perpendicular to a plane defined by the tie members for engaging the outer layer. Projections may extend from the outer flange to space the flange from the outer layer to facilitate air circulating between the outer layer and the outer flange. The outer flange may comprise a structural spine, which may be formed from metal, and a thermally insulative capping, which may be formed from a plastics material, extending over the spine. Alternatively, the at least one outer anchor may comprise a plurality of longitudinally spaced apart anchor heads that are connectable to the outer member and that each define an anchor surface extending substantially perpendicular to a plane defined by the tie members for engaging the outer layer. The anchor heads may comprise a textured outer surface to facilitate the application of exterior finishes, such as render or stucco, on the outer layer. A plurality of longitudinally spaced apart connectors, such as pins or bolts, oriented in the transverse direction may connect the outer flange or anchor heads to the outer member. The connectors may be adjustable in the transverse direction, for example by being threadedly connected relative to the tie members. The connectors may be thermally insulative and may, for example, comprise a structural core, which may be formed from metal, and a thermally insulative sheath, which may be formed from a plastics material. A plurality of longitudinally spaced apart brick ties may be connectable to the outer anchor to facilitate the attachment of exterior brick cladding over the outer layer.

In another embodiment, the at least one outer anchor may comprise a longitudinally extending outer flange that is fixed relative to the tie members and that defines an anchor surface extending substantially perpendicularly to a plane defined by the tie members and spaced at a predetermined distance in the transverse direction from the second ends thereof for engaging the outer layer. The outer member may comprise a longitudinally extending web extending between the second ends of the tie members and the outer flange of the outer anchor. The web may have a plurality of openings therethrough.

The outer member may comprise a longitudinally extending inner flange located at the second end of the tie members and oriented substantially perpendicular to a plane defined by the tie members for engaging an inner surface of the outer insulation layer.

A pin may be engageable in openings in the web of the outer member to facilitate securing a noggin to the web and/or to define a slot between the pin and the inner flange and/or the outer anchor.

The at least one inner anchor may configured in any one of the ways disclosed above with respect to the at least one outer anchor to facilitate connection of inner layers of various thicknesses to the inner member. Alternatively, the at least one inner anchor may comprise a longitudinally extending flange that is fixed relative to the tie members and that defines an anchor surface extending substantially perpendicularly to a plane defined by the tie members and spaced at a predetermined distance in the transverse direction from the first ends thereof for engaging an inner layer with a thickness less than that of the outer layer. The inner member may comprise a longitudinally extending web extending between the first ends of the tie members and the outer flange of the inner anchor. The web may have a plurality of openings therethrough.

The inner member may comprise a longitudinally extending inner flange located at the first end of the tie members and oriented substantially perpendicular to a plane defined by the tie members for engaging an inner surface of the inner layer.

A pin may be engageable in an openings in the web of the inner member to facilitate securing a noggin to the web and/or to define a slot between the pin and the inner flange and/or the inner anchor.

The tie members may comprise at least one locating formation for locating reinforcement for the concrete core. A plurality of the locating formations may be provided. The locating formations may be provided on both longitudinal sides of the tie members. Clips may be provided for securing the reinforcement in the locating formations. The clips may be formed as an integral part of the tie members and may snap-lockingly secure the reinforcement. The tie members may be removably connected to the inner and/or outer member. For example, the tie members may snap-lockingly engage the inner and outer members.

The frame member may be formed from a plurality of frame member modules connected together longitudinally. Coupling formations may be provided at longitudinal ends of the frame member modules to facilitate their interconnection. The coupling formations may provide for snap locking engagement between modules. The coupling formations may lock when properly engaged to prevent manual disconnection without a special tool, such as a screwdriver. The coupling formations may be configured to facilitate visual confirmation of proper coupling between modules.

In a second aspect, there is provided a frame member for interconnecting an outer insulation layer and an inner layer in an insulated structural concrete wall in which the outer and inner layers and the frame member extend substantially the full height of the wall, said frame member comprising:

an elongate outer member defining a longitudinal axis and adapted to have the outer insulation layer connected thereto:

an elongate inner member substantially parallel to the outer member and adapted to have the inner layer connected thereto;

a plurality of tie members each having a first end for connection to the inner member and a second end for connection to the outer member, the tie members extending in a transverse direction between the outer and inner members at longitudinally spaced apart locations to interlock the outer and inner members together in a spaced apart, substantially parallel relationship, wherein at least one opening is defined between the tie members and the outer and inner members, the at least one opening being sized to permit flow therethrough of uncured concrete poured between the outer and inner layers to form a concrete core;

at least one outer anchor associated with the outer member for securing the outer layer relative to the outer member;

at least one inner anchor associated with the inner member for securing the inner layer relative to the inner member substantially parallel to the outer layer;

wherein the at least one outer anchor is adjustable in the transverse direction to facilitate the connection of outer thermally insulating layers of various thicknesses to the outer member to permit tailoring of insulation performance to site requirements.

The frame member of the second aspect may further comprise any of the other features defined above with respect to the first aspect, apart from the feature of the at least one outer anchor comprising a longitudinally extending outer flange that is fixed relative to the tie members and that defines an anchor surface extending substantially perpendicularly to a plane defined by the tie members and spaced at a predetermined distance in the transverse direction from the second ends thereof for engaging the outer layer.

In a third aspect, there is provided a system for constructing an insulated concrete structure, the system comprising:

an outer layer;

an inner layer spaced apart from and substantially parallel to the outer layer; and a plurality of spaced apart frame members as defined in the first or second aspect above extending between the outer layer and the inner layer to interlock the outer and inner layers together and maintain a space therebetween for receiving uncured concrete to form a concrete core of a wall of the structure in which the outer layer, the inner layer and the frame members extend substantially the full height of the wall.

Cross ties may extend between the spaced apart frame members to secure the frame members together. At least some of the cross ties may be provided at different longitudinal positions to others of the cross ties. If the cross ties do not extend along a length of the wall, a plurality of partially overlapping cross ties may in combination extend along the full length of the wall. The cross ties may engage the tie members of the frame members. The cross ties may be substantially parallel with the inner and outer layers and may be provided at both the first and the second ends of the tie members. The cross ties may take the form of a comb or rack.

The outer layer may be a thermally insulating layer formed from a plurality of sheets that together extend along the full length of the wall. The outer layer may have a thickness of at least 300 mm (12 inches). The outer layer may comprise two or more layers of thermally insulating sheets. Joins between the sheets in each of the two or more layers may be staggered to inhibit air and heat energy leakage through the wall. Pre drilled holes may extend through the two or more sheets to facilitate installation of a said connector therethrough for connecting a transversely adjustable outer anchor to the outer member to secure the sheets to the inner member. Drainage channels may be provided in the outer layer to facilitate drainage of moisture that may penetrate into the outer layer.

An elongate corner securing member may be connected to an end of the outer layer of the wall to facilitate its secure connection to the end of the outer layer of an adjoining wall to form a corner therebetween. The corner securing member may comprise an outer corner securing element having a pair of elongate elements oriented relative to each other at a desired angle of the corner. The pair of elongate elements may be hingedly connected to one another to accommodate a range of desired corner angles. In some embodiments, at least one bracket may be connected to an inner side of one of the pair of elongate elements for engaging the end of the outer layer of the wall and at least one bracket may be connected to an inner side of the other of the pair of elongate elements for engaging the end of the outer layer of the adjoining wall. In other embodiments, the corner securing member may comprise an inner corner securing element spaced inwardly of the outer corner securing element, the inner corner securing element comprising pair of elongate elements oriented relative to each other at a desired angle of the corner, wherein the ends of the outer layers of the wall and an adjoining wall are is securable in the space between the inner and outer corner securing elements. The pair of elongate elements of the inner corner securing element may be hingedly connected to one another to accommodate a range of desired corner angles. The spacing between the inner and outer corner securing elements may be adjustable to facilitate securing corners in outer layers of various thicknesses. The cross ties of the adjoining walls may engage the corner securing member. The corner securing member may be formed from a plurality of corner securing member modules connected together longitudinally. Coupling formations may be provided at longitudinal ends of the corner securing member modules to facilitate their interconnection. The coupling formations may provide for snap locking engagement between modules. The coupling formations may lock when properly engaged to prevent manual disconnection without a special tool, such as a screwdriver. The coupling formations may be configured to facilitate visual confirmation of proper coupling between modules.

The inner layer may be an insulating layer for moderating transmission of heat energy from the concrete core.

A footing member may be connectable to a longitudinal end of the frame member to facilitate forming a concrete footing for the wall and to facilitate integrating the wall and footing, said footing member comprising:

an elongate outer member that extends parallel to the longitudinal axis when the footing member is connected to the frame member, the outer member of the footing member adapted to have an outer layer connected thereto;

an elongate inner member substantially parallel to the outer member and adapted to have an inner layer connected thereto;

a plurality of tie members each having a first end for connection to the inner member and a second end for connection to the outer member, the tie members extending in a transverse direction between the outer and inner members at longitudinally spaced apart locations to interlock the outer and inner members together in a spaced apart, substantially parallel relationship, wherein at least one opening is defined between the tie members and the outer and inner members, the at least one opening being sized to permit flow therethrough of uncured concrete poured between the outer and inner layers to form a concrete core of the footing;

at least one outer anchor associated with the outer member for securing the outer layer relative to the outer member; and at least one inner anchor associated with the inner member for securing the inner layer relative to the inner member substantially parallel to the outer layer.

The tie members of the footing member may comprise at least one locating formation for locating reinforcement for the concrete core of the footing. A plurality of the locating formations may be provided. The locating formations may be provided on both longitudinal sides of the tie members. Clips may be provided for securing the reinforcement in the locating formations. The clips may be formed as an integral part of the tie members and may snap-lockingly secure the reinforcement. The tie members may be removably connected to the inner and/or outer member of the footing member. For example, the tie members may snap-lockingly engage the inner and outer members.

One or more coupling formations may be provided at a longitudinal end of the footing member to facilitate its interconnection with the frame member. The coupling formations may provide for snap locking engagement between the footing member and the frame member. The coupling formations may lock when properly engaged to prevent manual disconnection without a special tool, such as a screwdriver. The coupling formations may be configured to facilitate visual confirmation of proper coupling. The footing member may comprise a plurality of spaced apart coupling formations to engage with a plurality of corresponding coupling formations of the frame member. The footing member may comprise more coupling formations than the frame member to facilitate the frame member being connected to the footing member at a desired position on the footing member.

The footing member may be formed from a plurality of footing member modules connected together longitudinally. Coupling formations may be provided at longitudinal ends of the footing member modules to facilitate their interconnection. The coupling formations may provide for snap locking engagement between footing member modules. The coupling formations may lock when properly engaged to prevent manual disconnection of the footing member modules without a special tool, such as a screwdriver. The coupling formations may be configured to facilitate visual confirmation of proper coupling between footing member modules.

Cross ties and/or corner securing members similar to those disclosed above with respect to the frame member, may also be used with the footing member.

In a fourth aspect, there is provided a system for constructing a concrete structure, the system comprising:

at least four interconnected wall frames for at least four respective walls, each of the wall frames extending substantially the full height of the respective wall and comprising:
　a plurality of frame members spaced apart along the length of the respective wall, each of the frame members comprising:
　　an elongate outer member defining a longitudinal axis and adapted to have an outer layer connected thereto;
　　an elongate inner member substantially parallel to the outer member and adapted to have an inner layer connected thereto;
　　a plurality of tie members each having a first end for connection to the inner member and a second end for connection to the outer member, the tie members extending in a transverse direction between the outer and inner members at longitudinally spaced apart locations to interlock the outer and inner members together in a spaced apart, substantially parallel relationship, wherein at least one opening is defined between the tie members and the outer and inner members, the at least one opening being sized to permit flow therethrough of uncured concrete poured between the outer and inner layers to form a concrete core;
　　at least one outer anchor associated with the outer member for securing the outer layer relative to the outer member;
　　at least one inner anchor associated with the inner member for securing the inner layer relative to the inner member substantially parallel to the outer layer;
　cross ties extending between the spaced apart frame members to secure the frame members together;
　at least one corner securing member connecting the ends of adjoining said walls of the structure to form a corner therebetween and resist relative movement between the walls when the concrete core is poured.

Each wall may comprise an outer layer connected to the outer members of the frame members of that wall. Each wall may comprise an inner layer connected to the inner members of the frame members of that wall.

The frame members of at least one of the wall frames may be frame members as defined in the first or second aspect above. The frame members of at least one of the wall frames may be frame members having a fixed outer anchor. The frame members of at least one of the wall frames may be frame members having an adjustable outer anchor to configure the at least one wall frame for use with outer layers of different thicknesses.

The system may further comprise any of the other features defined above with respect to the first, second and third aspects.

BRIEF DESCRIPTION OF DRAWINGS

Embodiments will now be described, by way of example only, with reference to the accompanying drawings, in which.

DESCRIPTION OF EMBODIMENTS

Figure 1:
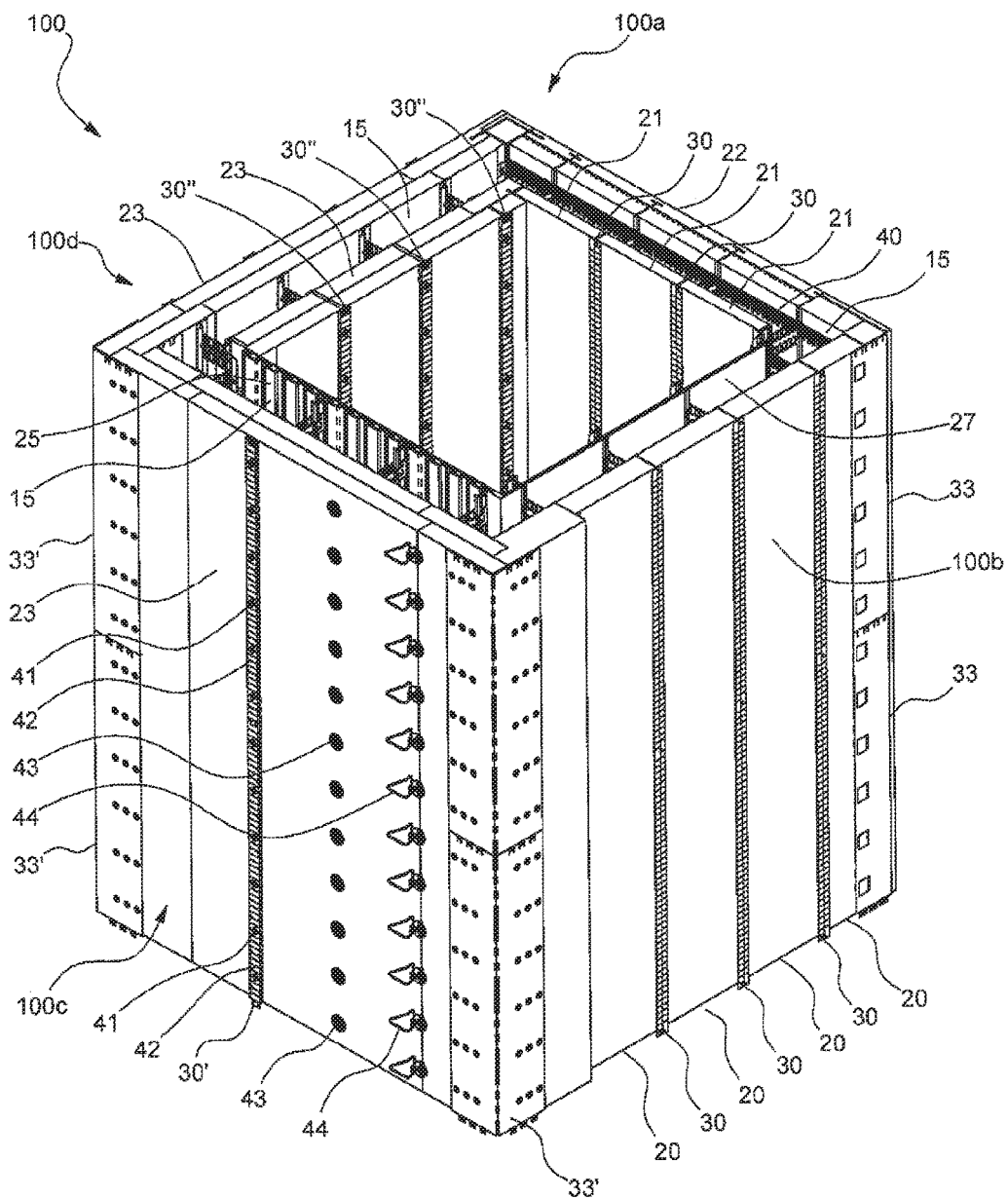
FIG. 1 is a perspective view of an embodiment of a system for forming a modular super insulated concrete structure.
Figure 2:
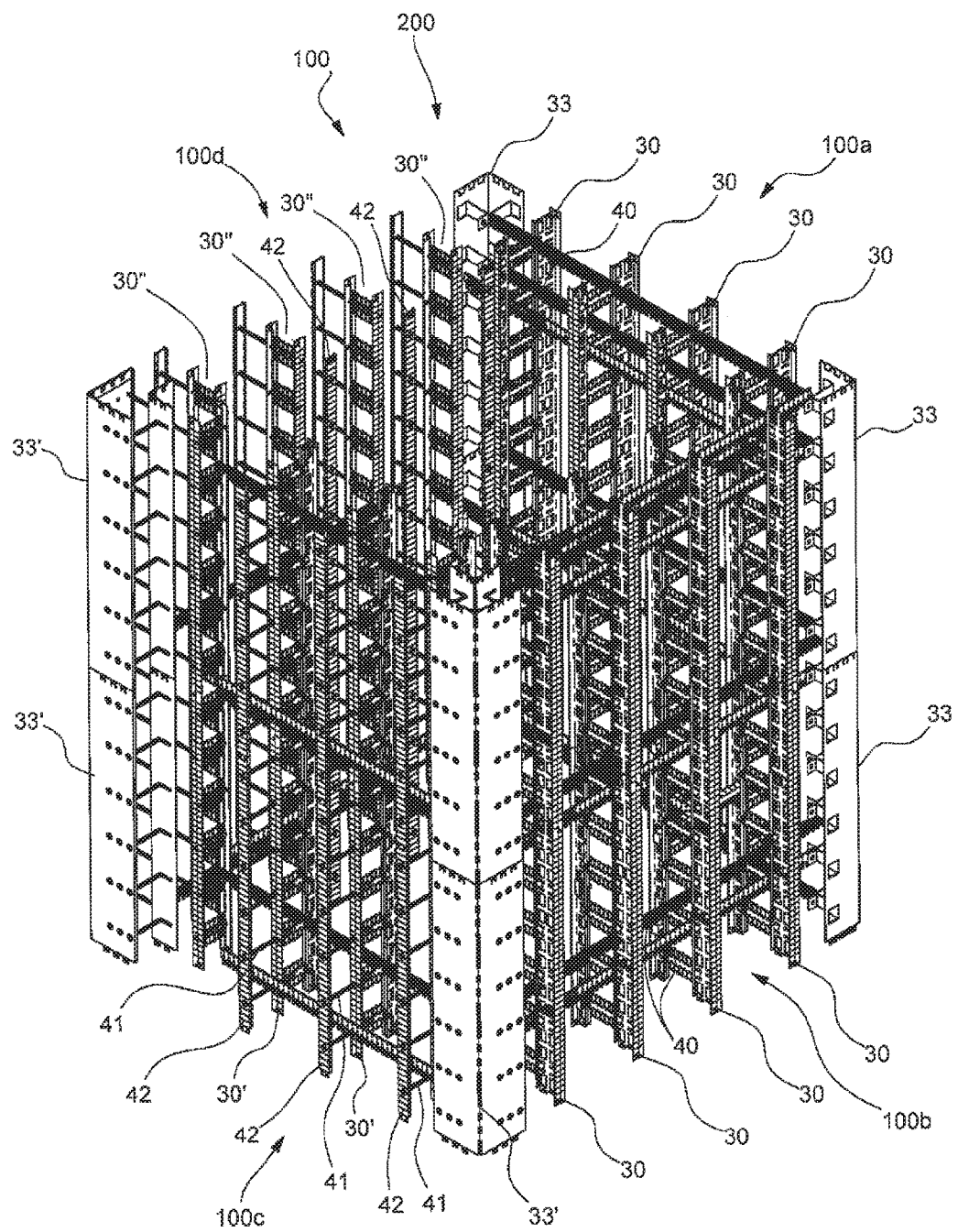
FIG. 2 is a perspective view of the system of FIG. 1, with the outer and interior insulation modules removed to show how the various system components can be mixed and matched and assembled together.

Referring to the drawings, and initially to FIGS. 1 and 2, there is shown a perspective view of a system 100 for forming a modular super insulated concrete structure comprising walls formed using different embodiments of frame members according to the present disclosure. Walls 100a-100d comprise either "fixed" frame member modules 30, "single variable" frame member modules 30' or "double variable" frame member modules 30", depending on the desired insulation performance of the wall, as will be discussed in more detail below. Lateral cross ties 40 extend between the frame member modules 30, 30', 30" of each wall to secure the frame member modules together. The corners between walls 100a-100d are secured by either "fixed" corner securing modules 33 or "variable" corner securing modules 33'. The system 100 also includes insulated composite bolts 41, insulated baton modules 42, render washers 43, brick ties 44, thick single layer insulation modules 20, thin single layer insulation modules 21, thick insulation render modules 22, extra thick multi-layer insulation modules 23, extruded drywall modules 25, removable form plate modules 27, removable form clips 46, removable form wedges 47 and footing modules 30'''. The various components of the system 100 can be mixed and matched to create a tailored insulated structural concrete structure.

Accordingly, the presently disclosed system 100 gives architects, engineers, builders and owners the freedom to mix and match components to construct a super insulated thermal mass concrete structure that best suits their design and site climatic conditions and increases the energy efficiency of the structure at an economical cost.

As shown in FIGS. 1, 2, 25 and 26, wall 100*a* comprises a thicker outer layer comprising insulation render modules 22 and a thinner inner layer comprising insulation modules 21 which are spaced apart from each other, interlocked and maintained substantially parallel by a plurality of laterally spaced apart fixed frame member modules 30. The frame member modules 30 are secured together by lateral cross ties 40, which are provided at various longitudinal positions in the wall 100*a*. If individual cross ties 40 do not extend the full length of the wall 100*a*, a plurality of partially cross ties 40 are overlapped and in combination extend along the full length of the wall. Uncured concrete is poured into the space 15 between the outer 22 and inner layers 21 to form a concrete core.

Figure 27:
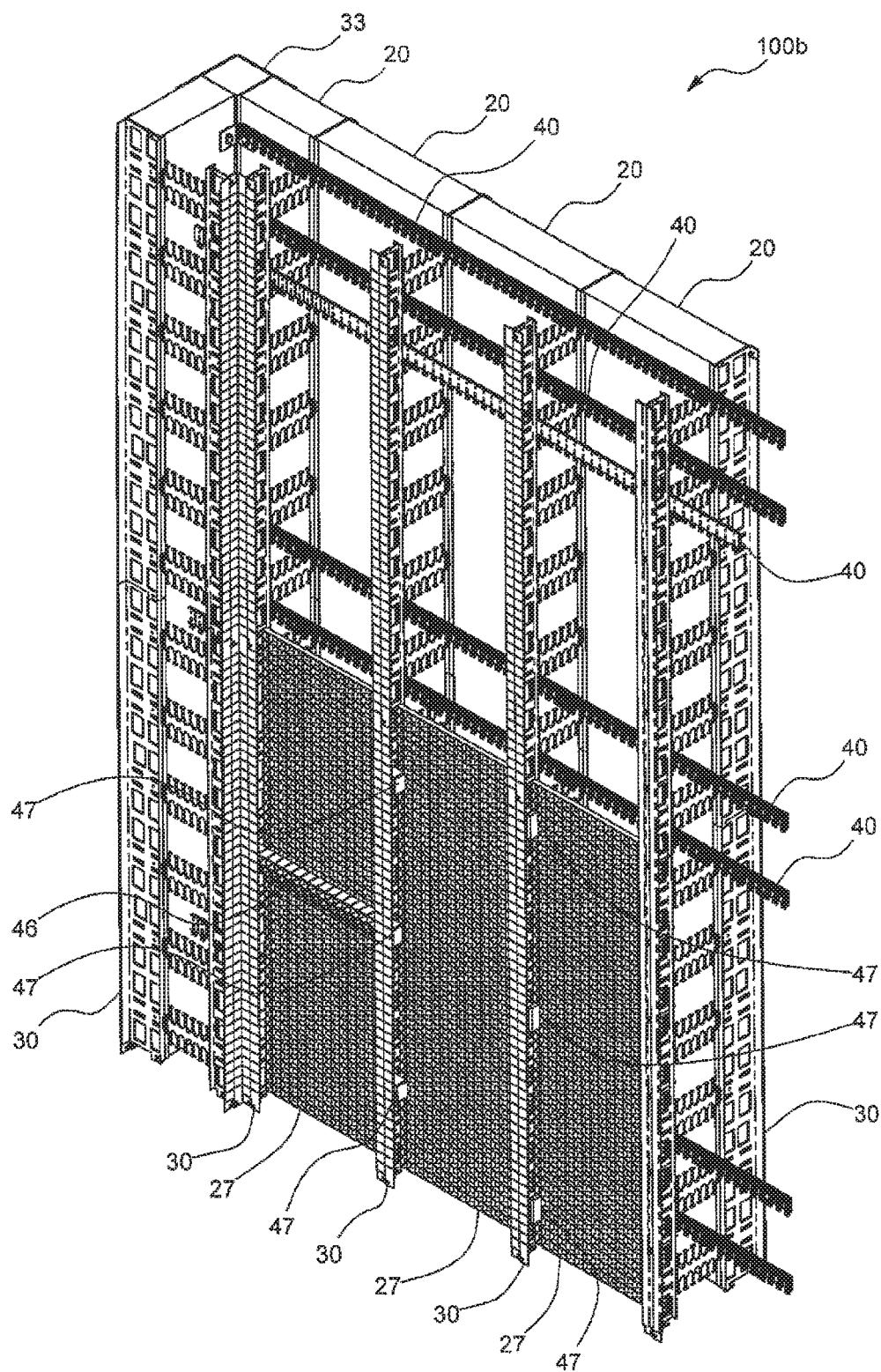
FIG. 27 is a perspective view of the modular wall frame assembly of FIG. 25 with a single outer layer of the thick insulation modules of FIG. 17 and an inner layer of the removable form plate modules of FIG. 22 held in place by the form clip modules of FIG. 23 and the form wedges of FIG. 24.

As shown in FIGS. 1, 2, 25 and 27, wall 100*b* comprises a thicker outer layer comprising insulation modules 20 and an inner layer comprising removable form plate modules 27 which are spaced apart from each other, interlocked and maintained substantially parallel by a plurality of laterally spaced apart fixed frame member modules 30. The frame member modules 30 are secured together by lateral cross ties 40, which are provided at various longitudinal positions in the wall 100*b*. If individual cross ties 40 do not extend the full length of the wall 100*b*, a plurality of partially cross ties 40 are overlapped and in combination extend along the full length of the wall. As shown in FIG. 27, removable form clips 46 and removable form wedges 47 secure the form plate modules 27 to the frame member modules 30. Uncured concrete is poured into the space 15 between the outer 20 and inner 27 layers to create a concrete core.

As shown in FIGS. 1, 2 and 28-30, wall 100*c* comprises a thicker outer layer comprising multi layer insulation modules 23 and an inner layer comprising extruded drywall modules 25 which are spaced apart from each other, interlocked and maintained substantially parallel by a plurality of laterally spaced apart single variable frame members modules 30'. The frame member modules 30' are secured together by lateral cross ties 40, which are provided at various longitudinal positions in the wall 100*c*. If individual cross ties 40 do not extend the full length of the wall 100*c*, a plurality of partially cross ties 40 are overlapped and in combination extend along the full length of the wall. Uncured concrete is poured into a space 15 between the outer 23 and inner 25 layers to form a concrete core.

Figure 31:
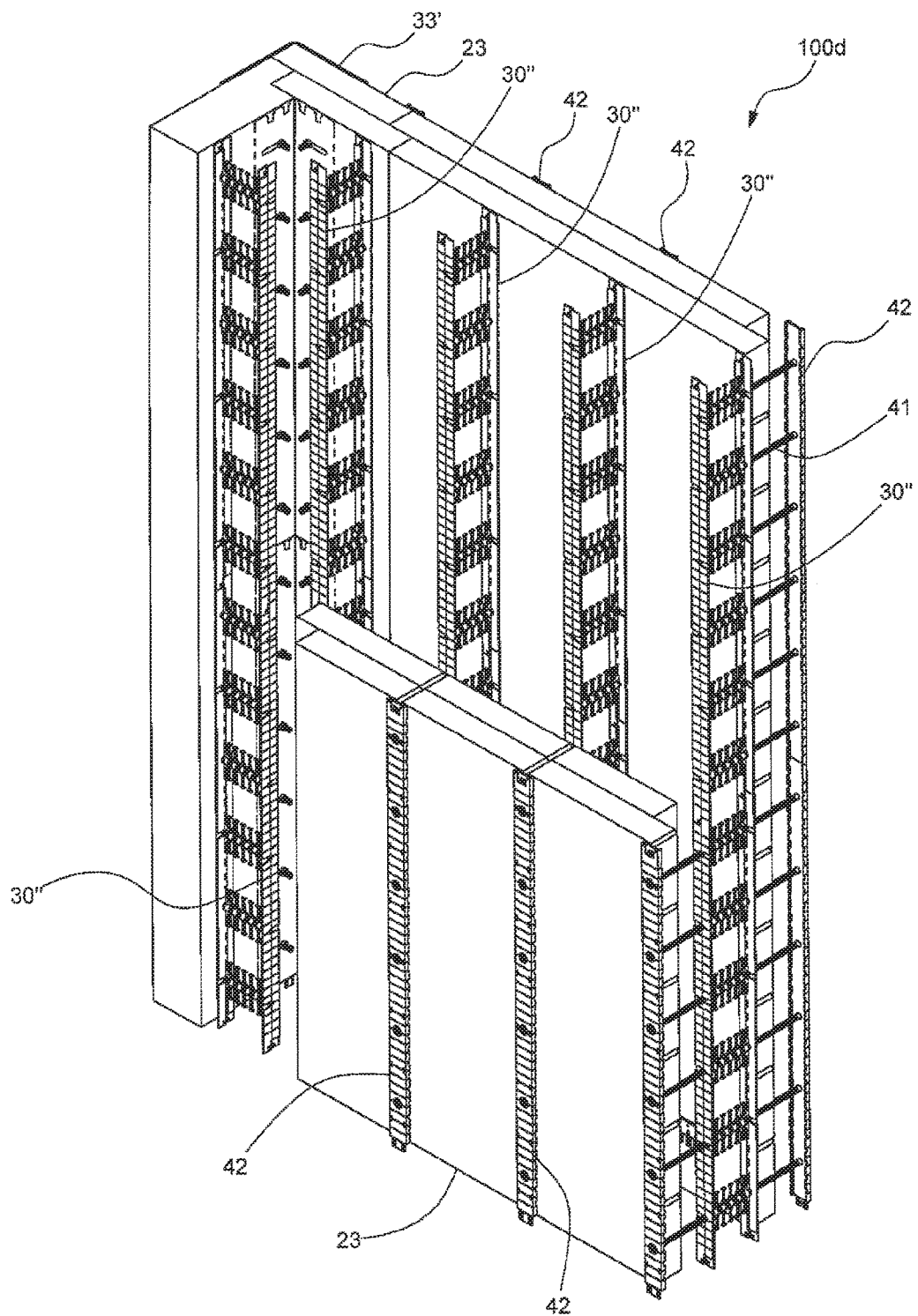
FIG. 31 is a perspective view of several double variable frame member modules of FIG. 5 supporting an outer layer of the thick insulation modules of FIG. 20.

As shown in FIGS. 1, 2 and 31, wall 100*d* comprises a thicker outer layer and a thicker inner layer, both comprising multi layer insulation modules 23, which are spaced apart from each other, interlocked and maintained substantially parallel by a plurality of laterally spaced apart double variable frame member modules 30". The frame member modules 30" are secured together by lateral cross ties 40, which are provided at various longitudinal positions in the wall 100*d*. If individual cross ties 40 do not extend the full length of the wall 100*d*, a plurality of partially cross ties 40 are overlapped and in combination extend along the full length of the wall. Uncured concrete is poured into a space 15 between the outer and inner layers 23 to form a concrete core.

As shown in FIGS. 1 and 2, corners between walls 100*a* and 100*b*, and walls 100*a* and 100*d* are secured with fixed corner securing modules 33, and corners between walls 100*b* and 100*c*, and walls 100*c* and 100*d* are secured with variable corner securing modules 33'. Features of the corner securing modules 33, 33' will be discussed in more detail below.

Figure 3:
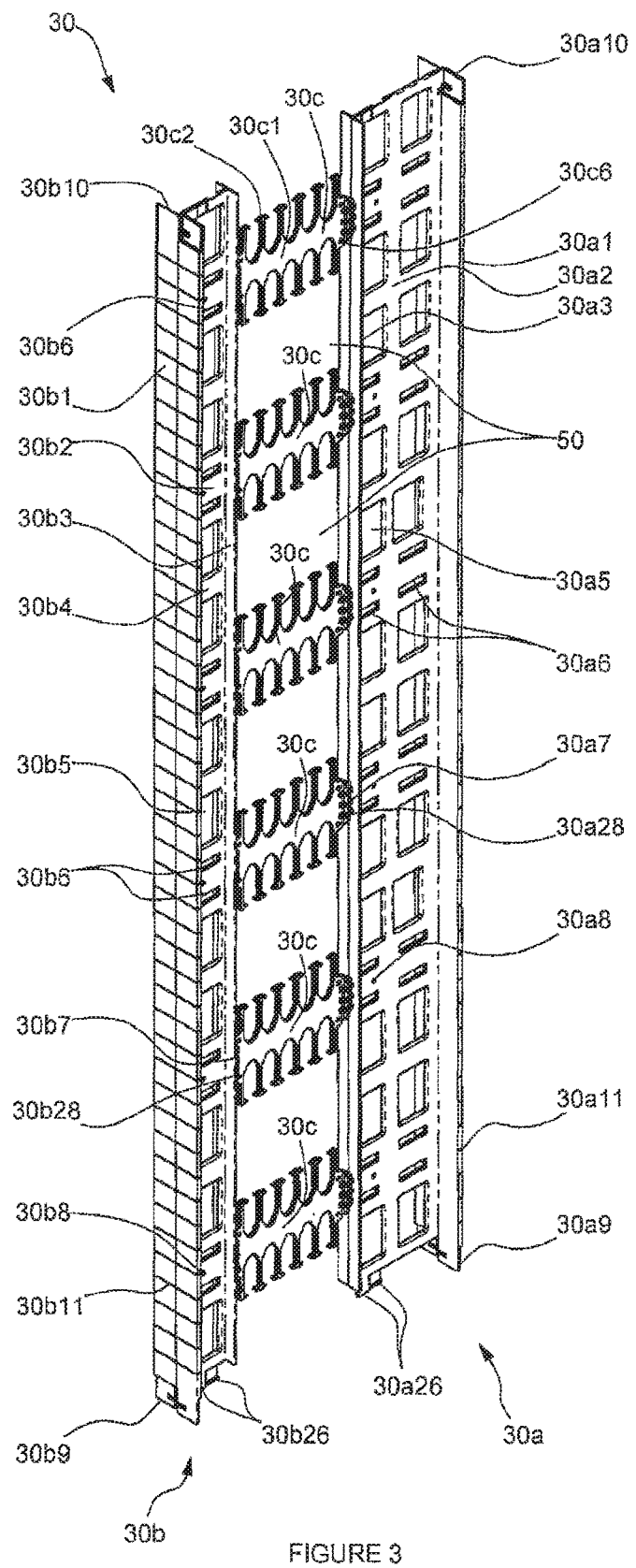
FIG. 3 is a perspective view of a fixed frame member module of the system of FIG. 1 for receiving a single thicker outer insulating layer and a single thinner inner insulating layer.
Figure 3A:
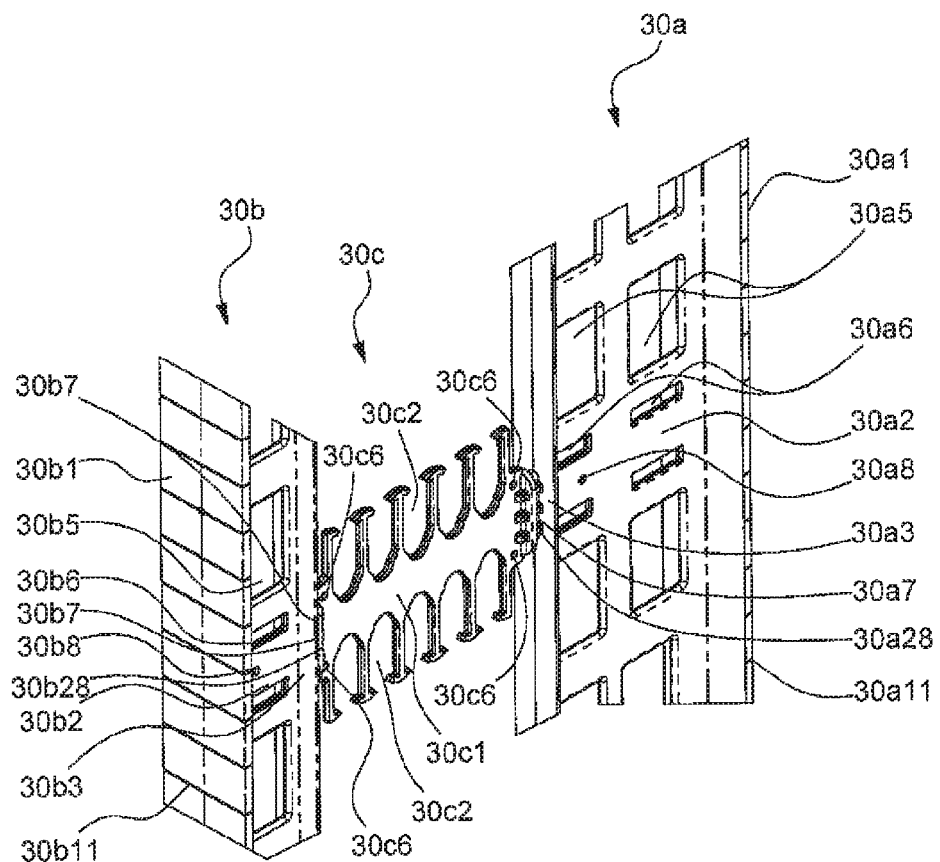
FIG. 3a is an enlarged perspective view of part of the frame member module of FIG. 3.

FIG. 3 shows fixed frame member modules 30 used in walls 100*a* and 100*b*. The frame member modules 30 comprise an elongate outer member 30*a* defining a longitudinal axis A and an elongate inner member 30*b* extending substantially parallel to the outer member 30*a*. A plurality of tie members 30*c* extend transversely between the outer and inner members 30*a*, 30*b* at longitudinally spaced apart locations to interlock the outer and inner members together in a spaced apart, substantially parallel relationship. Each of the tie members 30*c* has a first end for connection to the inner member 30*b* and a second end for connection to the outer member 30*b*. Openings 50 are defined between the tie members 30*c* and the outer and inner members 30*a*, 30*b*, the openings being sized to permit flow therethrough of uncured concrete poured between the outer and inner layers of walls 100*a*, 100*b*.

The outer and inner members 30*a*, 30*b* each comprise spaced apart outer 30*a*1, 30*b*1 and inner 30*a*3, 30*b*3 flanges interconnected by a web 30*a*2, 30*b*2. The length of the web 30*a*2 of the outer member 30*a* matches the thickness of insulation modules 20 and corresponds to a depth of the slots 22*a*1 in insulation render modules 22. The length of the web 30*b*2 of the inner member 30*b* matches the thickness of insulation modules 21. Large longitudinally oriented rectangular apertures 30*a*5, 30*b*5 and small transversely oriented rectangular apertures 30*a*6, 30*b*6 are provided in the webs 30*a*2, 30*b*2 at longitudinally spaced apart locations. A plurality of oval shaped stepped hubs 30*a*7, 30*b*7 extend inwardly from the flanges 30*a*3, 30*b*3 and are engageable by the associated end of the tie members 30*c*. The hubs 30*a*7, 30*b*7 also serve as engagement points for lateral cross ties 40 which extend between and interconnect the laterally spaced apart frame member modules 30 in walls 100*a*, 100*b*. The step in the hubs 30*a*7, 30*b*7 prevents the lateral cross ties 40 from sliding off the hubs onto the tie members 30*c*. Strengthening ribs 30*a*28, 30*b*28 are provided to strengthen the joints between tie members 30*c* and flanges 30*a*3, 30*b*3. A plurality of small circular holes 30*a*8, 30*b*8 are also provided in the webs 30*a*2, 30*b*2 to receive thermally insulated nails, screws or pins for engaging the ends of insulation modules 20 or insulation modules 22 secured to the outer member 30*a* or insulation modules 21 secured to the inner member 30*b*, respectively. The outer and inner members 30*a*, 30*b* are also provided with marking lines 30*a*11, 30*b*11 at regular intervals of 25 mm (1 inch) to facilitate easy and accurate trimming of the outer and inner members to a desired length.

Coupling formations, in the form of bottom 30*a*9, 30*b*9, 30*a*26, 30*b*26 and top 30*a*10, 30*b*10 connectors, are formed on opposite longitudinal ends of the outer flanges 30*a*1, 30*b*1 and webs 30*a*2, 30*b*2 to facilitate several frame member modules 30 being joined together to form a unitary frame member with a desired height. Whilst the features and functionality of the top and bottom connectors 30*a*9, 30*b*9, 30*a*10, 30*b*10, 30*a*26, 30*b*26 will be described with reference to FIGS. 3*d*-3*g*, which show only the connectors 30*b*9, 30*b*10, 30*b*26 associated with the inner member 30*b*, it is to be understood that the connectors 30*a*9, 30*a*10, 30*a*26 associated with the outer member 30*a* have corresponding features with corresponding functionality.

Bottom connector 30*b*9 has an outer flexible tab 30*b*11 and an inner flexible tab 30*b*12 that engage on either side of the web 30*b*2 of an adjoining frame member module 30. Lateral slots 30*b*13 and 30*b*14 are provided in tabs 30*b*11 and 30*b*12, respectively. Chamfered lips 30*b*15 and 30*b*16 are provided on tabs 30*b*1, 30*b*12, respectively, to facilitate the engagement of a small flat head screwdriver under the tabs 30*b*11, 30*b*12 for disengaging the top and bottom connectors 30*b*9, 30*b*10. Top connector 30*b*10 has an outer fixed tab 30*b*18 and an inner fixed tab 30*b*19 corresponding to and engageable by the inner and outer tabs 30*b*12, 30*b*11 of the bottom connector 30*b*9. Lateral locking ribs 30*b*20 and 30*b*21 are provided on tabs 30*b*18 and 30*b*19, respectively, to snap-lockingly engage the slots 30*b*13 and 30*b*14 of tabs 30*b*11 and 30*b*12. Tabs 30*b*18 and 30*b*19 are provided with chamfered outer edges 30*b*22 and 30*b*23, respectively, to facilitate the engagement of a small flat head screwdriver between tabs 30*b*1 and 30*b*19 and between tabs 30*b*12 and 30*b*18 for disengaging connectors 30*b*9, 30*b*10. A notch 30*b*24 is provided on an inner side of flange 30*b*1 adjacent tab 30*b*18 to facilitate engagement of a small flat head screwdriver with the chamfered lip 30*b*16 of tab 30*b*12 for disengaging connectors 30*b*9, 30*b*10. A similar notch 30*b*25 is provided on an outer side of flange 30*b*1 adjacent tab 30*b*19 to facilitate engagement of a small flat head screwdriver with the chamfered lip 30*b*15 of tab 30*b*11 for disengaging connectors 30*b*9, 30*b*10.

Bottom connector 30*b*26 comprises a pair of laterally offset projections 30*b*27 that extend longitudinally from the bottom end of the web 30*b*2 to engage with recesses 30*b*29 on either side of the top end of the web 30*b*2 of an adjoining frame member module 30.

Figure 3B:
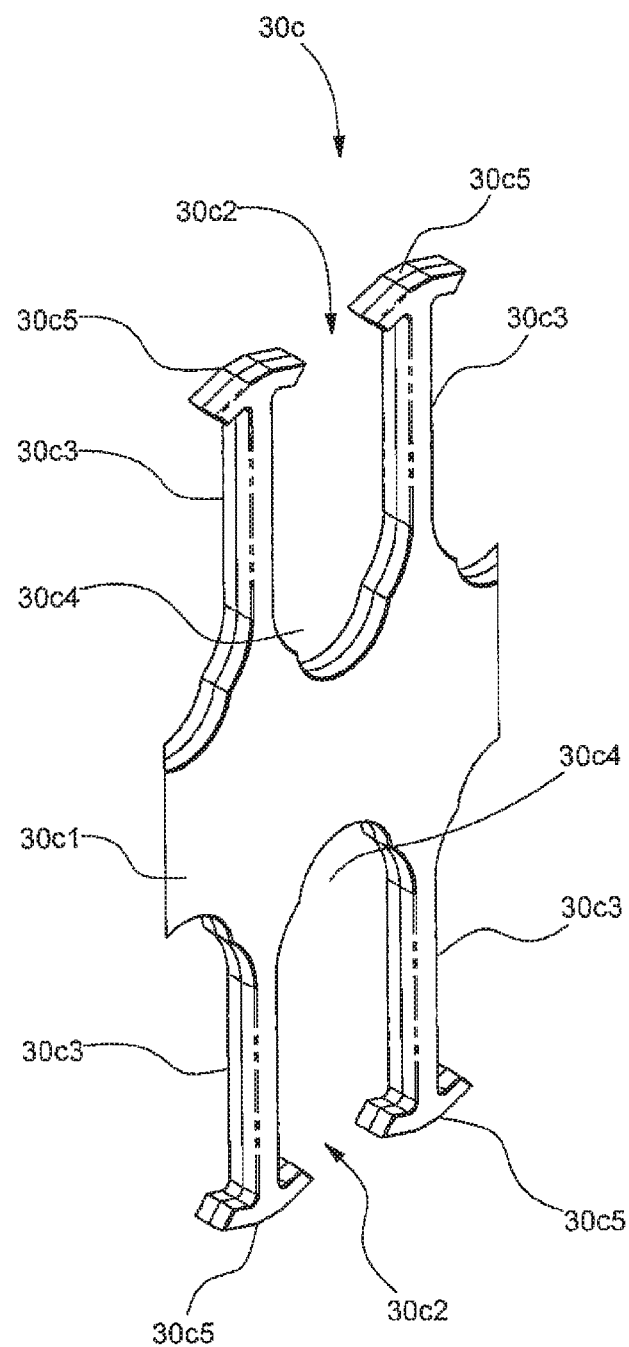
FIG. 3b is an enlarged perspective view of reinforcement clips of the frame member module of FIG. 3.
Figure 3C:
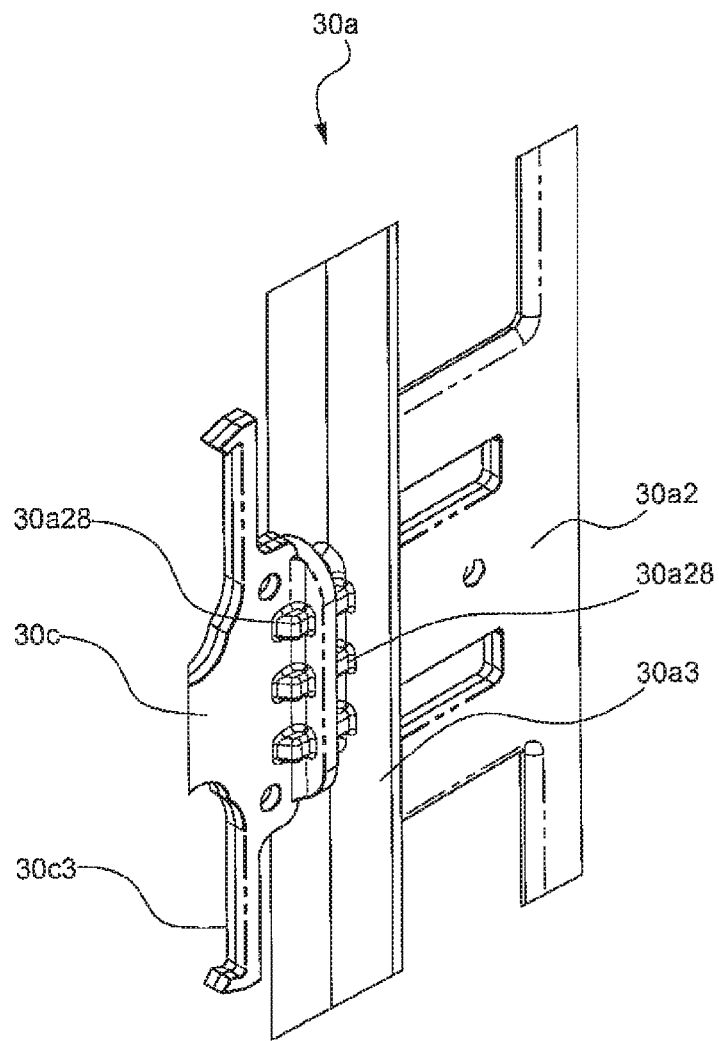
FIG. 3c is an enlarged perspective view of an interface between the inner member and the tie member of the frame member module of FIG. 3.
Figure 3D:
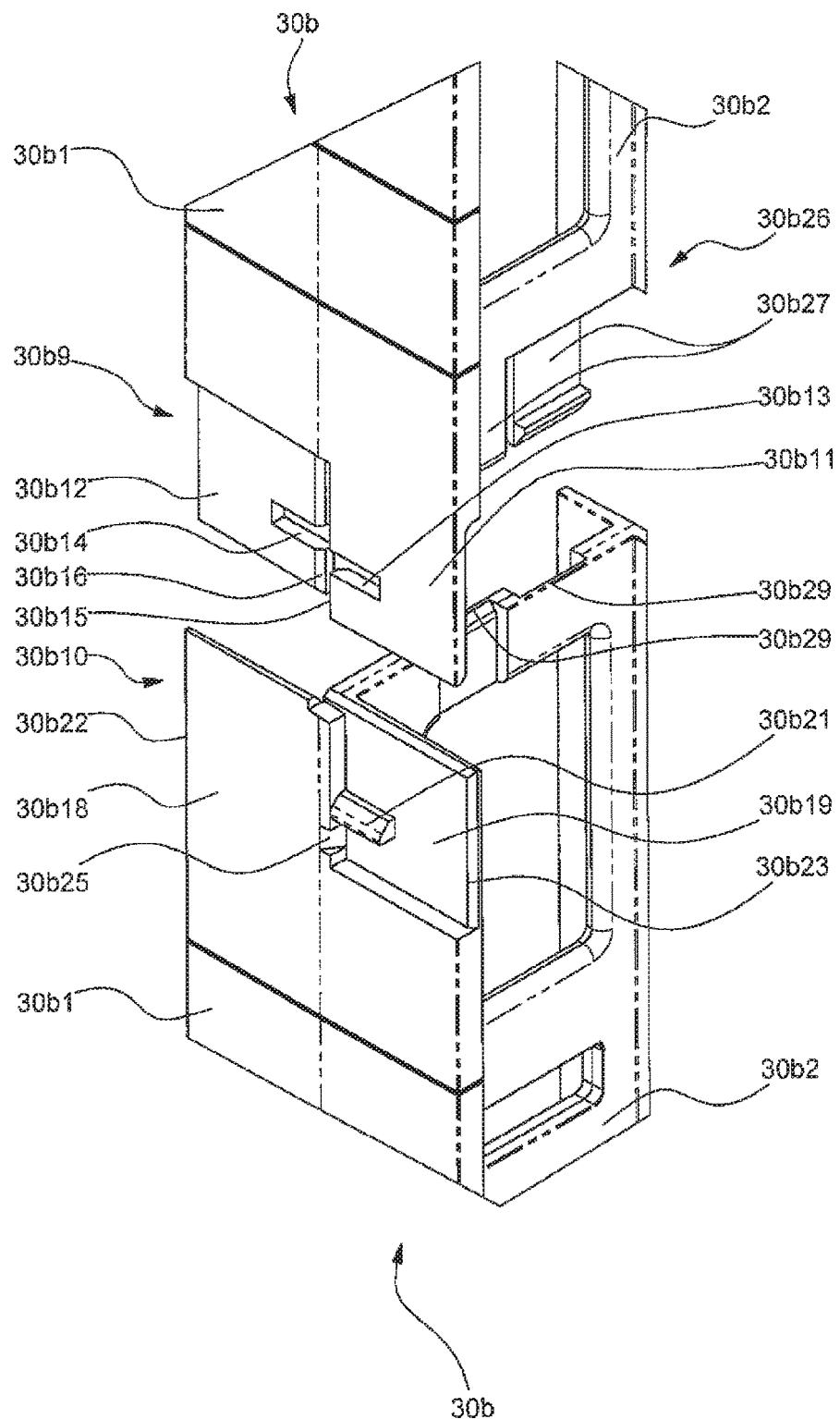
FIG. 3d-3g are enlarged perspective views showing how coupling formations on longitudinal ends of the frame member module of FIG. 3 can be used to connect several frame member modules together to form a longer frame member.
Figure 3E:
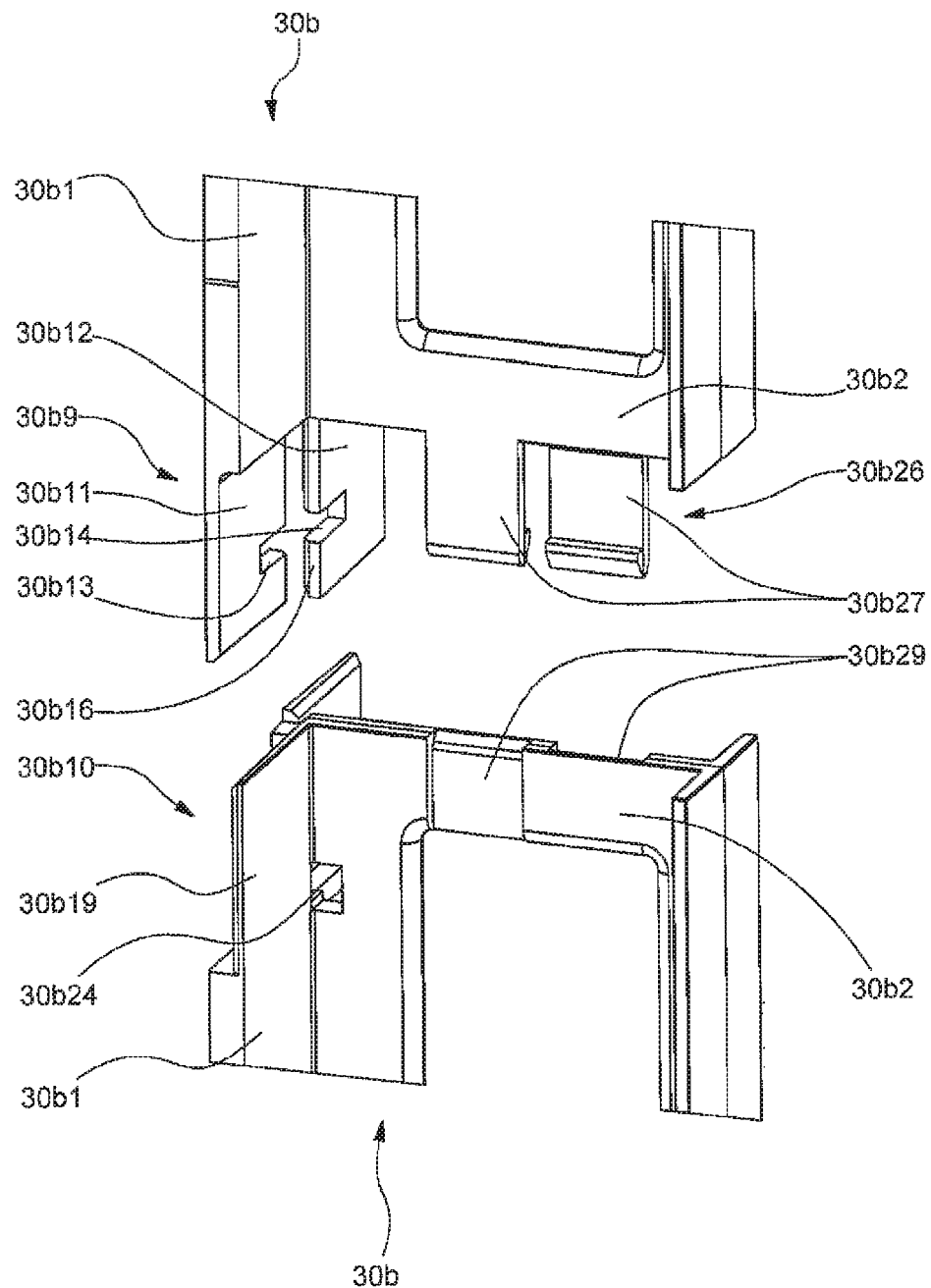
Figure 3F:
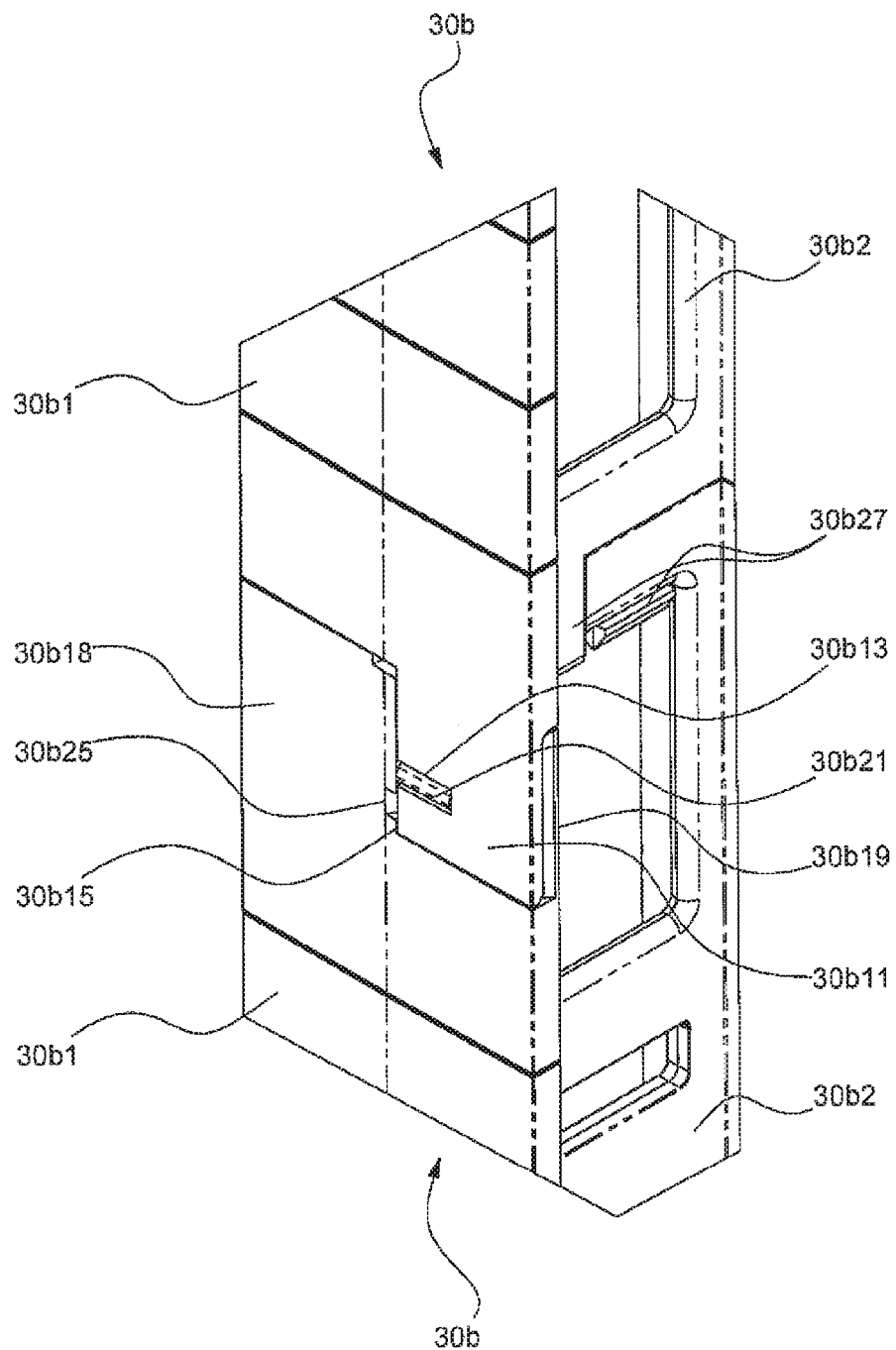
Figure 3G:
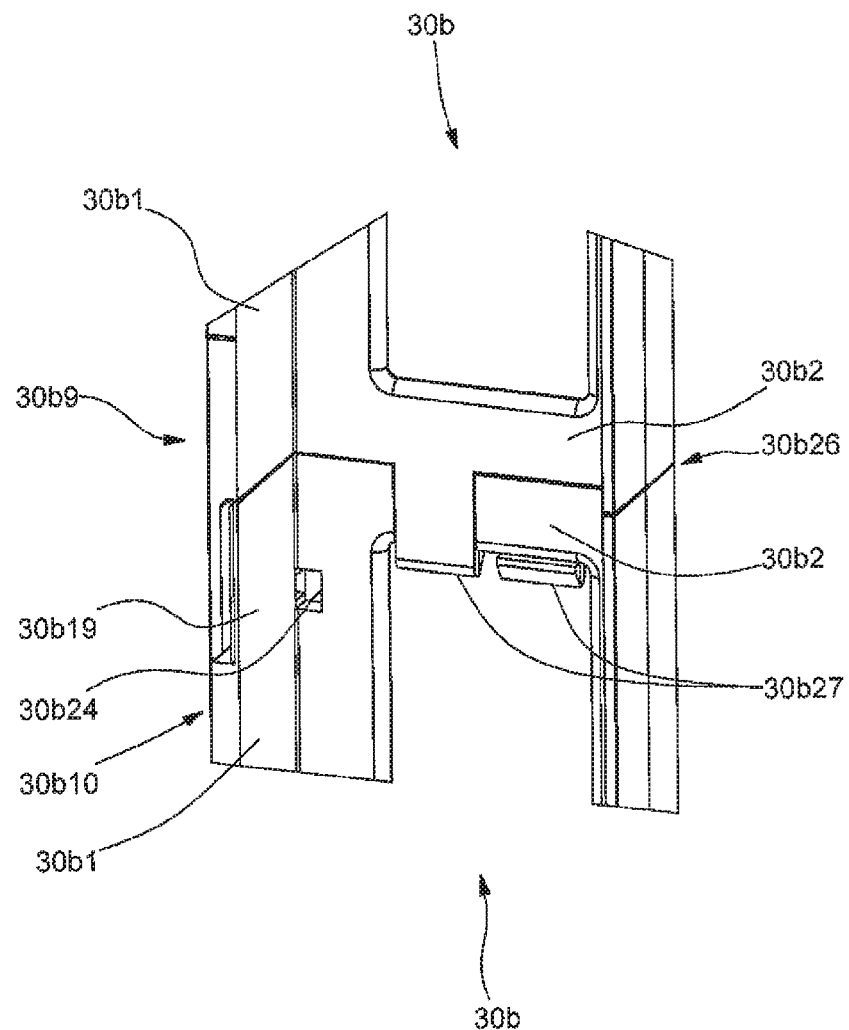

As shown in FIGS. 3*d*-3*g*, connectors 30*b*9, 30*b*10 of adjoining frame member modules 30 are engaged by aligning bottom connectors 30*b*9, 30*b*26 with top connector 30*b*10 and the upper end of web 30*b*2, respectively, and pressing the adjoining modules 30 together longitudinally. This causes tabs 30*b*11 and 30*h*12 of the bottom connector 30*b*9 to flex and slots 30*b*13, 30*b*14 to snap-lock over ribs 30*b*21, 30*b*22 of the top connector 30*b*10, and causes projections 30*b*27 of bottom connector 30*b*26 to engage with recesses 30*b*29 on either side of the web 30*b*2, thereby to securely connect the frame member modules 30 together. As shown in FIGS. 3*f* and 3*g*, interlocking of slots 30*b*13, 30*b*14 with ribs 30*b*21, 30*b*22 is visible to the human eye to allow visually confirmation of proper joining of the frame member modules 30 prior to installation. Snap-locking of slots 30*b*13, 30*b*14 with ribs 30*b*21, 30*b*22 is also audible to the human ear to provide audible confirmation of proper joining of the frame member modules 30 prior to installation. It will be appreciated that the connectors 30*a*9, 30*b*9, 30*a*10, 30*b*10, 30*a*26, 30*b*26 provide a strong and secure locking system restraining relative movement between adjoining frame member modules 30 in all three axes.

Referring to FIGS. 3-3*c*, the tie members 30*c* comprise webs 30*c*1 with a plurality of U-shaped reinforcement snap clips 30*c*2 formed therein for securely positioning and supporting horizontally oriented steel reinforcement for the concrete core poured in the space 15 between the inner and outer layers of walls 100*a*-100*d*. In other embodiments, the clips 30*c*2 may be of different shapes and/or sizes and/or may be provided at different longitudinal positions to facilitate a tailored arrangement of the steel reinforcement. In the illustrated embodiment, the clips 30*c*2 are provided on both top and bottom sides of the webs 30*c*1 to facilitate reversibility of a frame member formed from the frame member modules 30 and/or to allow steel reinforcement to be supported on the top of the webs 30*c*1 and/or slung from underneath. The webs 30*c*1 are also be provided with a plurality of small circular holes 30*c*6, which serve as convenient attachment point for wires, clips, ties and similar fasteners for temporary securing of building accessories such as window and door bucks, lintels, wall anchors and the like. As shown in FIG. 3*b*, the clips 30*c*2 comprise pairs of spaced apart, substantially parallel thin and flexible fingers 30*c*3 defining slot 30*c*4 with a profiled base therebetween. The fingers 30*c*3 terminate in gripping formations 30*c*5 for captively engaging the steel reinforcement in the slots 30*c*4.

Figure 26:
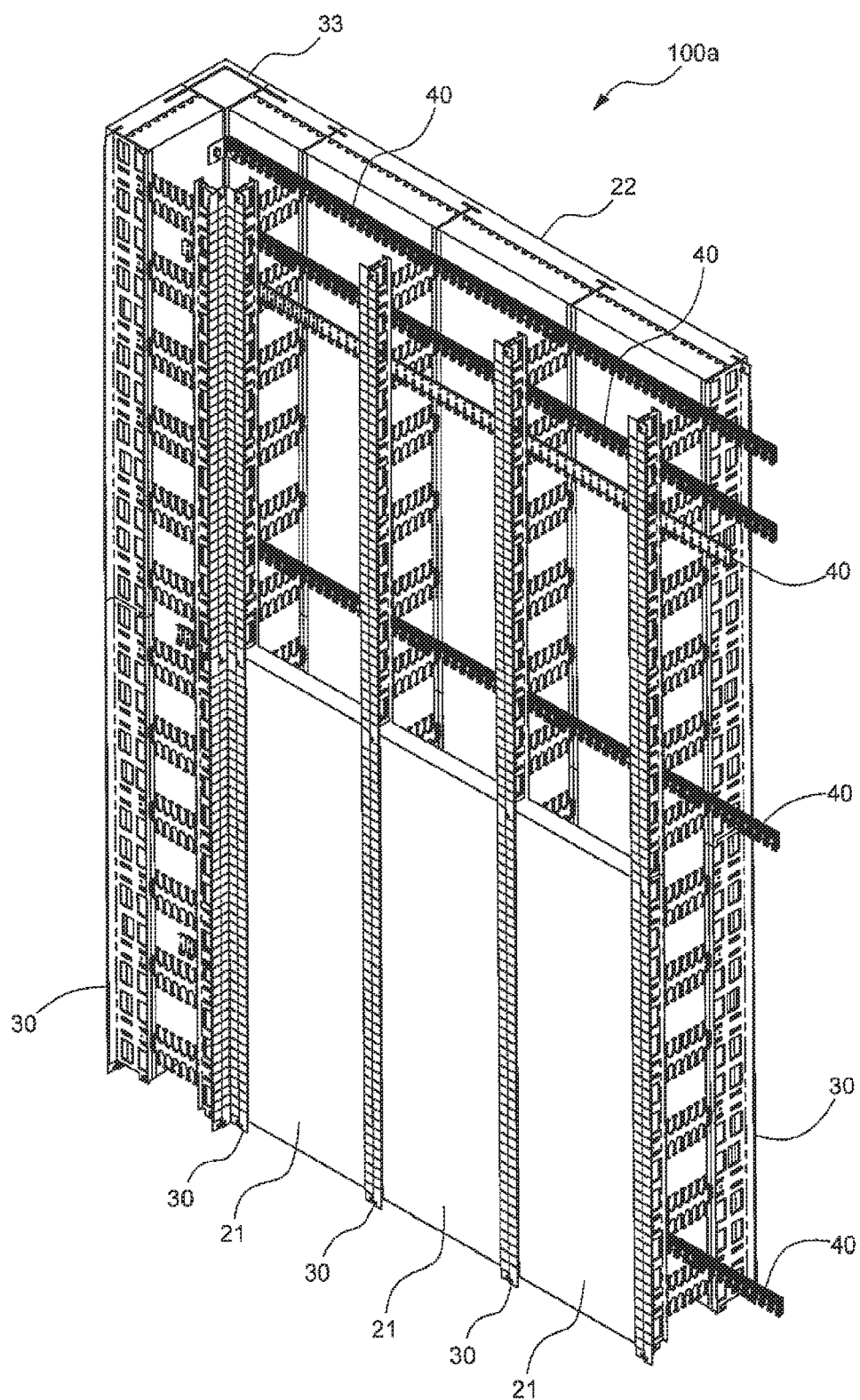
FIG. 26 is a perspective view of the modular wall frame assembly of FIG. 25 with an outer layer of insulation render modules of FIG. 19 and an inner layer of thin insulation modules of FIG. 18.

In wall 100*a*, the T-shaped slots 22*a*1 of insulation render modules 22 are slidably engaged with the outer flanges 30*a*1, as shown in FIGS. 1 and 26, such that the outer flanges 30*a*1 act as anchors for retaining the insulation render modules 22. In wall 100*b*, the insulation modules 20 are slidably engaged between the outer 30*a*1 and inner 30*a*3 flanges, as shown in FIGS. 1 and 27, such that the outer flanges 30*a*1 act as anchors for retaining the insulation modules 20.

In wall 100*b*, removable form plate modules 27 are installed between the inner 30*b*3 and outer 30*b*6 flanges of the inner member 30*b* for the formation of walls with bare concrete on the inner side, as shown in FIGS. 1 and 27. The form plate modules 27 are anchored against the inner flanges 30*b*3 by removable form clips 46 and removable form wedges 47. As such, the inner flanges 30*b*3 act as anchors for retaining the form plate modules 27. Opposite ends of the form clips 46 are engaged in the apertures 30*b*5 of adjacent frame member modules 30, with clips defined between prongs 46*b* snap-lockingly engaging webs 30*b*2 of adjoining frame member modules 30 to cross brace the form plate modules 27 to prevent the form plate modules bulging due to the weight of uncured concrete poured in the space 15. Tapered pins 47*a* of the form wedges 47 are engaged with the apertures 30*b*6, such that the heads 47*b* of the form wedges positively engage and hold lateral sides of the form plate modules 27 in a secure and tight position against the inner flanges 30*b*3. Similar apertures 30*a*5 and 30*a*6 are also provided in the web 30*a*2 to facilitate installing form plate modules 27 instead of insulation modules on the outer side of the wall. It will be appreciated that the removable form plate modules 27, form clips 46 and form wedges 47 are not intended to permanently stay in place and only act as a temporary formwork for the forming and pouring of the concrete core. After the concrete core has cured, the form plate modules 27 can easily be removed by removing the form clips 46 and form wedges 47. If desired, parts of the frame member modules 30 extending from concrete core can be trimmed to provide a bare concrete wall with a smooth finish. However, in some embodiments, the form plate modules 27 may be made from mineral based materials, such as fiber cement, magnesium oxide, calcium silicate, or similar, and may be left in place to form a built in services cavity with moderated thermal mass effect.

Figure 29:
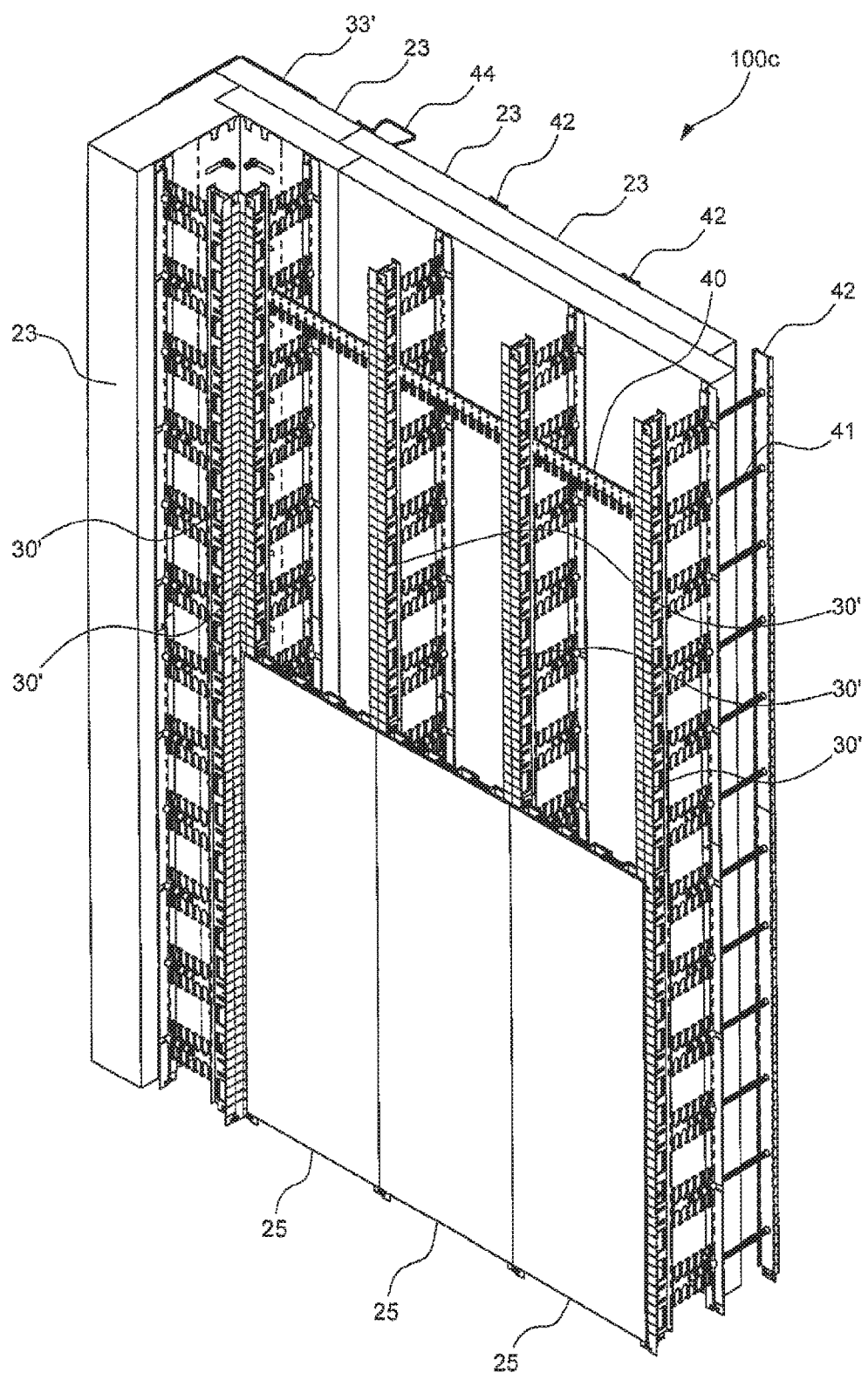
FIG. 29 is an interior perspective view of the modular wall frame assembly of FIG. 28 with an outer layer of insulation modules of FIG. 20 and an inner layer of the extruded dry wall modules of FIG. 21.

Outer flanges 30*a*1, 30*b*1 of the frame member module 30 are also slidably engageable in T-shaped slots 25*a* of extruded drywall modules 25 in a similar manner as shown in FIGS. 1 and 29 with respect to frame member module 30', such that the outer flanges 30*a*1, 30*b*1 act as anchors for retaining the extruded drywall modules 25.

Figure 4:
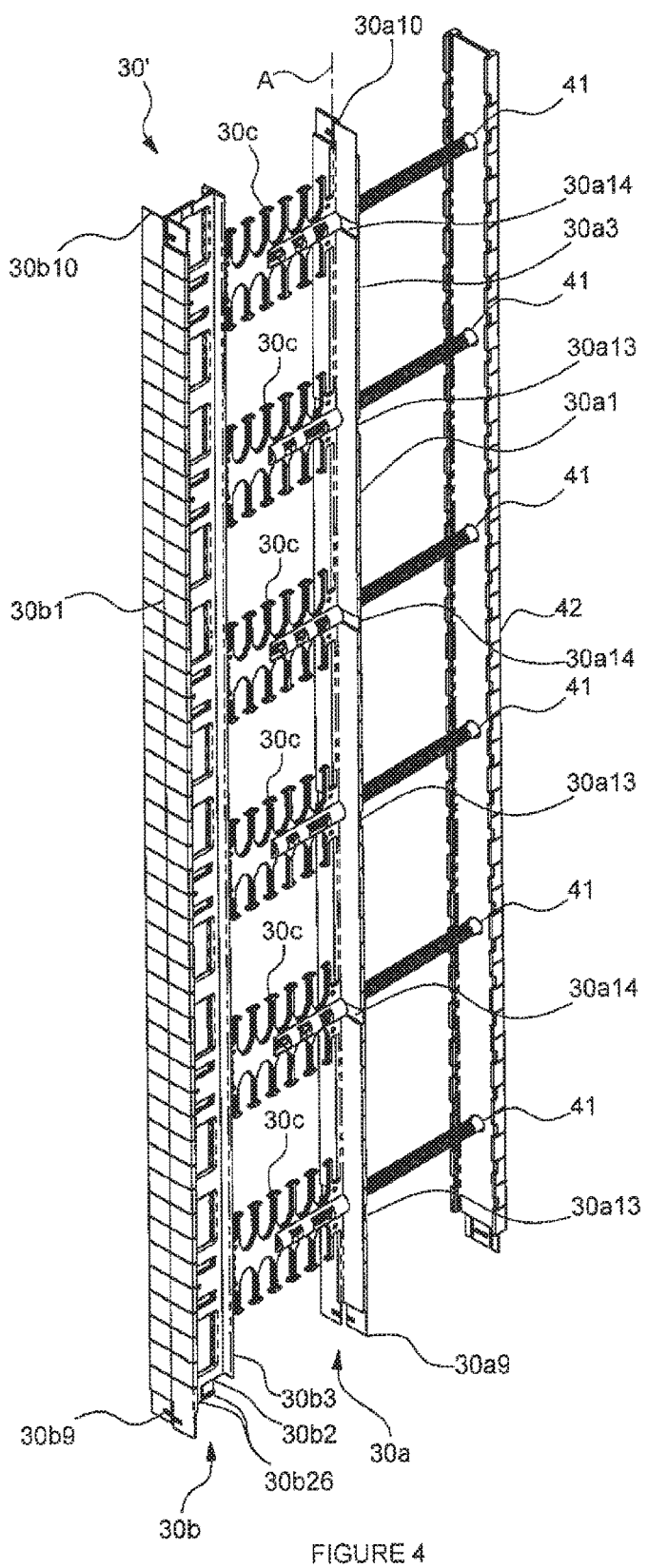
FIG. 4 is a perspective view of a single variable frame member module of the system of FIG. 1 for receiving multiple layers of outer insulation defining a thicker outer insulating layer along with a single thinner inner insulating layer.
Figure 4A:
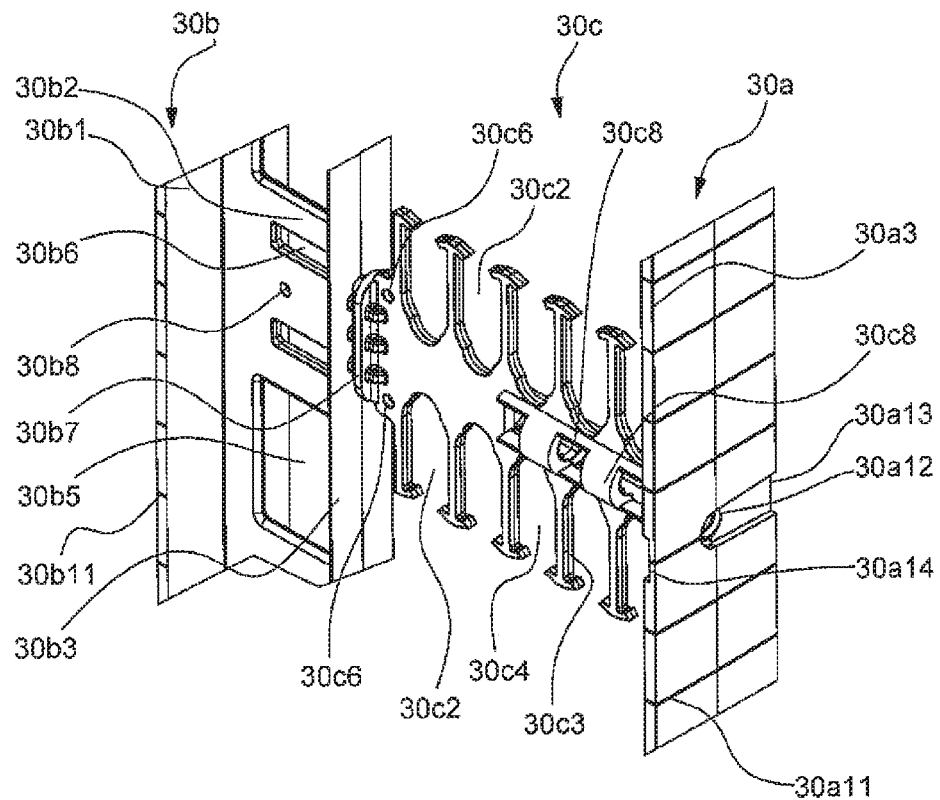
FIG. 4a is an enlarged perspective view of part of the frame member module of FIG. 4, shown with its baton module and adjusting bolt removed.
Figure 28:
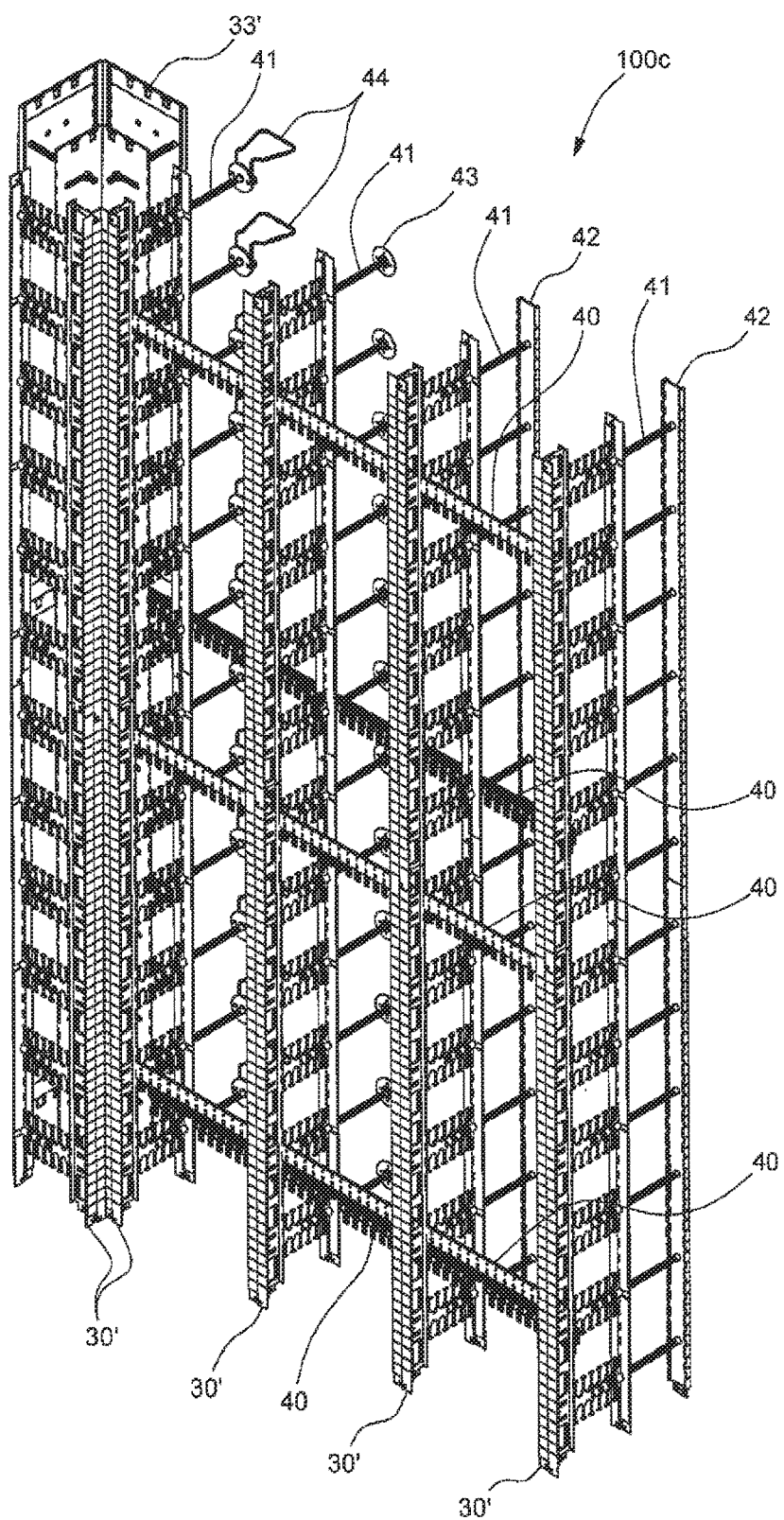
FIG. 28 is a perspective view of several single variable frame member modules of FIG. 4, a variable corner module of FIG. 7 and lateral cross ties of FIG. 8 assembled together to create a modular wall frame assembly ready for the installation of the desired outer and inner layers.
Figure 30:
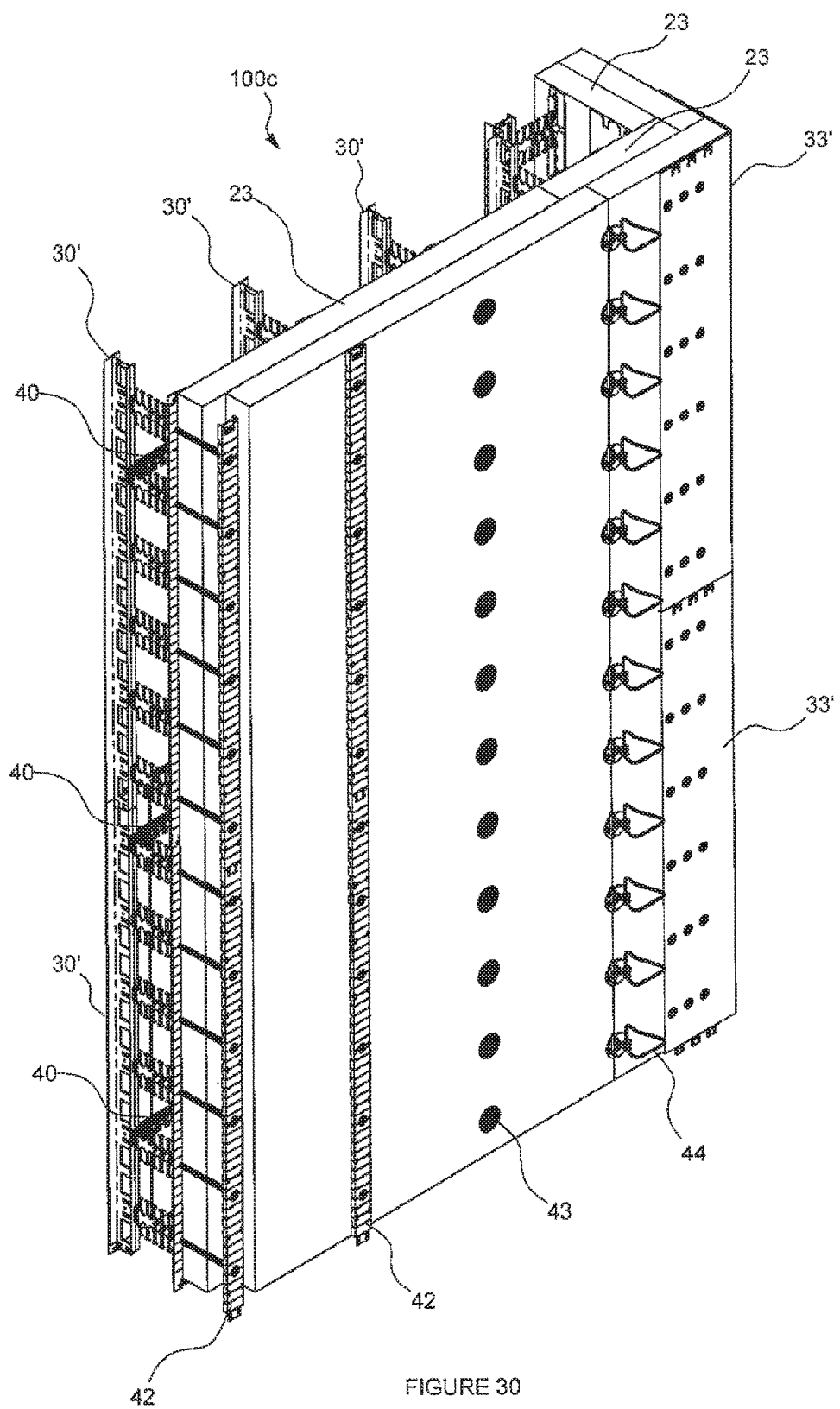
FIG. 30 is an exterior perspective view of the assembly of FIG. 29, also showing baton modules of FIG. 12, render washer modules of FIG. 15 and brick tie modules of FIG. 16, for attaching various exterior finishes, such as external cladding, external siding, render and stucco based external finishes, or heavy external brick cladding.

FIGS. 4 and 4*a* show a single variable frame member module 30' used in wall 100*c*. Frame member module 30' has many features in common with frame member 30, where corresponding reference numerals indicate corresponding features with corresponding functionality. In frame member module 30', however, the outer flange 30*a*1 and web 30*a*2 are replaced by an outer flange in the form of insulated baton module 42 and adjustable insulated bolts 41. Adjustment of the bolts allows a space between in inner flange 30a3 and the baton module 42 to be increased to receive a thick multi layer insulation module 23 therein. A plurality of apertures 30a12 are provided in the inner flange 30a3 at positions aligning with the tie members 30c. Apertures 30a12 are formed by superimposing a pair of horizontal tapered slots 30a13 and 30a14, which negates the requirement for sliding cores on an injection moulding machine used to form the frame member modules 30'. The bolts 41 extend through the apertures 30a12 and threadedly engage female threaded half tie nuts 30c8 formed on alternate sides of the tie members 30c. The alternating arrangement of half tie nuts 30c8 again negates the requirement for sliding cores on the injection moulding machine. Tightening of the bolts 41 anchors insulation modules 23 between flange 30a3 and baton module 42. In alternative embodiments, as shown in FIGS. 28-30, the baton module may be replaced by a plurality of longitudinally spaced apart anchor heads, in the form of render washers 43 or brick lie modules 44, each of which is secured against the outside of insulation modules 23 by an insulated bolt 41.

Figure 5:
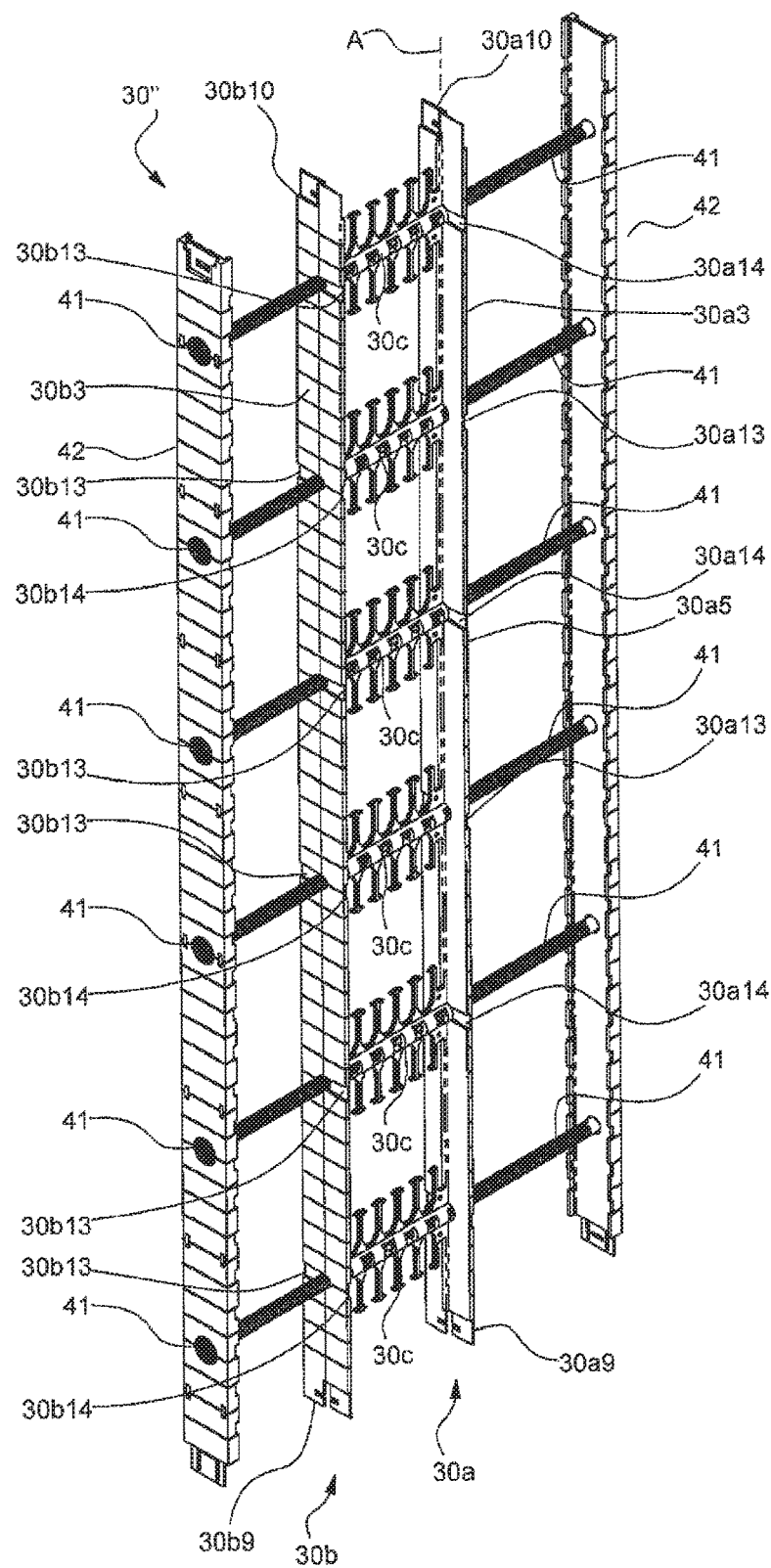
FIG. 5 is a perspective view of a double variable frame member module of the system of FIG. 1 for receiving multiple layers of outer and inner insulation defining thicker outer and inner insulating layers.
Figure 5A:
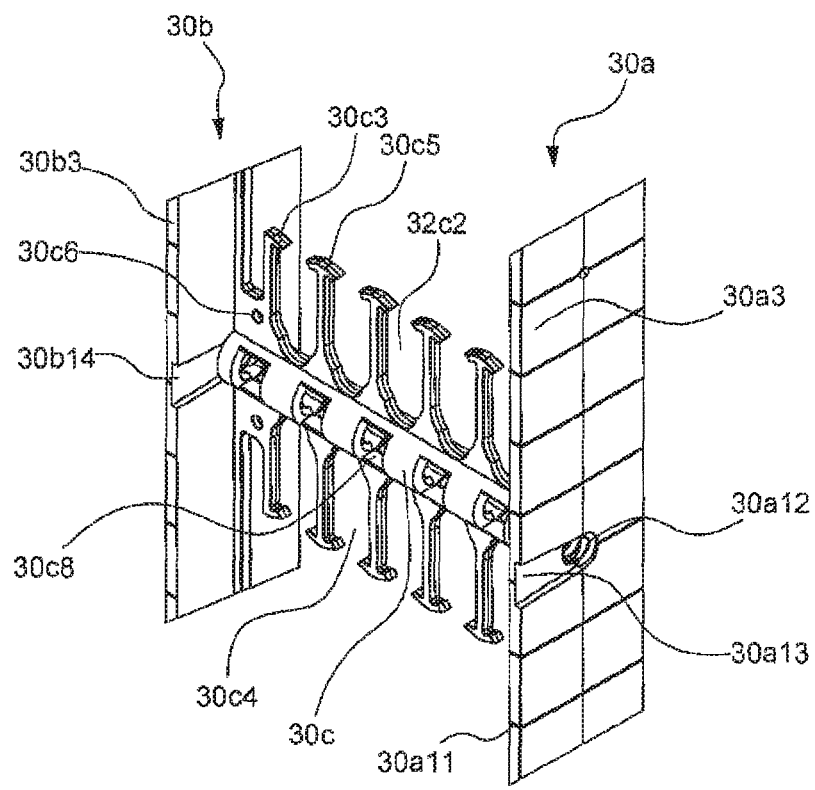
FIG. 5a is an enlarged perspective view of part of the frame member module of FIG. 5, shown with its baton module and adjusting bolt removed.

FIGS. 5 and 5a show a double variable frame member module 30" used in wall 100d. Frame member module 30" has many features in common with frame member 30', where corresponding reference numerals indicate corresponding features with corresponding functionality. In frame member module 30", however, along with the outer flange 30a1 and web 30a2, the outer flange 30b1 and web 30b2 are also replaced by an outer flange in the form of insulated baton module 42 and adjustable insulated bolts 41, and a plurality of apertures 30b12, formed by tapered slots 30b13, 30b14, are also provided in the inner flange 30b3 at positions aligning with the tie members 30c. Accordingly, thick multi layer insulation modules 23 can be installed on both sides of frame member module 30".

Frame member modules 30, 30', 30" may be moulded or fabricated from a light weight but strong and inexpensive plastics material, such as recycled polypropylene, polyethylene, polystyrene, abs, or similar.

Figure 6:
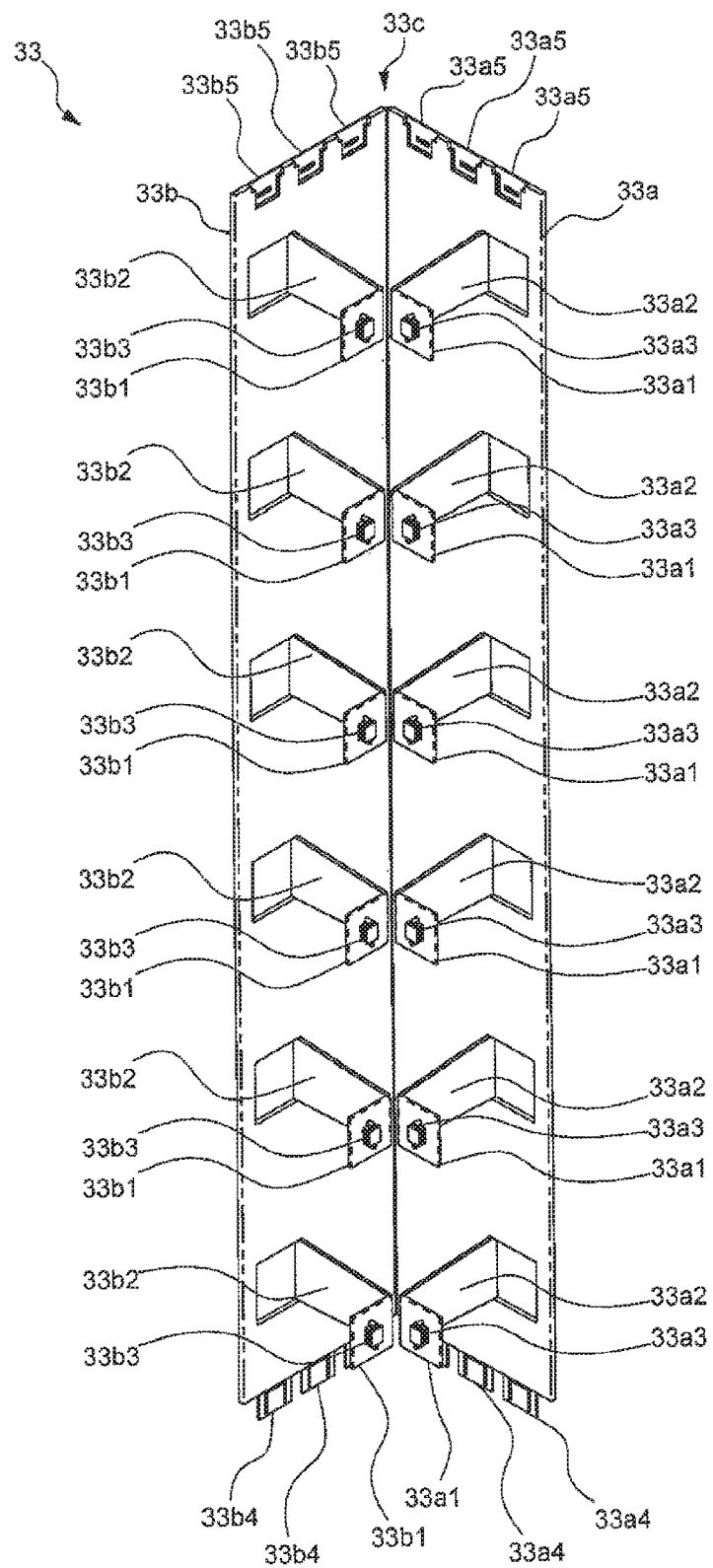
FIG. 6 is a perspective view of a fixed corner securing module for use in walls of the system of FIG. 1 comprising the fixed frame member modules of FIG. 3.
Figure 6A:
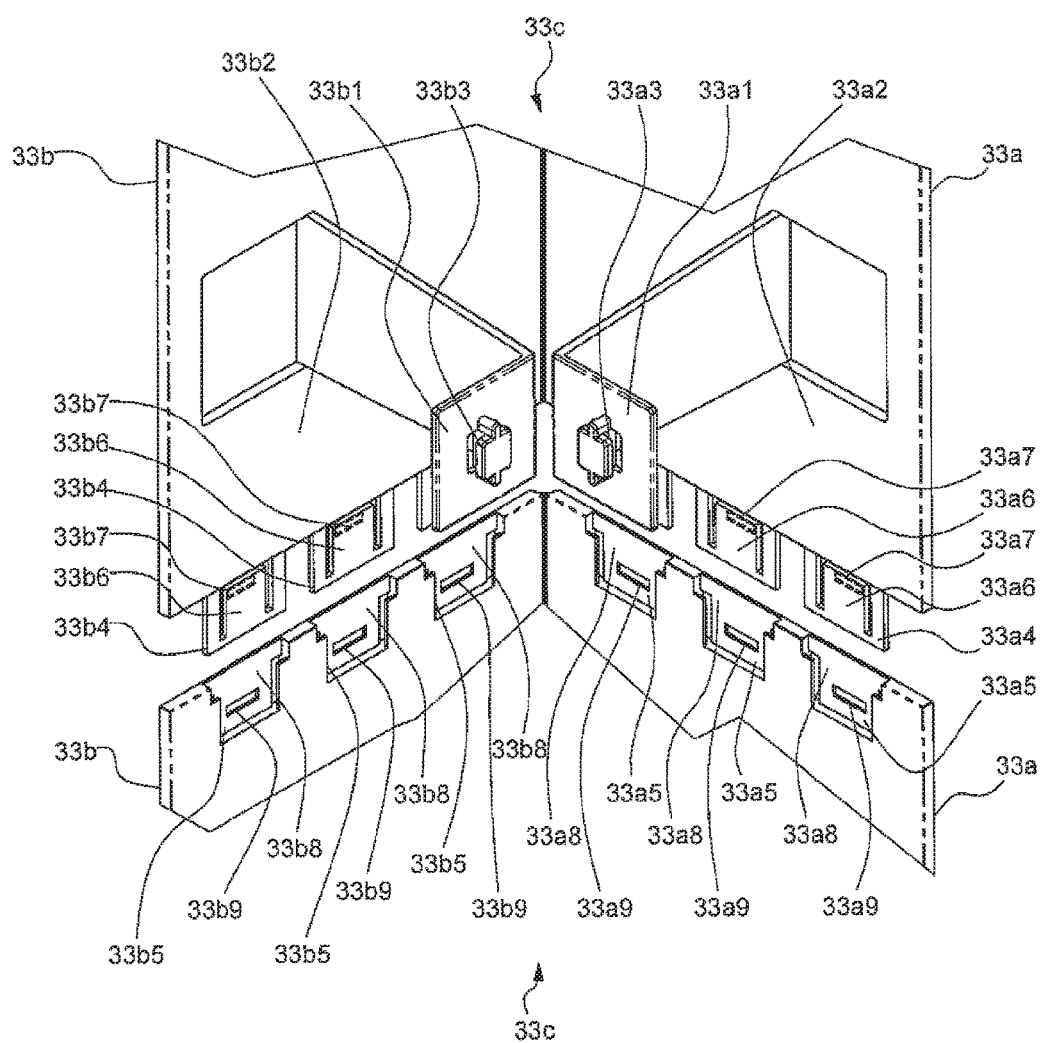
FIG. 6a is an enlarged perspective view of the corner securing module of FIG. 6.

FIGS. 6 and 6a show a fixed corner securing module 33 for securing corners between walls 100a and 100b, and walls 100a and 100d. The corner securing module 33 comprises a pair of elongate and substantially parallel outer flanges 33a and 33b. Flanges 33a, 33b are hingedly connected by a continuous integral hinge 33c having an axis perpendicular to the longitudinal axis of the flanges. The hinge 33c is adapted to flex to adopt a desired corner angle. A plurality of longitudinally spaced apart C-shaped brackets 33a1 and 33b1 are connected to the flanges 33a, 33b and define channels 33a2 and 33b2 for securely engaging an end of insulation modules 20 or insulation render modules 22, as shown in FIG. 1. The longitudinal spacing between brackets 33a1, 33b1 matches the longitudinal spacing between the tie members 30c of the frame member modules 30, 30', 30". The brackets 33a1, 33b1 can also engage insulation modules 23 if an appropriately positioned longitudinal slot is formed in the end of insulation modules 23, as shown in FIG. 1. Returning to FIGS. 6 and 6a, hubs 33a3 and 33b3 extend from brackets 33a1 and 33b for snap-locking engagement by lateral cross ties 40 to align and secure the corner modules 33 to the associated frame member modules 30, 30', 30". Coupling formations, in the form of bottom connectors 33a4, 33b4 and top connectors 33a5, 33b5, are provided at opposite longitudinal ends of the flanges 33a and 33b to facilitate joining several modules 33 together to provide a unitary corner member with a desired height. Bottom connectors 33a4, 33b4 comprise flexible tabs 33a6, 33b6 having lateral ribs 33a7, 33b7 thereon. Top connectors 33a5, 33b5 comprise complementary recesses 33a8, 33b8 complementary to and engageable by the tabs 33a6, 33b6, such that lateral slots or cutouts 33a9, 33b9 in the recesses 33a8, 33b8 are snap-lockingly engageable by the lateral ribs 33a7, 33b7. The flat face top connectors 33a4, 33b4 are inserted into the recessed flanges 33a8, 33b8 of the bottom connectors 33a5, 33b5 which causes the flexible webs 33a6, 33b6 and the angled protrusions 33a7, 33b7 to flex and lock into the horizontal engagement slots 33a9, 33b9 to mechanically join the fixed corner modules 33.

Figure 7:
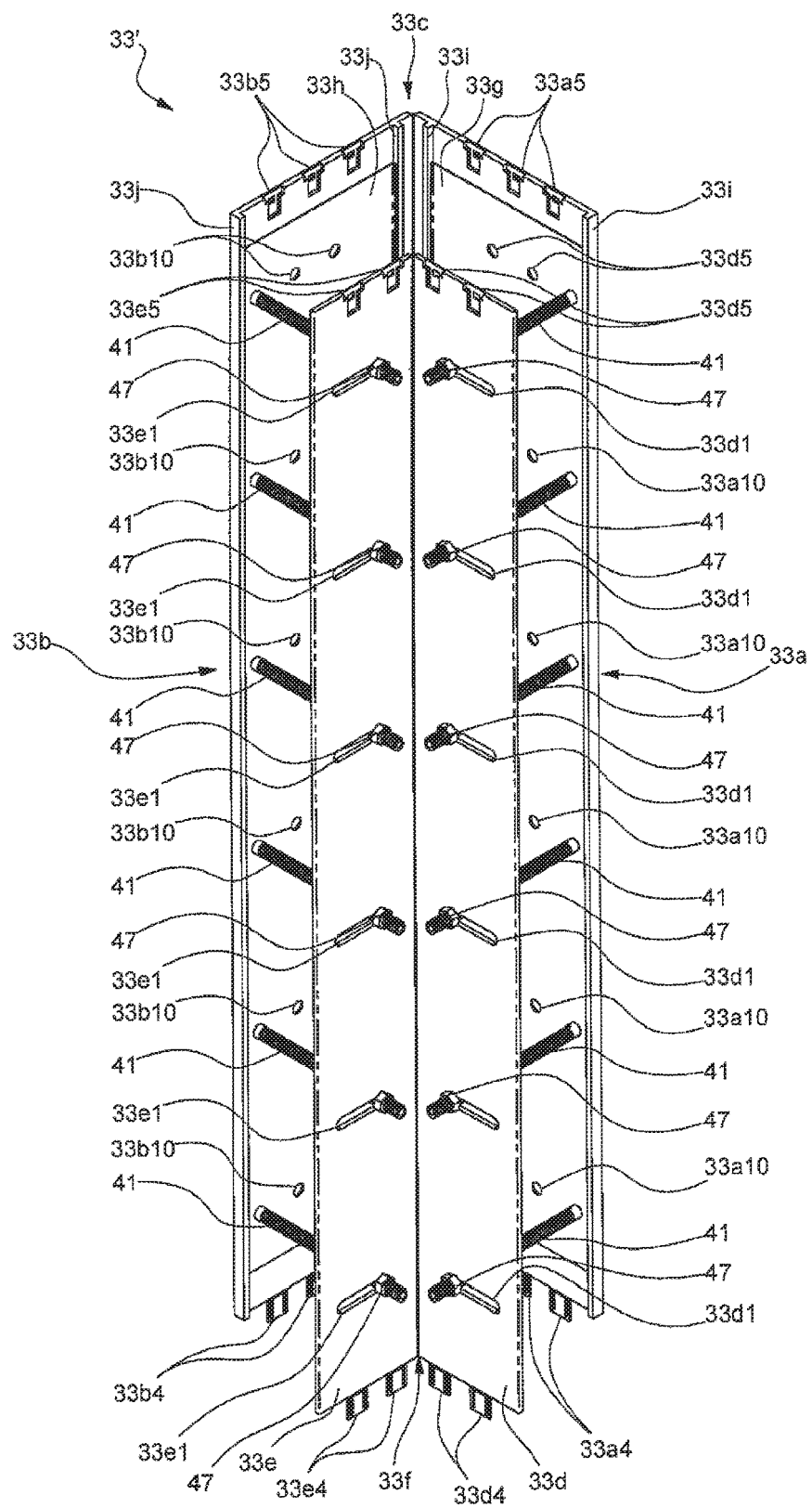
FIG. 7 is a perspective view of a variable corner securing module for use in walls of the system of FIG. 1 comprising the variable frame member modules of FIGS. 4 and 5.

FIG. 7 shows a variable corner securing module 33' for securing corners between walls 100b and 100c, and walls 100c and 100d. Corner securing module 33' has a number of features in common with corner securing module 33, where corresponding reference numerals indicate corresponding features with corresponding functionality. In variable corner securing module 33', however, brackets 33a1, 33b1 are replaced by a pair of elongate and substantially parallel inner flanges 33d and 33e, which are spaced apart from and extend parallel to outer flanges 33a, 33b. Flanges 33d, 33e are hingedly connected by a continuous integral hinge 33f having an axis perpendicular to the longitudinal axis of the flanges 33d and 33e. The hinge 33f is adapted to flex to adopt a desired corner angle. Groups of laterally spaced apart apertures 33a10 and 33b10 are provided in the outer flanges 33a, 33b at longitudinally spaced apart positions. Corresponding laterally extending slots 33d1 and 33e1 are provided in the inner flanges 33d and 33e. The longitudinal spacing between the groups of apertures 33a10 and 33b10 and corresponding slots 33d1 and 33e1 matches the longitudinal spacing between the tie members 30c of the frame member modules 30, 30', 30". The outer flanges 33a, 33b and inner flanges 33d, 33c are bolted together using insulated bolts 41 that can be installed through the apertures 33a10 and 33b10 and slots 33d1 and 33e1 and secured by an insulated nut 47. The nut 47 can be adjusted to securely engage the end of an insulation module 23, as shown in FIG. 1. The nuts 47 may be configured for snap-locking engagement by lateral cross ties 40 to align and secure the corner modules 33' to the associated frame member modules 30, 30', 30".

Corner securing modules 33, 33' may be moulded, extruded or fabricated from a light weight but strong and inexpensive plastics material, such as recycled polypropylene, polyethylene, polystyrene, abs, or similar.

A spine, comprising a high strength thin sheet steel reinforcement channel 33g, 33h, may be secured to the outer flanges 33a, 33b for additional structural and screw pull out strength, along with enhanced fire resistance in extended fire rating situations. Longitudinal ribs 33i, 33j on the outer flanges 33a, 33b space the spine from the insulation module 23 to inhibit conduction of heat to the insulation module 23 and concrete core, and to allow air flow and moisture drainage between the outer flange and insulation module 23 to inhibit condensation and mould growth.

Figure 8:
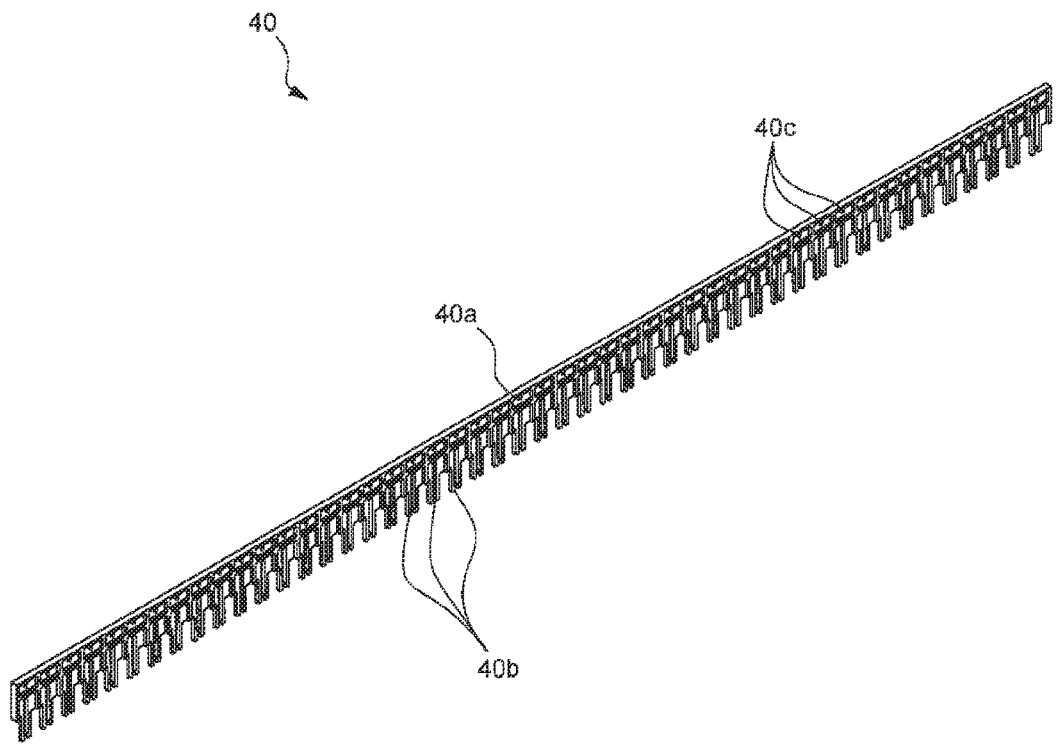
FIG. 8 is a perspective view of a lateral cross tie for interconnecting the frame member modules is each of the walls of the system of FIG. 1.
Figure 9:
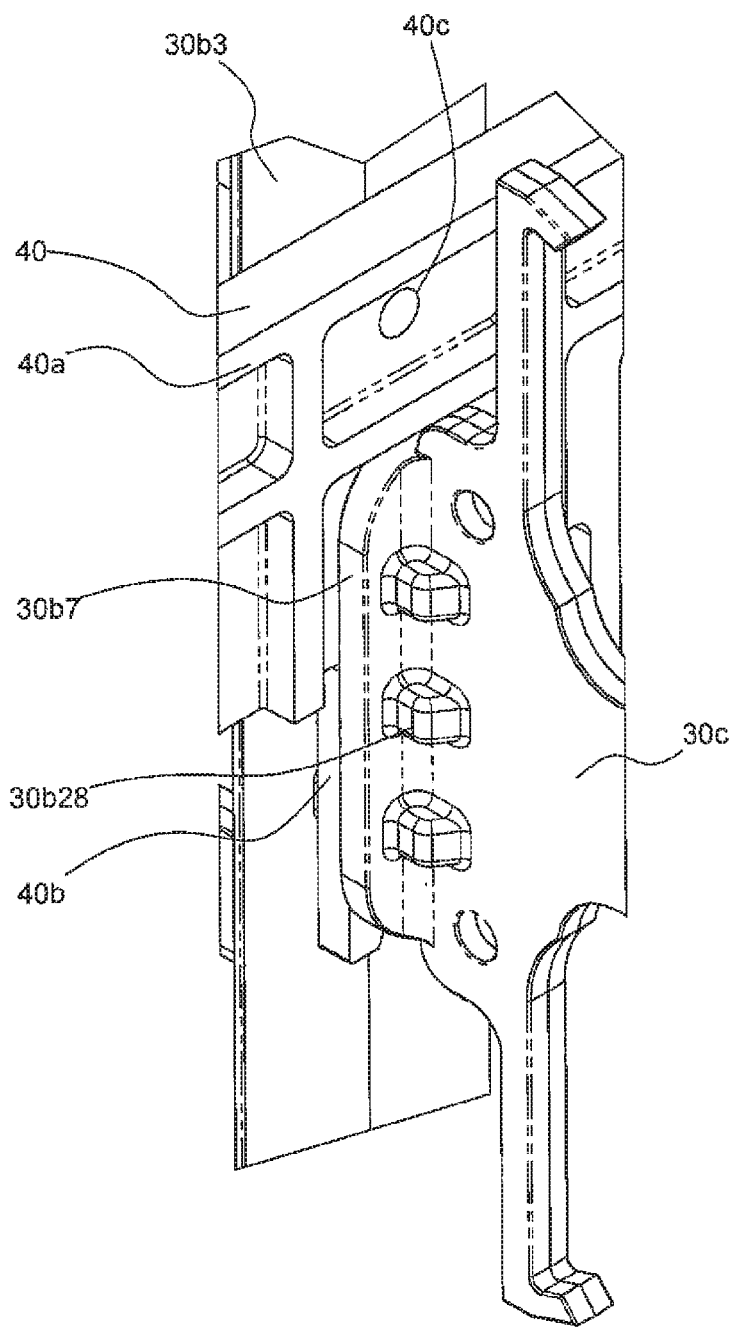
FIG. 9 is an enlarged partial perspective view of the lateral cross tie snap-lockingly engaged with a tie member of the fixed frame member module of FIG. 3.

FIG. 8 is a perspective view of a lateral cross tie 40 used to interconnect frame member modules 30, 30', 30". The lateral cross tie 40 comprises an elongate spine 40a with a plurality of regularly spaced apart prongs 40b extending therefrom. Clips are defined between the prongs 40b. The clips are alignable and snap-lockingly engageable with hubs 30a7, 30b7 of frame member modules 30, 30' and hubs 33a3, 33b3 of corner stud modules 33. A plurality of apertures 40c may be provided in the spine 40a for receiving screw fasteners to further increase the rigidity of the system 100 if required. FIG. 9 is a perspective close up view of cross tie 40 snap-locked with hub 30a7 of frame member module 30. Cross tie 40 may be moulded or fabricated from a light weight but strong and inexpensive plastics material, such as recycled polypropylene, polyethylene, polystyrene, abs, or similar.

Figure 10:
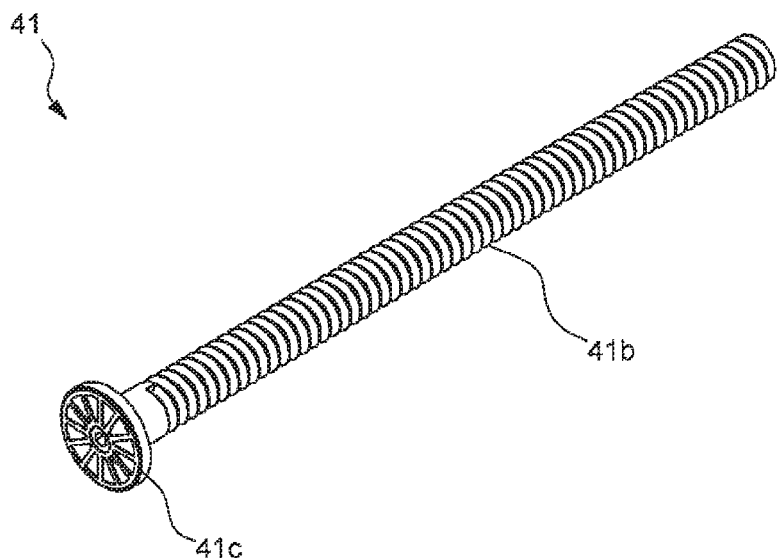
FIG. 10 is a perspective view of an insulated composite bolt for the single and double variable frame member modules of FIGS. 4 and 5.
Figure 11:
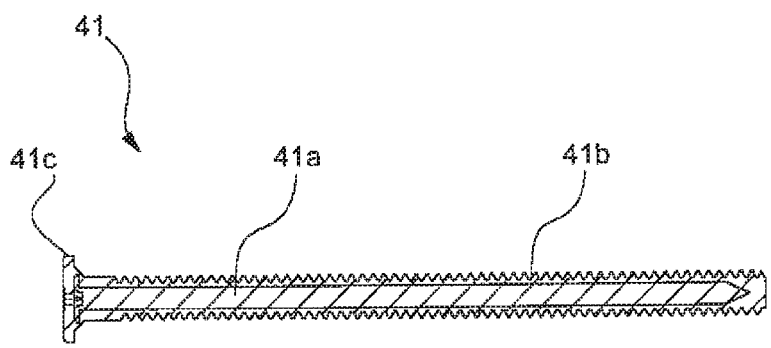
FIG. 11 is sectional view of the composite bolt of FIG. 10.

FIGS. 10 and 11 show an insulated threaded bolt 41 used with frame member modules 30', 30" to secure baton modules 42, render washers 43, brick tie modules 44 and/or corner securing modules 33', such as shown in walls 100c and 100d in FIG. 1. The insulated bolt 41 comprises a threaded shaft with a structural core 41a formed from high strength steel and a thermally insulative sheath 41b of plastics material formed around the core 41a. The sheath may be formed from a thermally insulative high performance composite material, such as a fibre glass reinforced plastics material or an oriented fibre glass polyester material. In other embodiments, the whole bolt 41 may be moulded or fabricated from a thermally insulative high performance composite material, such as a fibre glass reinforced plastics material or an oriented fibre glass polyester material. The shaft is engageable with the nuts 30c8, 47 of frame member modules 30', 30" and corner securing module 33' respectively. A circular head 41c is provided at one end of the bolt shaft. In some embodiments, the circular head 41c may take the form of a removable nut threadedly engaged with the bolt shaft.

Figure 12:
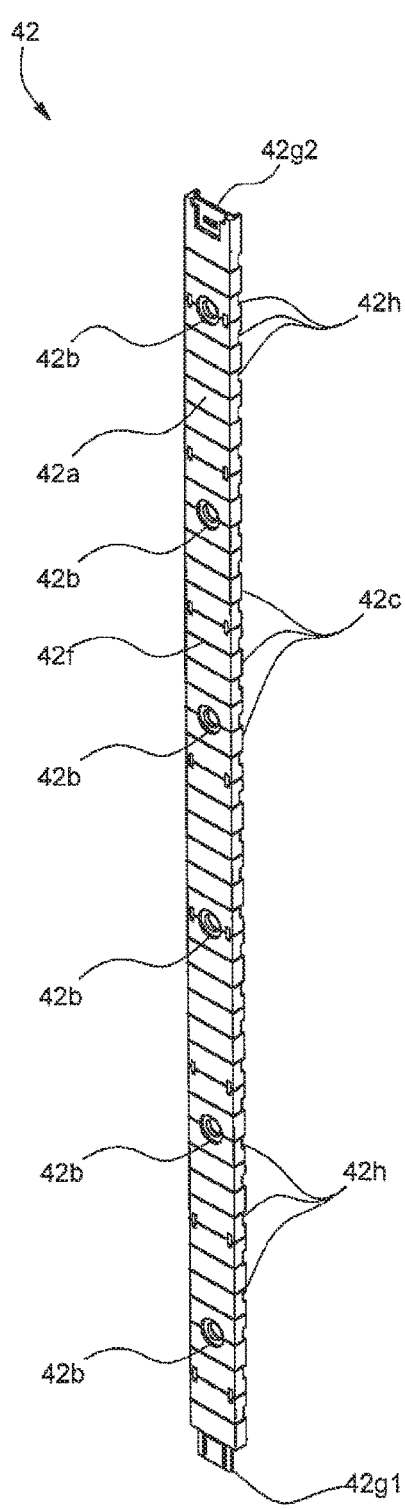
FIG. 12 is a perspective front view of an insulated composite baton for the single and double variable frame member modules of FIGS. 4 and 5.
Figure 13:
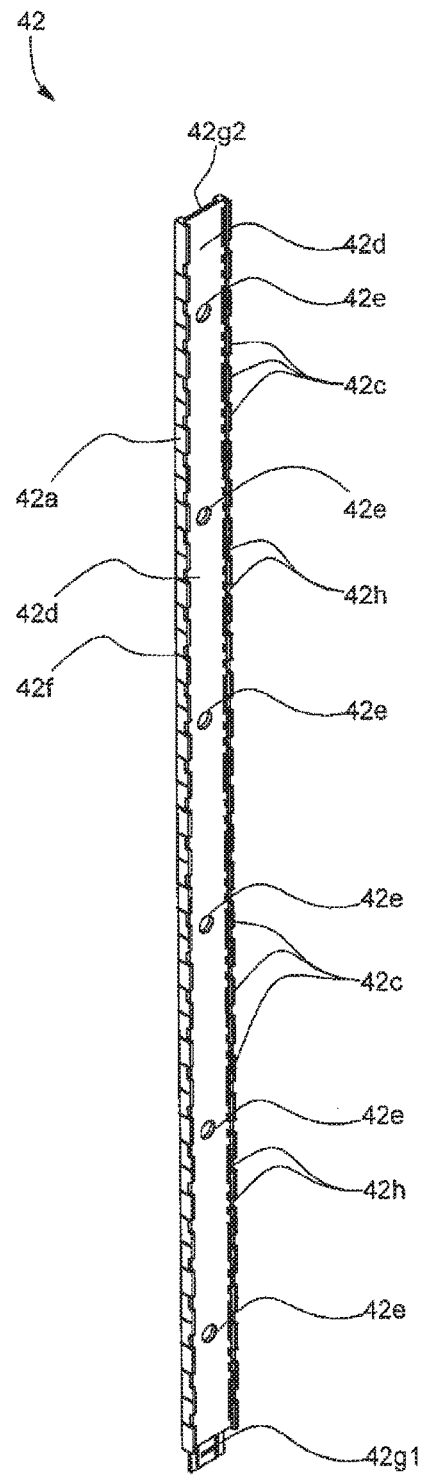
FIG. 13 is a perspective rear view of the composite baton of FIG. 12.
Figure 14:
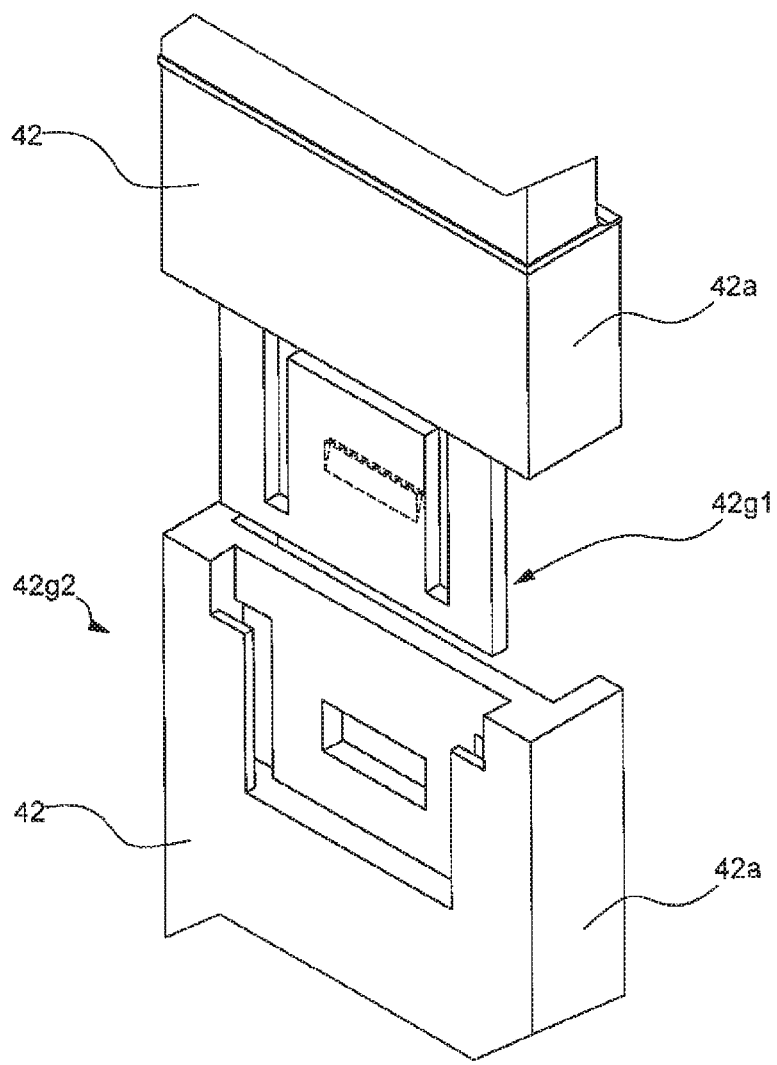
FIG. 14 is an enlarged perspective view of coupling formations of the thermally insulative capping of the composite baton of FIG. 12 for joining several lengths of the capping together to facilitate forming a longer baton.

FIGS. 12-14 show an insulated baton module 42 used with frame member modules 30', 30" and insulation modules 23, such as shown in walls 100c and 100d in FIG. 1. The baton module 42 comprises a thermally insulative elongate flange 42a with a plurality of spaced apart circular recesses 42b therein that are sized to match the heads 41c of insulated bolts 41. A plurality of projections 42c extend from opposite sides of the flange 42a to assist in thermally isolating the baton module 42 from the insulation module 23. Openings 42h are also defined between the projections 42c to facilitate the circulation of air to between insulation module 23 and the baton module 42 to inhibit the formation of mould. Marking lines 42f are provided at regular intervals on an outer side of the flange 42a to facilitate easy and accurate trimming of the baton module 42 to a desired length. The baton module 42 includes bottom 42g1 and top 42g2 connectors to facilitate connection of several baton modules 42 to form an integrated baton of a desired length. The bottom and top connectors have the same configuration as connectors 33a4, 33a5 of corner modules 33. The baton module 42 may be moulded, extruded or fabricated from a thermally insulative high performance composite material, such as a fibre glass reinforced plastics material or a wood reinforced plastics material. Alternatively, as best seen in FIG. 13, the flange 42a and projections 42c may be moulded, extruded or fabricated from a thermally insulative material and reinforced by a structural spine, in the form of a high strength thin sheet steel or fibreglass reinforcement channel 42d that extends the length of the flange and is secured between the projections 42c. The spine 42d has apertures 42e therein that align with the recesses 42b. In some embodiments, the circular recesses 42b may be in the shape of a key hole with built in retaining clips to facilitate easy site assembly and removal of the insulated baton module 42.

Figure 15:
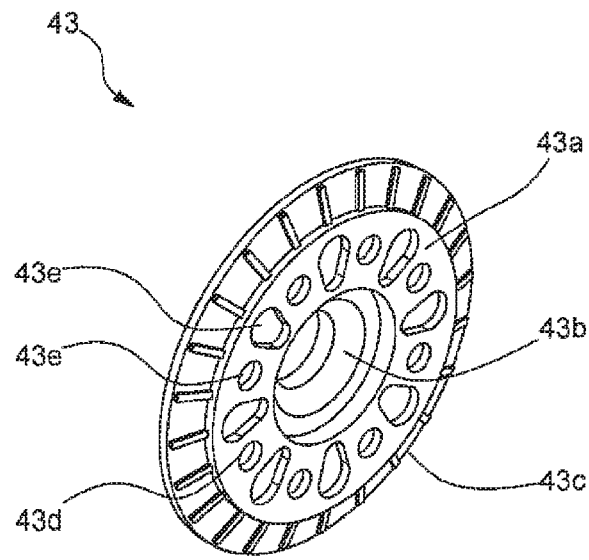
FIG. 15 is a perspective front view of a render washer for use on a wall of the system of FIG. 1 to which stucco or a render based exterior finish is to be applied.
Figure 15A:
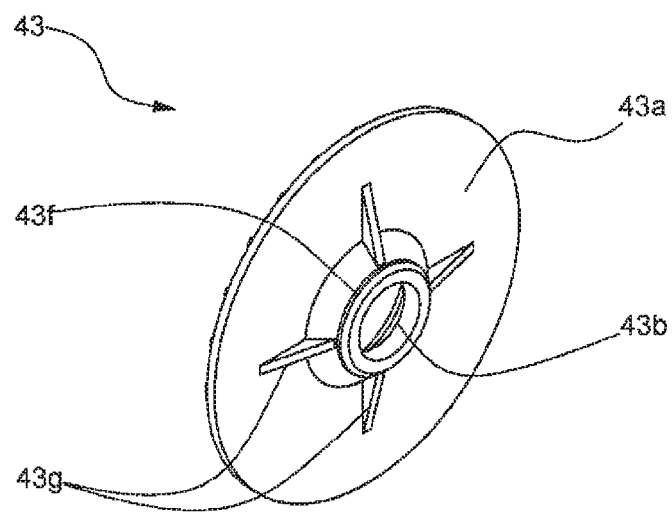
FIG. 15a is a perspective rear view of the render washer of FIG. 15.

FIGS. 15 and 15a show a render washer 43 for use with frame members 30', 30" and insulation modules 23, such as shown in wall 100c of FIG. 1. The render washer module 43 comprises a thermally insulated flat washer 43a with a circular recess 43b in its outer surface having a rim that is sized to be engaged by the head 41c of insulated bolt 41. The render washer modules 43 and is provided with a tapered or "feathered" peripheral rim 43c, a textured outer surface 43d, and a plurality of circular and conical recesses or openings 43e to facilitate the adhesion of stucco or render based exterior finishes on insulation modules 23 anchored with the render washer modules 43. The inner surface of render washer module 43 comprises a tapered circular hub 43f and a plurality of radial flanges 43g that penetrate the insulation module 23 to facilitate level and flush engagement of the render washer module 43 with the insulation module 23. The render washer module 43 may be moulded from a general purpose plastics material. In some embodiments, the circular recesses 43b may be in the shape of a key hole with built in retaining clips to facilitate easy site assembly and removal of the render washer 43.

Figure 16:
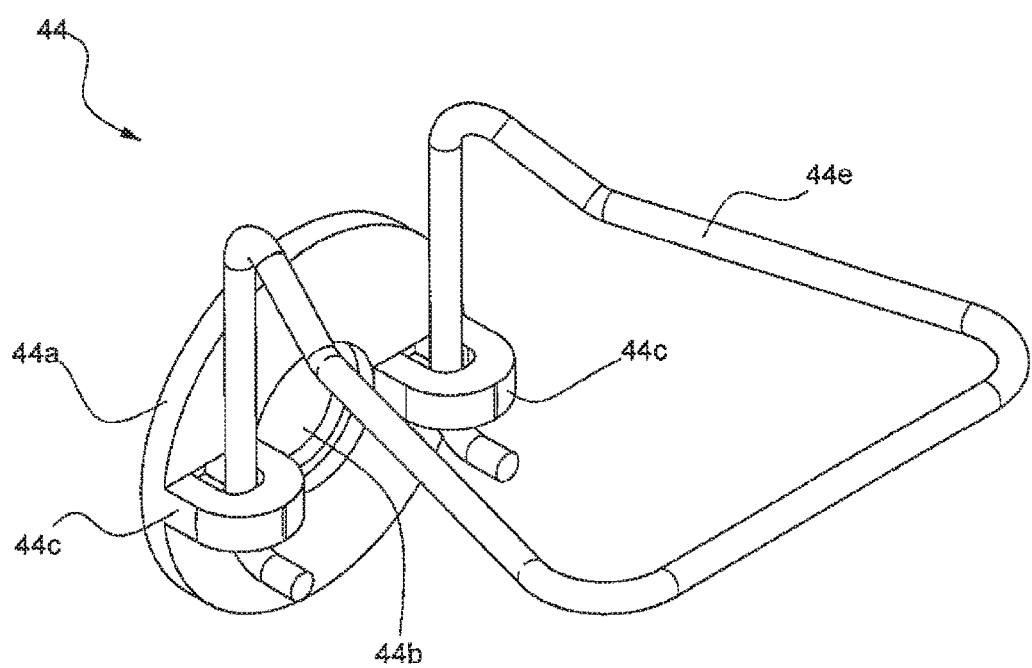
FIG. 16 is a perspective view of a brick tie module for use on a wall of the system of FIG. 1 to which heavy exterior brick cladding is to be applied.

FIG. 16 shows a brick tie module 44 for use with frame members 30', 30" and insulation modules 23, such as shown in wall 100c in FIG. 1, to secure exterior brick cladding to the wall. The brick tie module 44 comprises a thermally insulative flat washer 44a with a circular recess 44b in its outer surface having a rim that is sized to be engaged by the head 41c of insulated bolt 41. Spaced apart mounts 44c are provided on the washer 44a. A galvanized high tensile bent steel wire hook 44e is engageable with the mounts 44c and extends substantially perpendicular to a plane defined by the washer 44a. The hook 44e is adapted to be embedded in mortar between horizontal layers of the exterior brick cladding and provides enough flexibility for the expansion and contraction of the brick work. The brick tie module 44 may be moulded from a thermally insulative high performance composite material, such as a fibre glass reinforced plastics material or a fibre glass reinforced polyester. In some embodiments, the circular recesses 44b may be in the shape of a key hole with built in retaining clips to facilitate easy site assembly and removal of the brick tie module 44.

Figure 17:
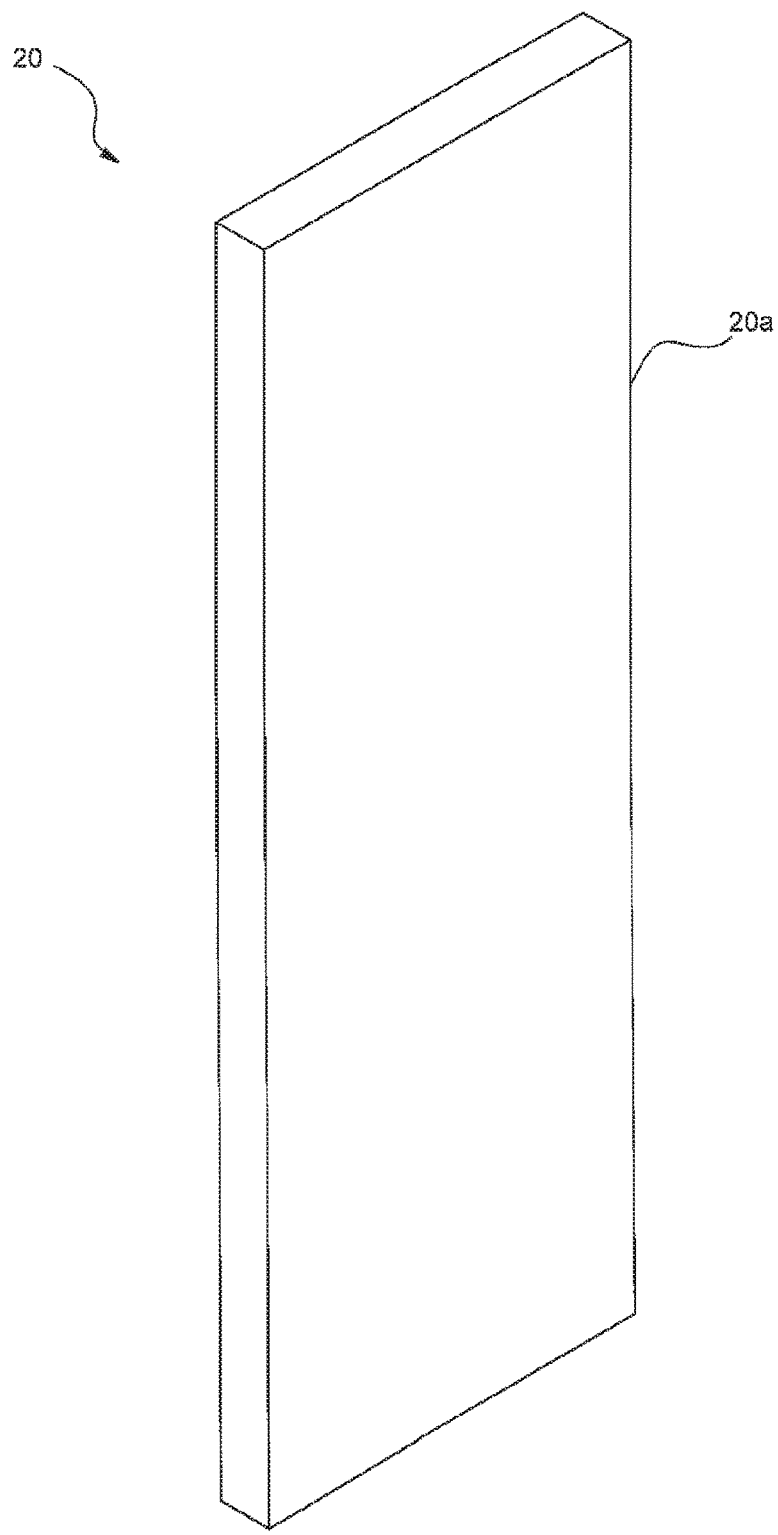
FIG. 17 is a perspective view of a thick single layer insulation module primarily for use with fixed frame member module of FIG. 3.

FIG. 17 shows a thick outer insulation module 20 for slidably engaging between the outer and inner flanges 30a1, 30a3 of laterally spaced apart frame members 30. Insulation module 20 comprises a plain rectangular sheet of rigid insulation 20a having a thickness of at least 100 mm (4 inches).

Figure 18:
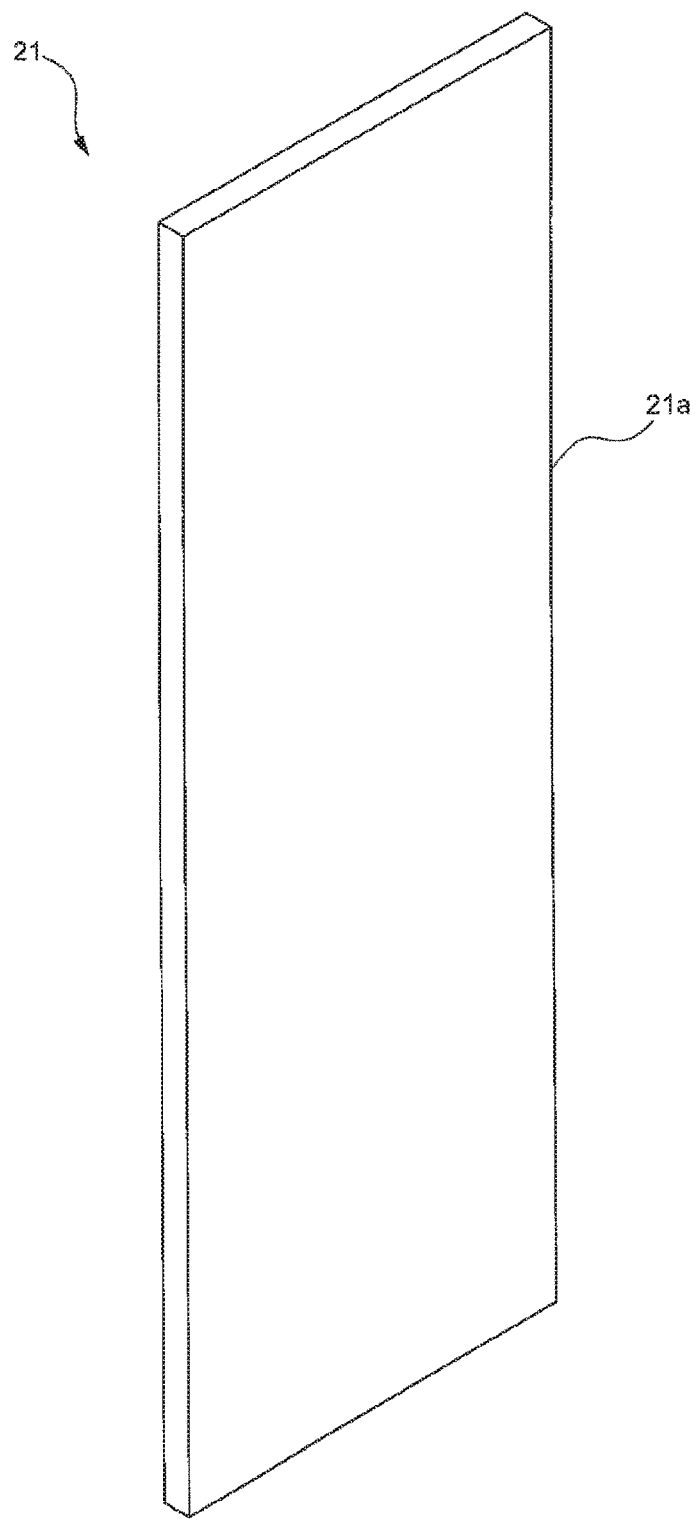
FIG. 18 is a perspective view of a thin single layer inner insulation module primarily for use with the fixed frame member module of FIG. 3.

FIG. 18 shows a thin inner insulation module 21 for slidably engaging between the outer and inner flanges 31a1, 31a3 of laterally spaced apart frame members 30. Insulation module 21 comprises a plain rectangular sheet of rigid insulation 21a having a thickness of at least 50 mm (2 inches).

Figure 19:
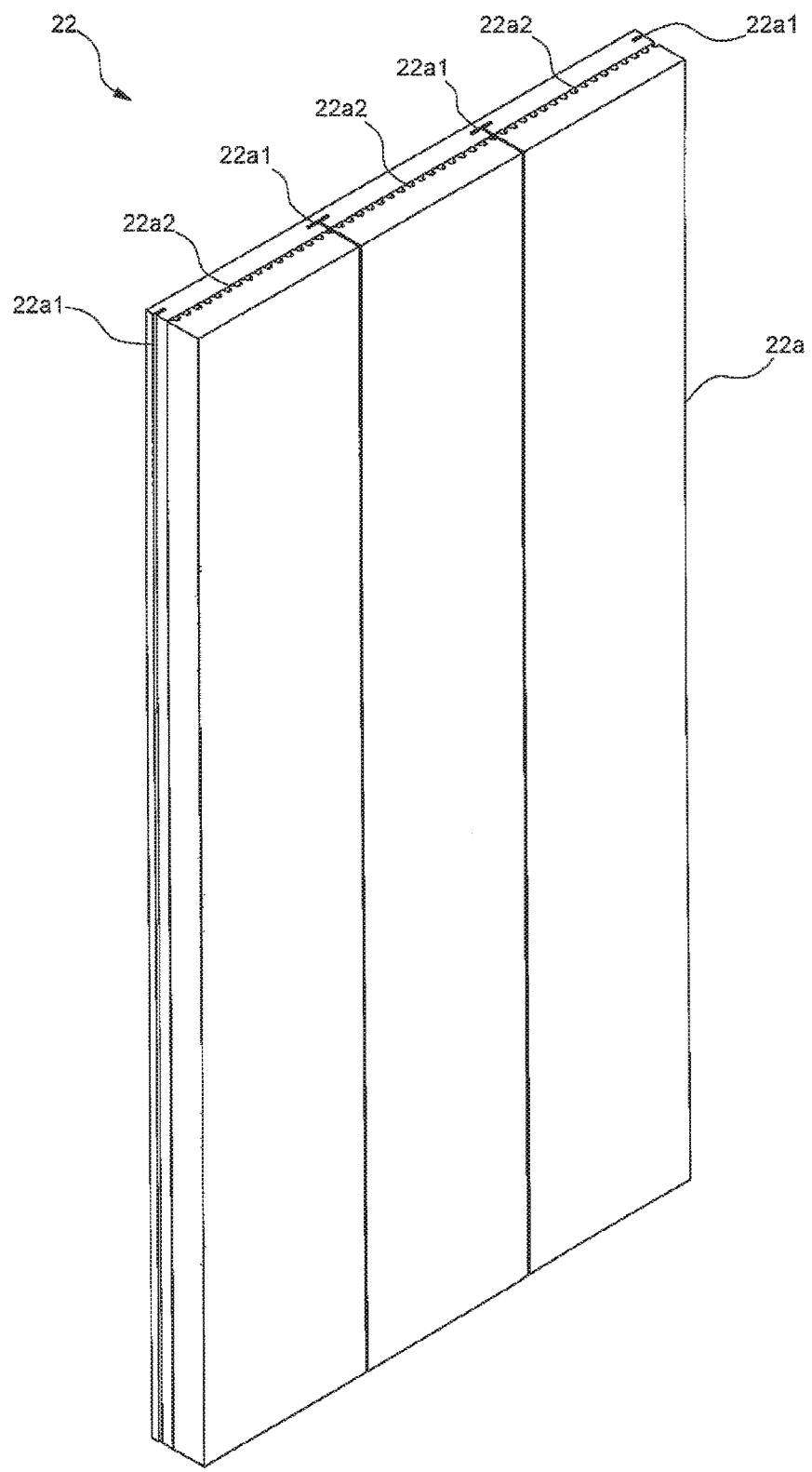
FIG. 19 is a perspective view of a thick outer insulation render module primarily for use with the fixed frame member module of FIG. 3 on a wall of the system of FIG. 1 to which a stucco or render based exterior finish is to be applied.

FIG. 19 shows a thick outer insulation render module 22. Module 22 comprises a plain rectangular sheet of rigid insulation 22a having a thickness of at least 150 mm (6 inches). The insulation 22a has slots 22a1 therein for slidably receiving flanges 30a1 of frame members 30, such that the flanges 30a1 do not interfere with the application of stucco and render based exterior finishes. Vertical slots 22a2 are also formed in the insulation 22a and act as drainage channels for the drainage of water or condensate, which may seep through the stucco or render based exterior finishes, to inhibit condensation and mould growth.

Figure 20:
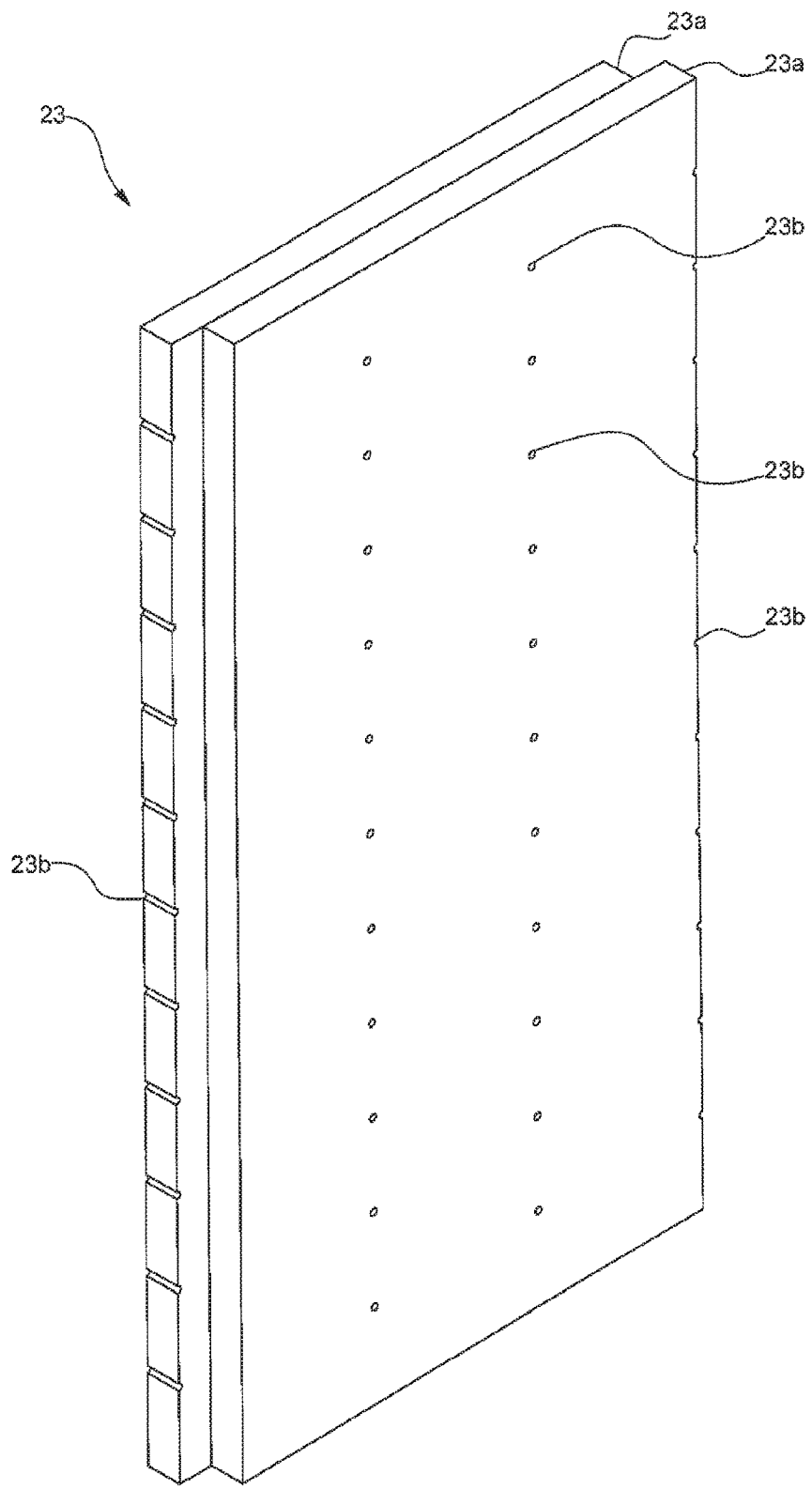
FIG. 20 is a perspective view of an extra thick multiple layer insulation module for use with the single or double variable frame member modules of FIGS. 4 and 5.

FIG. 20 shows a multiple layer insulation module 23 for use with the single or double variable frame members 31, 32. Insulation module 23 comprises several layers of plain rectangular sheets of rigid insulation 23a providing a total insulation thickness of from 100 mm to 300 mm (4 to 12 inches) or more. The insulation layers 23a are laterally offset from each other to inhibit air flow through module 23. The sheets 23a are pre-drilled with a regular pattern of holes 23b for receiving insulated bolts 41 used with frame member 30' and 30".

The insulation in modules 20, 21, 22 and 23 may be any very high r-value rigid sheet based insulation, such as expanded polystyrene, extruded polystyrene, polyisocyanurate (PIR), polyurethane, phenolic, acrogel or any other type of rigid insulation.

The present inventor has found that a U-Value of 0.11 W/(m²K) or an equivalent R-Value of R 9 can be achieved using a thickness of external building insulation as shown in the table below, consisting only of the material specified:

| Insulation Material | Thermal Conductivity (W/mK) | Insulation Thickness mm required for U = 0.11 W/(m²K) |
|---|---|---|
| EPS Expanded Polystyrene | 0.039 W/mK | 350 mm (14 Inches) |
| XPS Extruded Polystyrene | 0.033 W/mK | 300 mm (12 Inches) |
| Polyisocyanurate (PIR) | 0.022 W/mK | 200 mm (8 Inches) |

Figure 21:
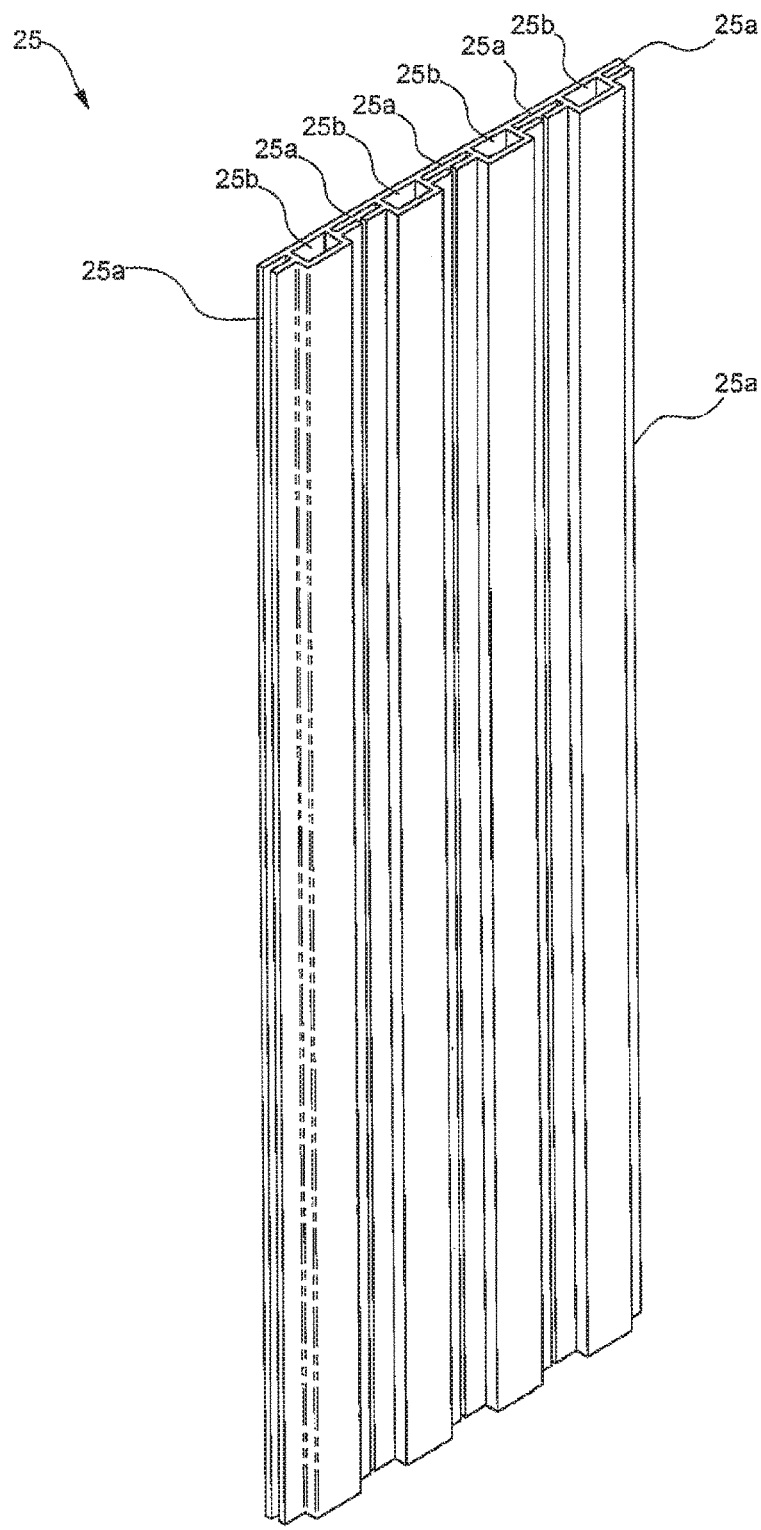
FIG. 21 is a perspective view of an extruded drywall module for use with the fixed frame member module of FIG. 3 or the single variable frame member module of FIG. 4.

FIG. 21 shows an extruded drywall module 25 for use with frame member modules 30, 30'. Module 25 includes T-slots 25a for slidably receiving the outer flanges 30a1, 30b1 of frame members 30, 30'. T-slots 25a also act as drainage channels for the drainage of water or condensate that may otherwise cause condensation and mould growth. Module 25 may be formed from mineral based dry wall materials, such as fiber cement, magnesium oxide, calcium silicate, or similar, which are extruded or fabricated to form a twin layer drywall sheet 25a. Extruded drywall modules 25 and insulation modules 20 may be installed as a composite inner or outer layer on frame member modules 30, 30' by inserting insulation modules 20 between flanges 30a1 and 30a3, and/or between flanges 30b1 and 30b3 and slidably engaging extruded drywall modules 25 with flanges 30a1 and/or 30b1, such that extruded drywall modules 25 protect insulation modules 20 and also act as an exterior cladding. The extruded drywall modules 25 may also be provided with built-in extruded ducts 25b that can act as a services cavity to facilitate installation of cables and pipes for electrical, communication, plumbing and gas services.

Figure 22:
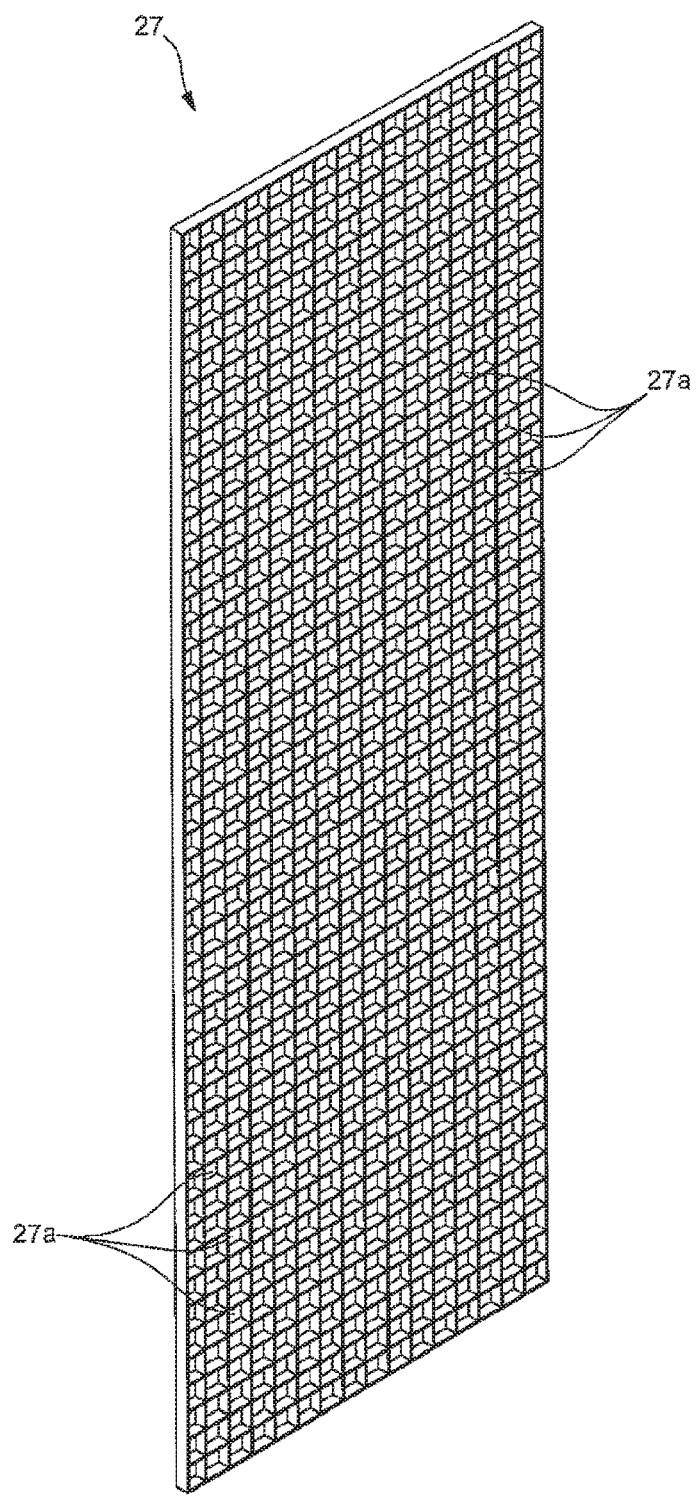
FIG. 22 is a perspective view of a removable form plate module for use with the fixed frame member module of FIG. 3 or the single variable frame member module of FIG. 4.

FIG. 22 shows a removable form plate module 27 in the form of a grid plate panel for use with frame member modules 30, 30' to act as a temporary formwork for uncured concrete. Module 27 comprises a matrix of square ribs 27a to further enhance its strength and rigidity. Module 27 may be moulded from a light weight but strong and inexpensive plastics material, such as recycled polypropylene or polyethylene. Alternatively the form plate module 27 may be made from mineral based materials, such as fiber cement, magnesium oxide, calcium silicate, or similar, and may be left in place to form a built-in services cavity with moderated thermal mass effect.

Figure 23:
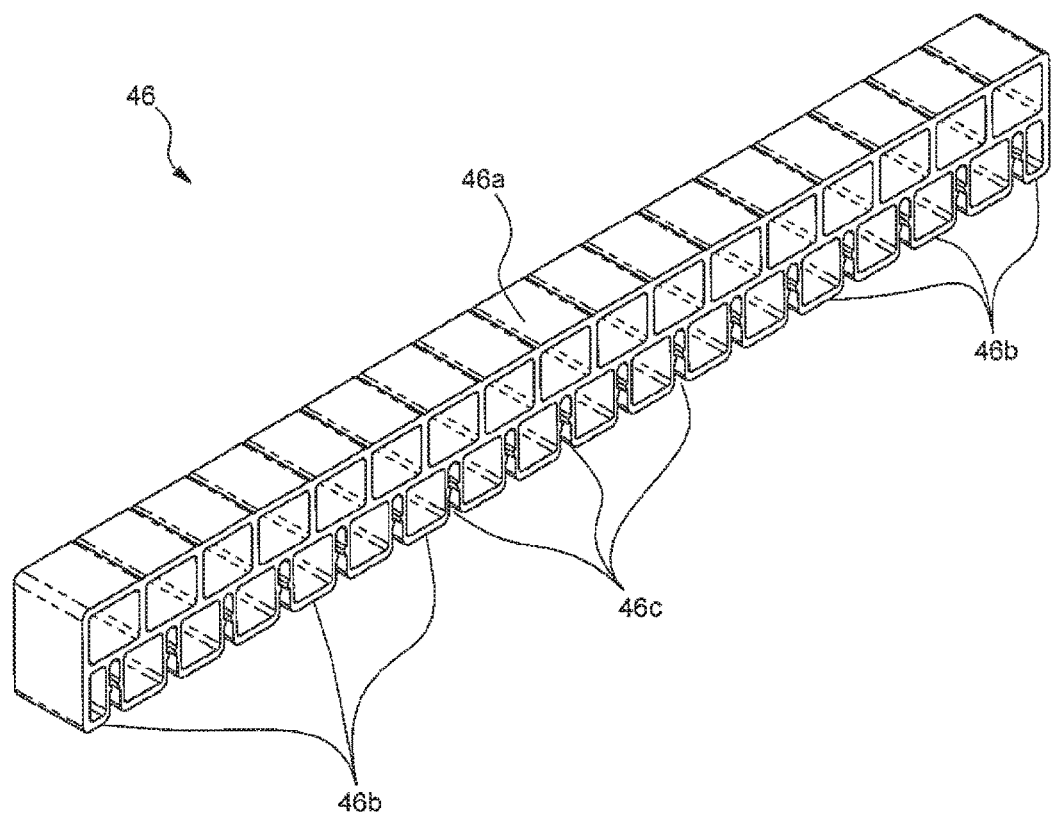
FIG. 23 is a perspective view of a form clip for positively engaging and holding the form plate module of FIG. 22.

FIG. 23 shows a removable form clip 46 for use with the removable form plate module 27. The form clip comprises an elongate spine 46a. Opposite ends of form clip 46 are sized to fit into rectangular apertures 30a5, 30b5 in the webs 30a2, 30b2 of frame member modules 30, 30'. The form clip 46 takes the form of a comb or rack, having a plurality of regularly spaced prongs 46b extending from the spine 46a and defining clips therebetween. Teeth 46c are formed on the clips. The outermost of the clips are snap-lockingly engageable with webs 30a2, 30b2 of frame member modules 30, 30' when the ends of the form clip 46 are inserted into the rectangular apertures 30a5, 30b5 of the frame member modules. The form clip 46 may be moulded from a light weight but strong and flexible plastics material, such as recycled polypropylene or polyethylene.

Figure 24:
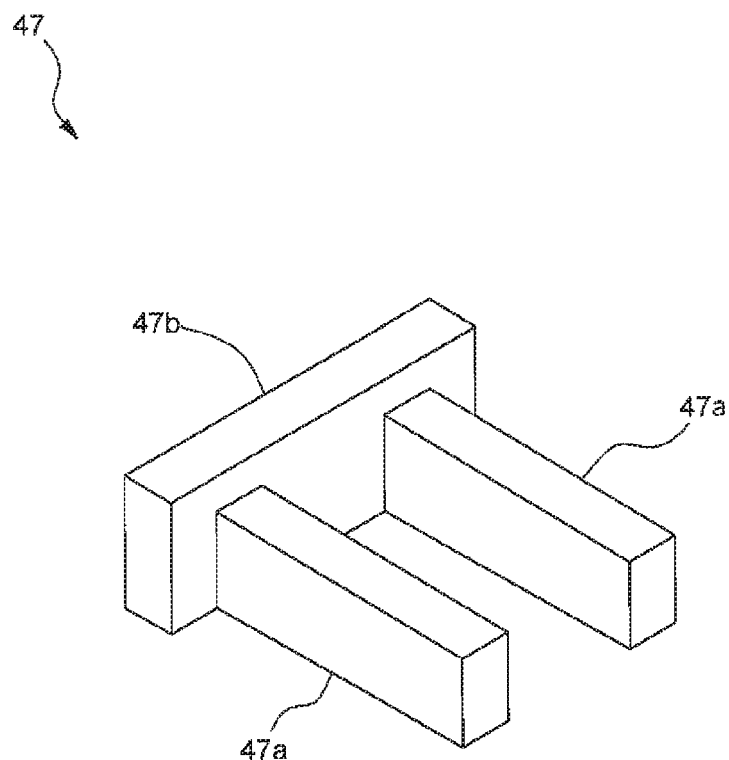
FIG. 24 is a perspective view of a form wedge for positively engaging and holding the form plate module of FIG. 22.
Figure 25:
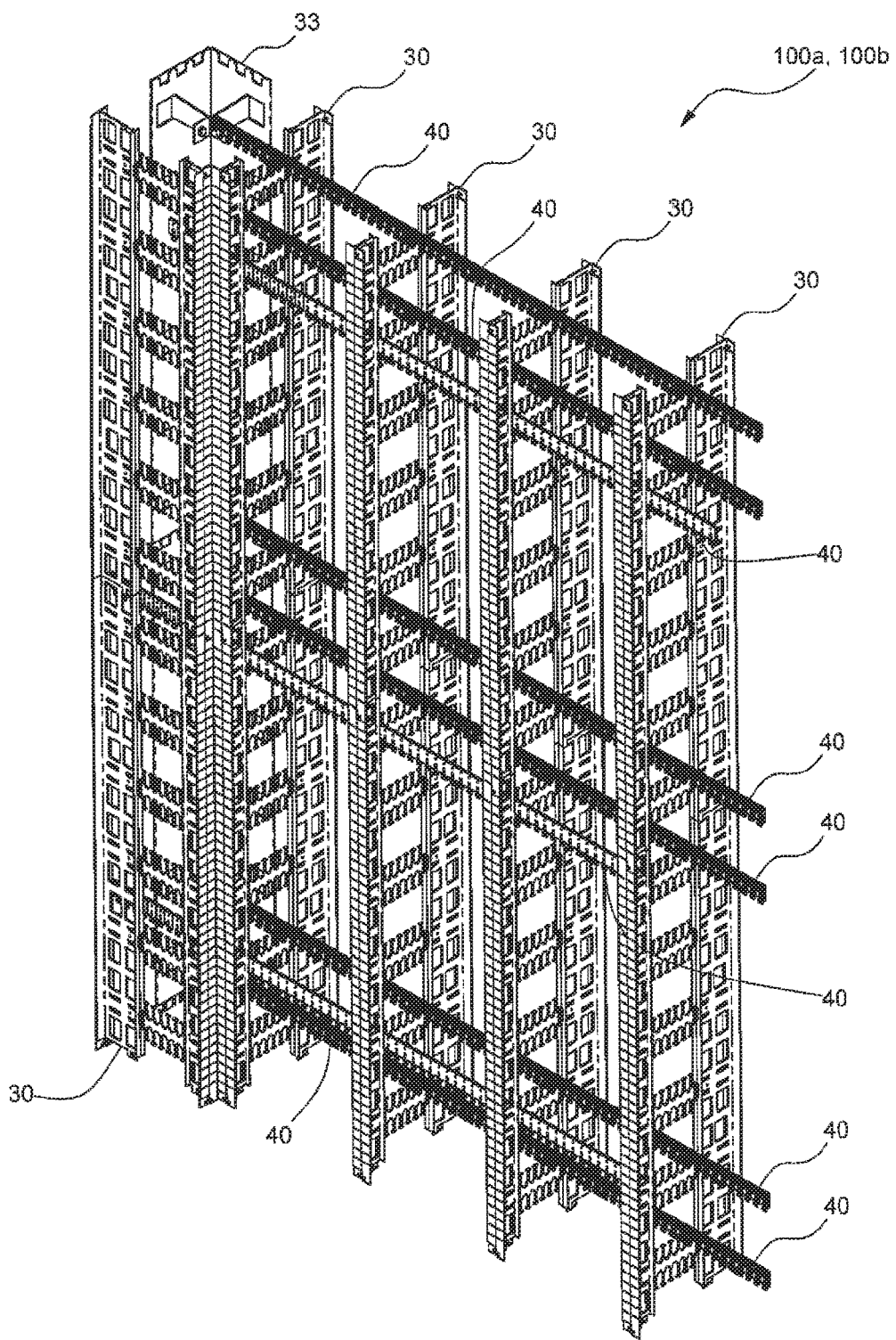
FIG. 25 is a perspective view of several fixed frame member modules of FIG. 3, a fixed corner module of FIG. 6 and lateral cross ties of FIG. 8 assembled together to create a modular wall frame assembly ready for the installation of the desired outer and inner layers.

FIG. 24 shows a removable form wedge 47 for use with the removable form plate module 27, such as shown in wall 100b in FIGS. 1 and 27. Form wedge 47 comprises a spaced apart pair of tapered pins 47a, which are interconnected by a head 47b. The pins 47a can be aligned with and hammered into the apertures 30a6, 30b6 in the webs 30a2, 30b2 of frame member modules 30, 30' to anchor the removable form plate module 27 against the inner flanges 30a3, 30b3. Form wedges 47 may be moulded from a light weight but strong plastics material, such as recycled polypropylene or polyethylene.

Figure 32:
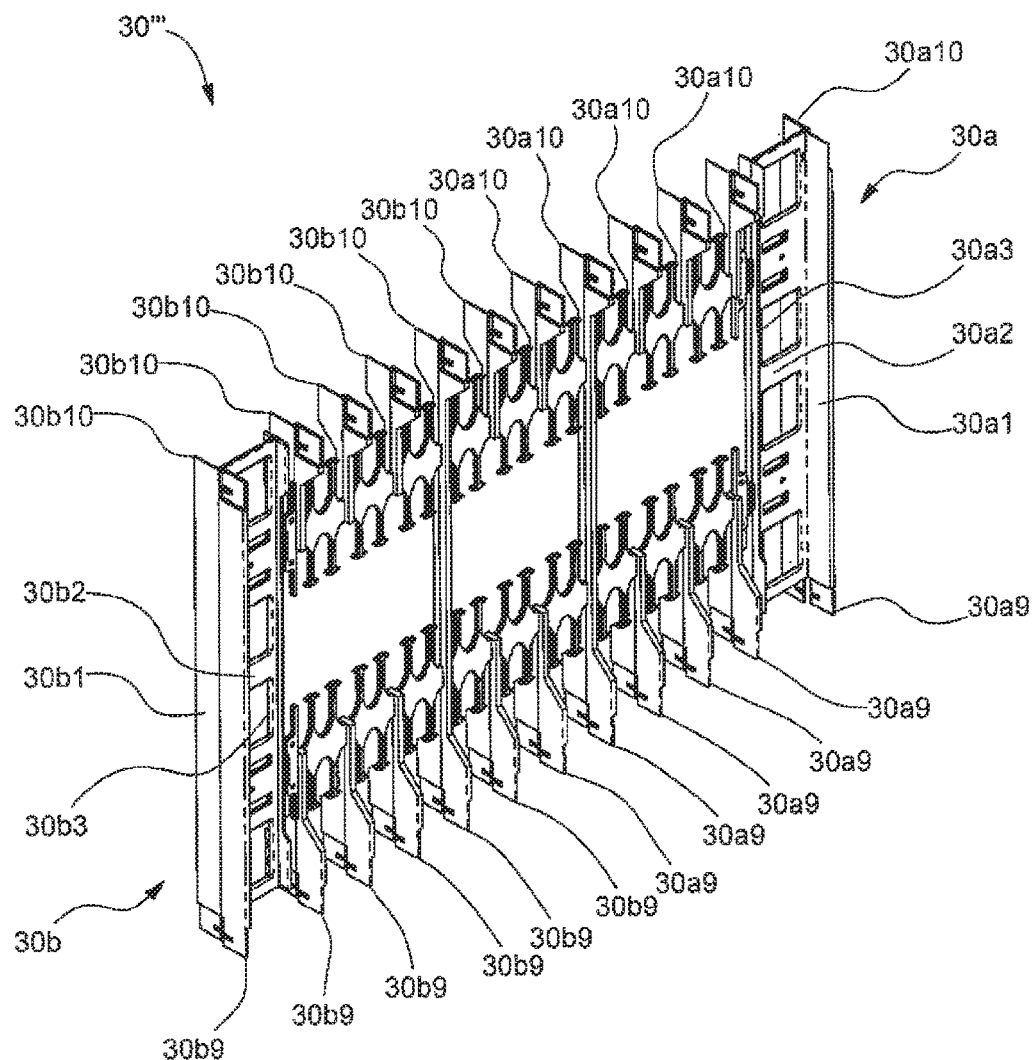
FIG. 32 is a perspective view of a footing module for the creation of super insulated structural concrete walls with integral structural concrete footings.
Figure 33:
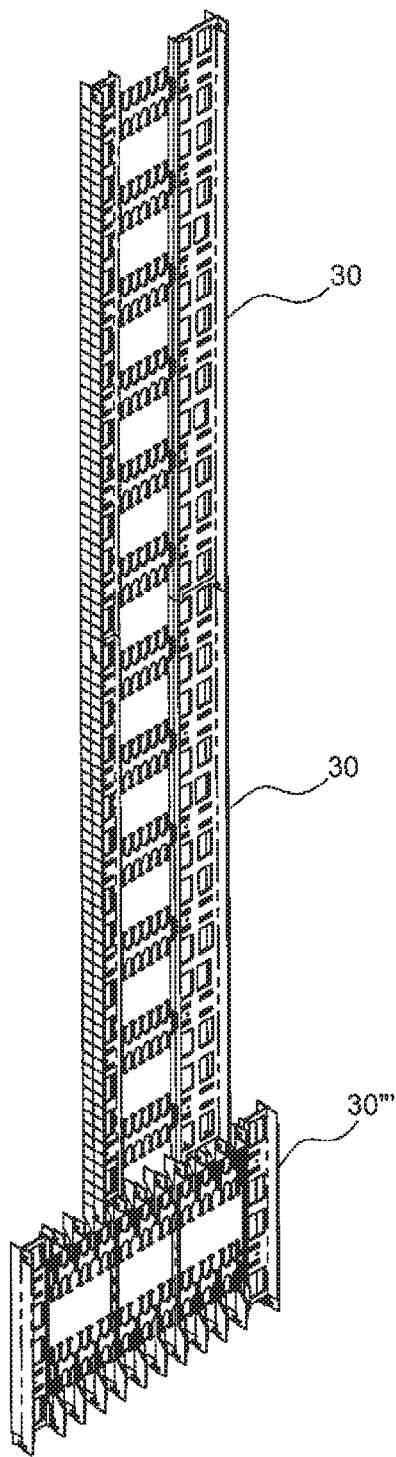
FIG. 33 is a perspective view of the footing stud module of FIG. 32 shown connected to a frame member formed from two of the fixed frame member modules of FIG. 3.

FIG. 32 shows a footing member module 30''' engageable with frame member modules 30, 30', 30" to facilitate forming an integrated footing and wall frame assembly as shown in FIG. 33. Footing module 30''' is similar in concept to frame member module 30, where corresponding reference numerals indicate corresponding features with corresponding functionality. Footing module 30''' is about one third the height and about three times the width of frame member modules 30, 30', 30". Footing module 30''' includes a plurality of pairs of top and bottom connectors 30a9, 30a10, 30b9, 30b10, each of which pairs is selectively snap-lockingly engageable with the top and bottom connectors of the frame member module 30, 30', 30", to allow adjustment of the position of the frame member modules 30, 30', 30" on the footing module 30'''. Footing module 30''' is adapted to receive an outer layer of insulation modules 21 and an inner layer of insulation modules 21, which act as built-in footing edge insulation to create a super insulated concrete footing to inhibit migration of heat from a structure's foundations and also to inhibit frost rise.

Figure 34:
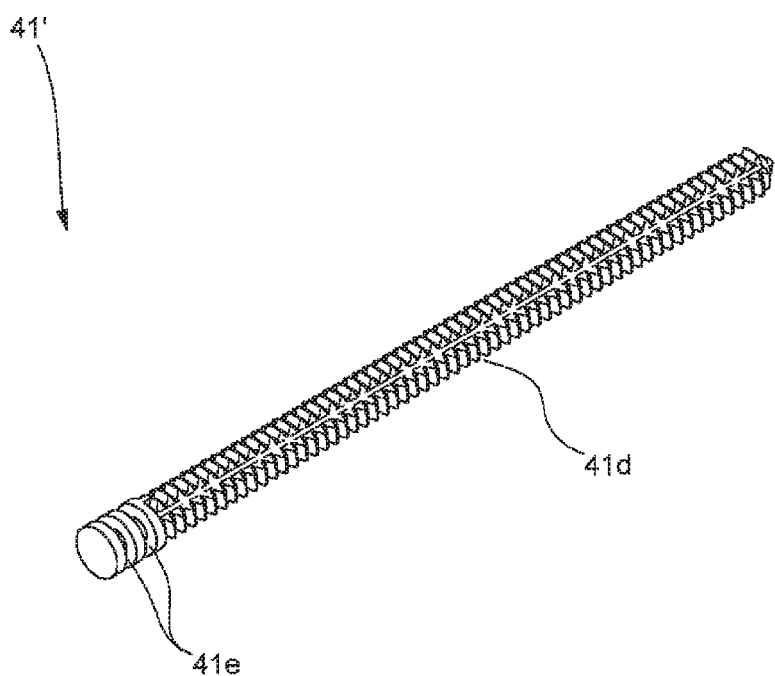
FIG. 34 is a perspective view of an alternative embodiment of an insulated composite bolt for the single and double variable frame member modules of FIGS. 4 and 5.

FIG. 34 shows an alternative embodiment of an insulated threaded bolt 41' that can be used instead of insulated threaded bolt 41 of FIG. 10. Like bolt 41, bolt 41' comprises a threaded shaft with a structural core formed from high strength steel and a thermally insulative sheath 41b of plastics material formed around the core. Bolt 41', however, has flexible serrated "threads" 41d that allow bolt 41' to be push-fitted in place using a hammer, thereby saving on assembly time. The bolt 41' also has an integral circular head with built-in twin recesses 41e for engaging twin T-slots 42i of the extruded baton module 42' of FIG. 35.

Figure 35:
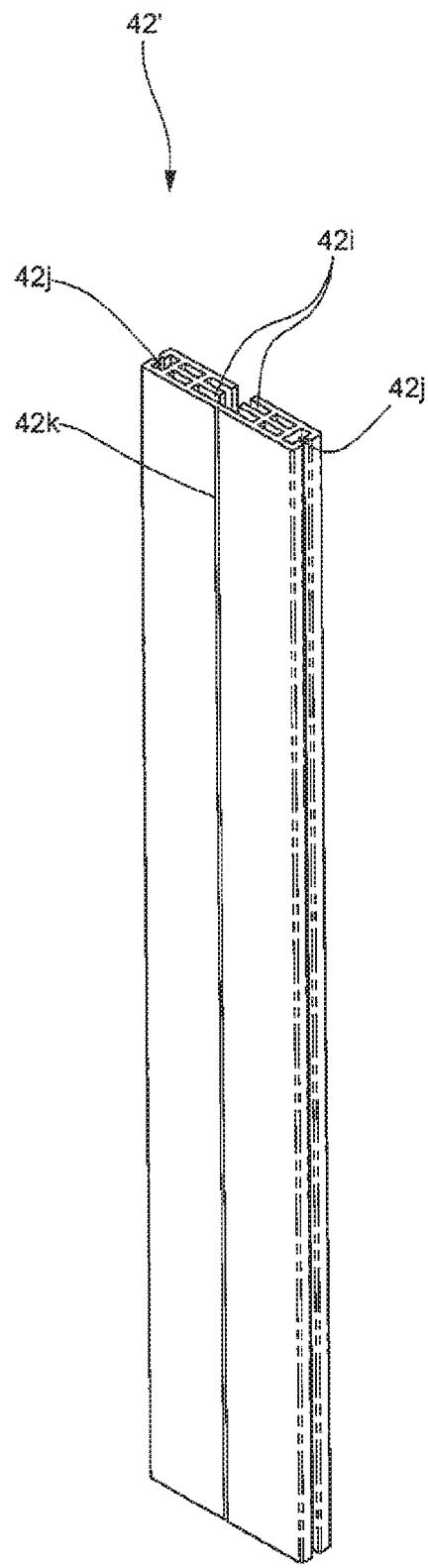
FIG. 35 is a perspective front view of an alternative embodiment of an insulated composite baton for the single and double variable frame member modules of FIGS. 4 and 5.

FIG. 35 shows an alternative embodiment of an insulated baton module 42' that can be used instead of insulated baton module 42 of FIG. 12. Baton module 42' has built-in extruded twin T-slots 42i which engage with the twin recesses 41e on the head 41e of the insulated threaded bolt 41' of FIG. 34. The baton module 42' may be extruded from a thermally insulative high performance composite material, such as a fibre glass reinforced plastics material or a wood reinforced plastics material and may also be provided with additional side T-slots 42j for engaging small clips and ties which may be used in construction. In some embodiments, the baton module 42' may additionally be reinforced with a structural spine in the form of a high strength thin sheet steel or fibreglass reinforcement channel.

Figure 36:
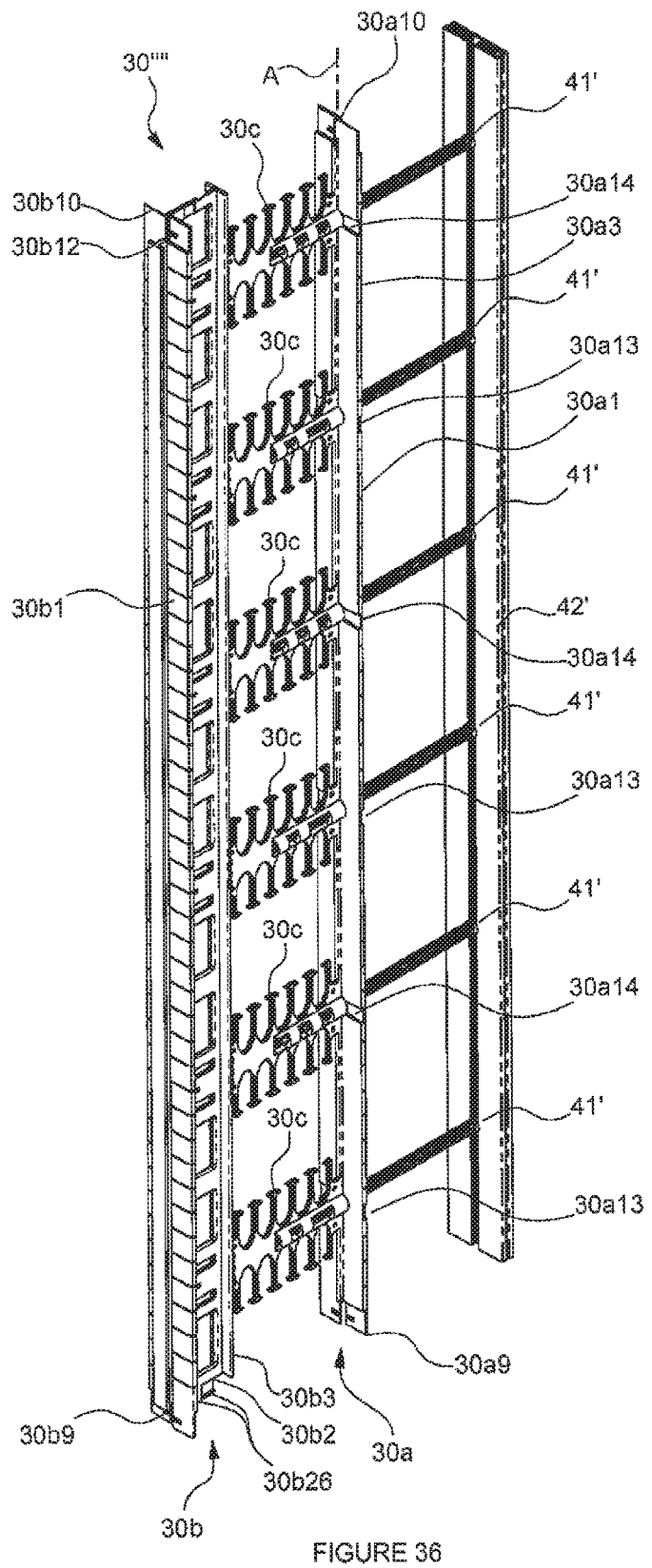
FIG. 36 is a perspective view of an alternative embodiment of a single variable frame member module of the system of FIG. 1 for receiving multiple layers of outer insulation defining a thicker outer insulating layer along with a single thinner inner insulating layer.
Figure 37A:
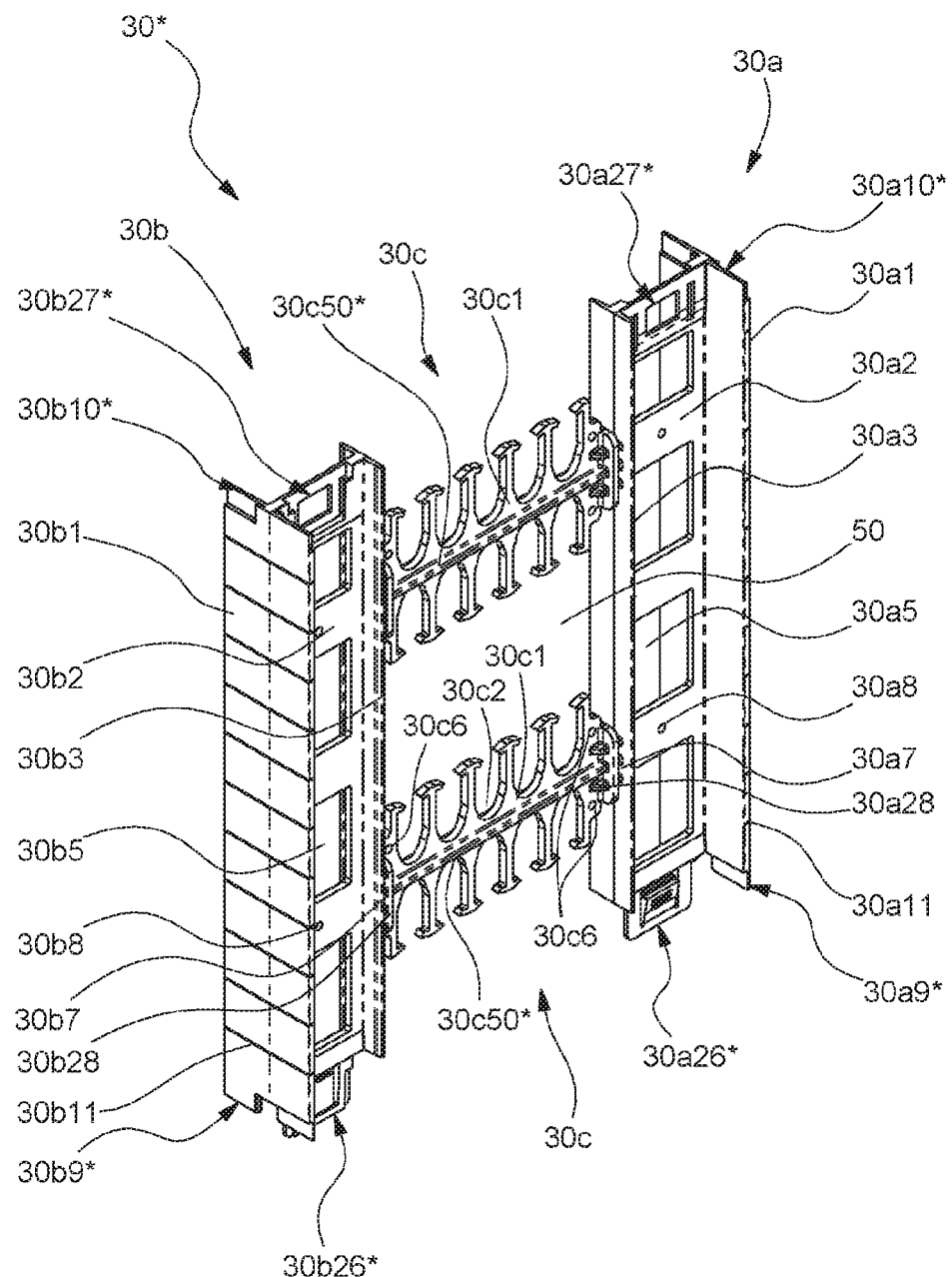
FIGS. 37a-37d are perspective views of an alternative embodiment of a fixed frame member module of the system of FIG. 1 for receiving a single thicker outer insulating layer and a single thinner inner insulating layer.
Figure 37B:
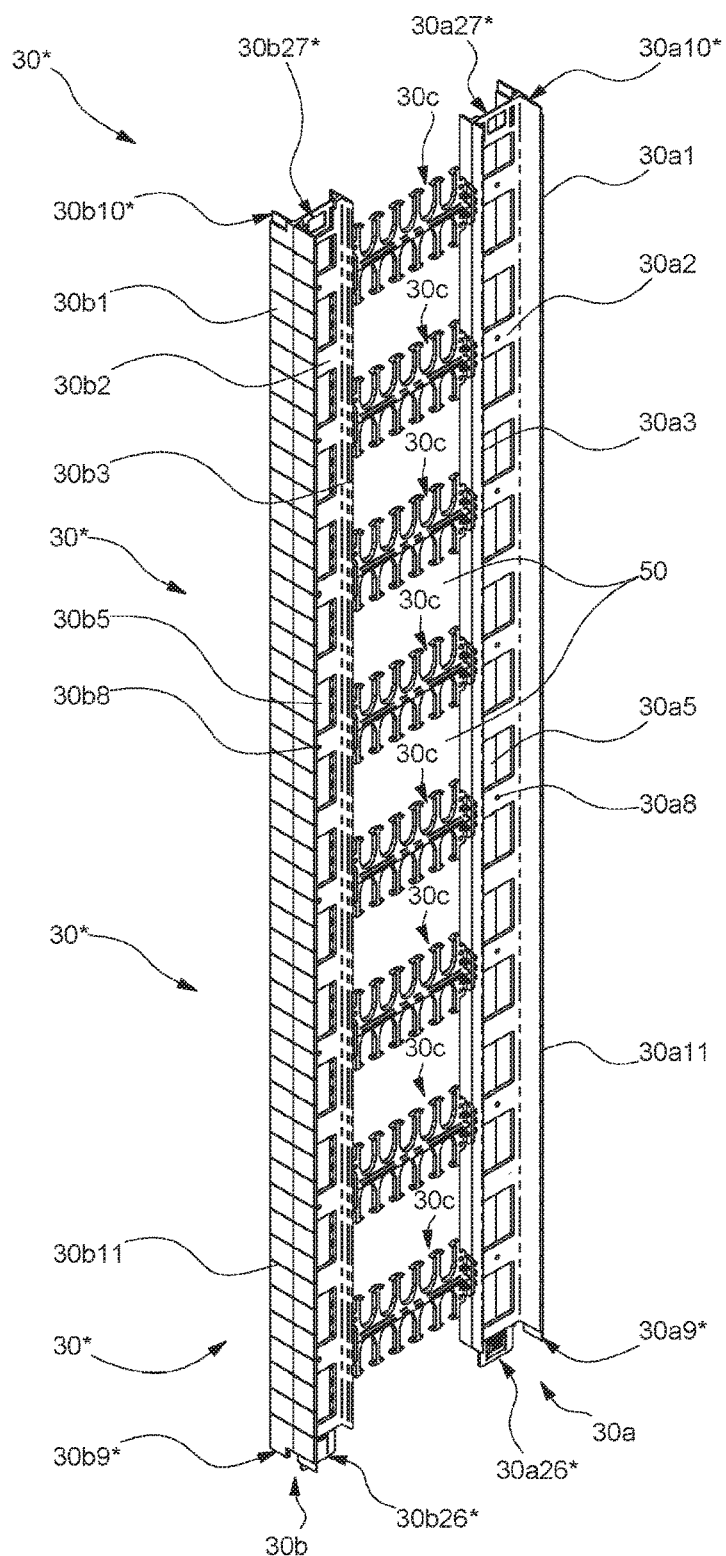
Figure 37C:
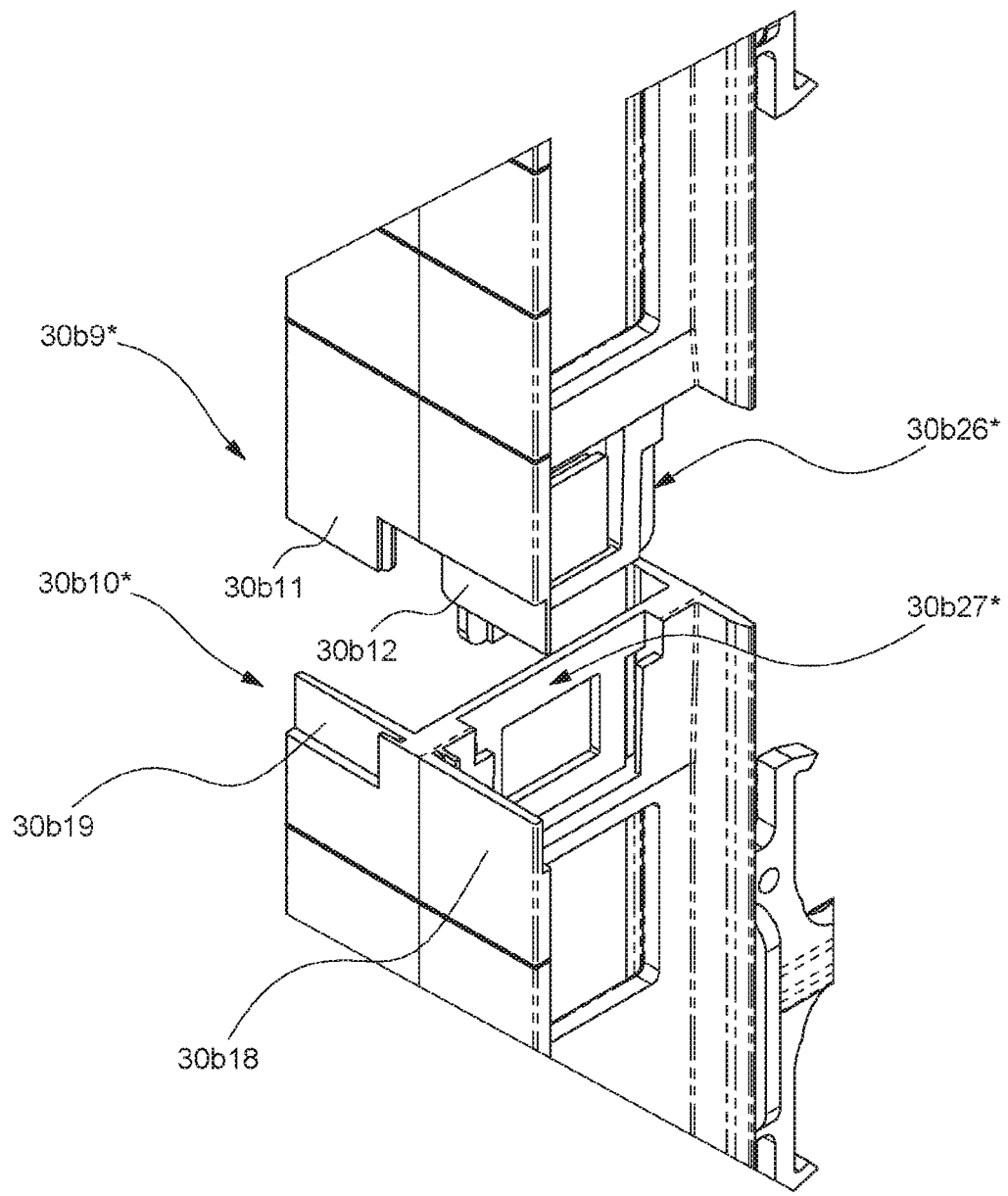
Figure 37D:
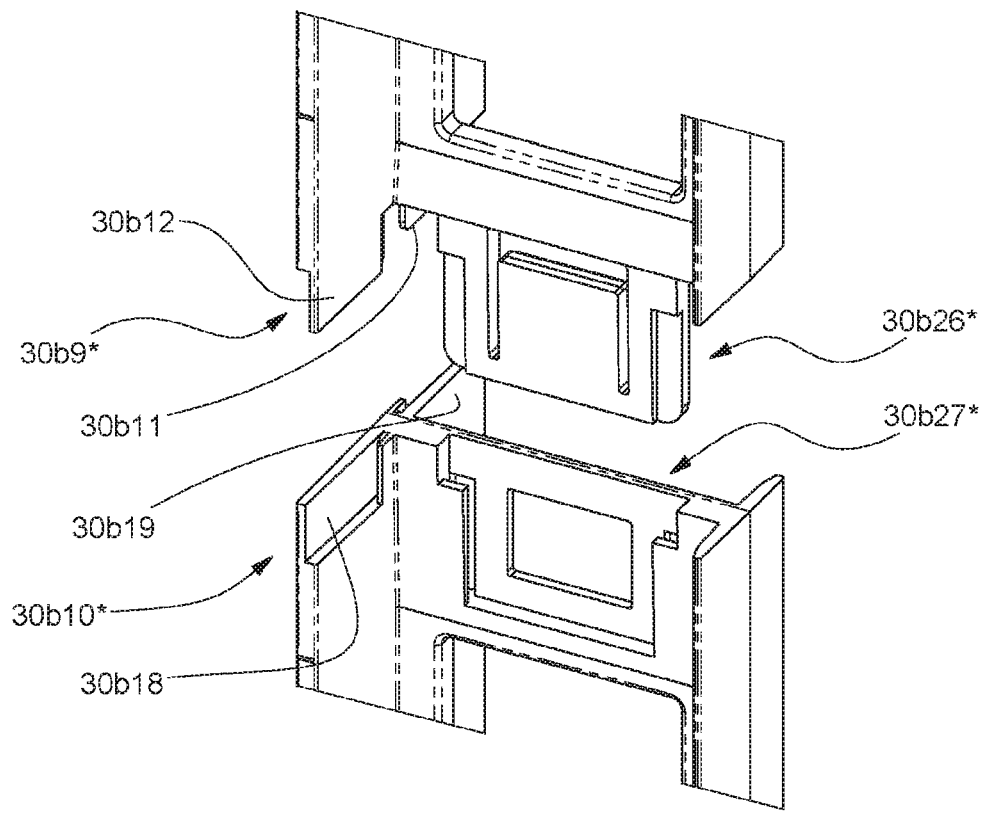

FIG. 36 is a perspective view of an alternative embodiment of a single variable frame member module 30'''' for use in the system of FIG. 1. Frame member module 30'''' has many features in common with the single variable stud module 30' of FIG. 4, where corresponding reference numerals indicate corresponding features with corresponding functionality. In frame member module 30'''', however, the insulated threaded bolt 41 is replaced by the threaded bolt 41' of FIG. 34 and the insulated baton module 42 is replaced by the insulated baton module 42' of FIG. 35. The single variable frame member module 30'''' also has an additional small T-flange 30b12 that projects from the outer flange 30b1 and that can be used for engaging thin drywall sheets and inner linings.

FIGS. 37a-37d show an alternative embodiment of a fixed frame member module 30' for use in the system of FIG. 1. Frame member module 30* has many features in common with the single variable stud module 30 of FIGS. 3 and 3g, where corresponding reference numerals indicate corresponding features with corresponding functionality. In frame member module 30', however, the coupling formations 30a9, 30b9, 30a26, 30b26, 30a10, 30b10 are replaced with coupling formations 30a9*, 30b9*, 30a26*, 30b26*, 30a10*, 30b10*, 30a27*, 30b27*. Coupling formations 30a9*, 30b9*, 30a10*, 30b10* are relatively similar to coupling formations 30a9, 30b9, 30a10, 30b10, apart from being shorter, tongue and groove engagement being provided between coupling formations 30b9* and 30b10*, and between coupling formations 30a9* and 30a10*, and the lateral locking ribs 30b20 and 30b21 and slots 30b13 and 30b14 being omitted. Instead, interconnection between adjoining modules is provided primarily by coupling formations 30a26*, 30b26*, 30a27*, 30b27*, which are substantially identical to coupling formations 33a4, 33b4, 33a5, 33b5 of the corner securing modules 33, and operate in the same manner. Also, in frame member module 30*, the web 30c1 of the tie members 30c is provided with a strengthening rib 30c50*. It will be appreciated that interconnection by coupling formations 30a26*, 30b26*, 30a27*, 30b27* facilitates relatively simple assembly and disassembly of the frame member modules 30* by hand, without the need for tools. Also, moulding of the frame members 30* is simplified due to the coupling formations 30a26*, 30b26*, 30a27*, 30b27* being located in the line of opening of the mould for the frame members. Whilst not illustrated, it will be appreciated that coupling formations 30a9, 30b9, 30a10, 30b10, 30b26 of modules 30', 30'', 30''' can also be substituted with the respective coupling formation 30a9*, 30b9*, 30a10*, 30b10*, 30a26*, 30b26*.

It will be appreciated that when a plurality of wall frames, each formed from frame member modules 30, 30', 30'', 30'''' . . . or 30* interconnected by cross ties 40, are connected with corner securing modules 33, 33' as shown in FIG. 2, a self-reinforcing and self-standing interlocked grid frame assembly 200 is defined. When inner and outer layers are installed in each of the wall frames, as shown in FIG. 1, stability is even further enhanced. Accordingly, the need for stabilisation using external stays or props during pouring of a concrete core in space 15, as is common in prior art systems, is eliminated or at least greatly reduced.

It will also be appreciated that the single and double variable frame member modules 30', 30'', 30''' facilitate the use of different thicknesses and/or types of insulation on the outside and inside of the concrete core, which facilitates optimisation of the solar passive design of a building based on the solar orientation of individual walls and the external climate. Examples of such optimisation are discussed below.

In wall 100a, a majority of the total insulation thickness is shifted to the outside of the wall, due to the combination of thicker insulation module 20 on the outside with thinner insulation module 21 on the inside, to reduce heat energy transmission to the concrete core of the wall from the exterior environment. The provision of the thinner insulation module 21 moderate transfer of heat from the concrete core to the interior of the structure. This configuration may be used on walls with good solar orientation (e.g. southern walls in the Northern Hemisphere and northern walls in the Southern Hemisphere) in extreme climates.

In wall 100b, the total insulation thickness is provided on the outside of the wall to reduce heat energy transmission to the concrete core of the wall from the exterior environment. This configuration may be used on walls with good solar orientation (e.g. southern walls in the Northern Hemisphere and northern walls in the Southern Hemisphere) in non-extreme climates, or on walls with poor (e.g. northern walls in the Northern Hemisphere and southern walls in the Southern Hemisphere) or moderate (e.g. eastern or western walls) solar orientation in more extreme climates, where moderation of transfer of heat from the concrete core to the interior of the structure is not required.

In wall 100c, a dual external insulation layer is provided on the outside of the wall, with no insulation layer provided on the inside, to reduce heat energy transmission to the concrete core of the wall from the exterior environment. This configuration may be used on walls with good solar orientation (e.g. southern walls in the Northern Hemisphere and northern walls in the Southern Hemisphere) in more extreme climates, or on other walls in highly extreme climates, where moderation of transfer of heat from the concrete core to the interior of the structure is not required.

In wall 100d, dual insulation layers are provided on both the outside and inside of the wall, to reduce heat energy transmission to the concrete core of the wall from the exterior environment and moderate the transfer of heat from the concrete core to the interior of the structure. This configuration may be used in highly extreme climates.

It will be appreciated that the present system 100 facilitates construction of a composite structure that takes advantage of the exceptional structural strength and thermal mass of concrete and the heat insulating effect of thermal insulation to provide a structure that is both structurally strong and exceptionally energy efficient. The system 100 also simplifies construction and reduces construction costs by using the insulation layers as formwork for the concrete core and reducing the need for props or stays to support the walls during curing of the concrete core by interconnecting the various components of the system 100. The components of the system 100 have also been designed for economical manufacture.

The elimination of thermal bridging by use of insulated bolts 41, 41', insulated baton modules 42, 42', insulated render washers 43 and insulated brick ties 44, along with a reduction in gaps in the outer and inner layers formed by insulation modules 20-23, which provides added protection from rain and wind, facilitates an increase in the overall r-value of a structure and increases the thermal mass capacity of the concrete core by better isolating it from extremes in exterior temperature and other weather conditions.

The embodiments of super insulated structural concrete walls disclosed above with reference to the drawings have a number of advantages as follows:

Strength: The reinforced concrete core provides great structural strength and impact resistance against cyclones, high winds and other natural disasters, ensuring building occupants are safe and secure in almost any situation.

Energy Efficiency: The continuous outer and inner layers of insulation virtually eliminate air gaps, which greatly reduces air infiltration into a building. The thermally insulative bolts 41, 41', baton modules 42, 42', render washers 43 and brick ties 44 prevent thermal bridging. Accordingly, presently illustrated system 100 facilitates providing high r-value super insulation to a building. The excellent insulation design, combined with the thermal mass properties of the concrete core, facilitate thermal energy being stored in the concrete core and released to the building interior, moderated by an inner insulation layer if necessary, to optimise the energy performance of the building by regulating the temperature of the building interior and thereby greatly reducing energy usage costs that may otherwise be required for heating or cooling. The energy efficiency benefits of insulated thermal mass concrete wall systems are discussed in more detail in the Applicant's earlier International Patent Publication No. WO 2011/134008, the disclosure of which is incorporated herein by reference.

Ability to Mix and Match: The ability to mix and match various components of the system 100 gives architects, engineers, builders and owners the freedom to construct a super insulated thermal mass concrete structure that best suits their design and site climatic conditions, and facilitates providing the structure with an excellent energy efficiency at an economical cost. For example, the system 100 facilitates the use of different thicknesses and/or types of insulation on the outside and inside of the concrete core, which facilitates optimisation of the solar passive design of a building based on the solar orientation of individual walls and the external climate.

Fire Resistance: The steel reinforced concrete core is non combustible, providing very high fire resistance and improving safety for building occupants. The materials used in insulation modules 20-23 are non toxic and have fire retardant properties.

Acoustic Performance: The reinforced concrete core, along with the layers of super insulation, together act as an effective sound barrier and filter out unwanted noise, dampen sound vibrations from unwanted outside noise, thereby improving occupant comfort.

Ease of construction: The modular design of the presently disclosed system facilitates economical manufacture and erection on site. Ease of construction is also facilitated by reducing or eliminating the need for stays or props to stabilise the wall during pouring and curing of the concrete core.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A system for constructing a concrete structure, the system comprising:
   at least four interconnected wall frames for at least four respective walls, each of the wall frames comprising:
      a plurality of frame members spaced apart along the length of the respective wall, each of the frame members extending substantially the full height of the respective wall and comprising:
         an elongate outer member defining a longitudinal axis, the outer member comprising a flange extending between its opposite longitudinal ends, and adapted to have an outer layer connected thereto;
         an elongate inner member substantially parallel to the outer member and adapted to have an inner layer connected thereto;
         a plurality of tie members each having a first end for connection to the inner member and a second end for connection to the outer member, the tie members extending in a transverse direction between the outer and inner members at longitudinally spaced apart locations to interlock the outer and inner members together in a spaced apart, substantially parallel relationship, wherein at least one opening is defined between the tie members and the outer and inner members, the at least one opening being sized to permit flow therethrough of uncured concrete poured between the outer and inner layers to form a concrete core;
      at least one outer anchor associated with the outer member for securing the outer layer relative to the outer member; and
      at least one inner anchor associated with the inner member for securing the inner layer relative to the inner member substantially parallel to the outer layer; and
   cross ties extending between the spaced apart frame members to secure the frame members together, the cross ties: (i) being distinct from reinforcement for the concrete core; and (ii) positively engaging the spaced apart frame members to secure the frame members together against movement toward or away from one another;
   at least one corner securing member connecting the ends of adjoining said walls of the structure to form a corner therebetween and resist relative movement between the walls when the concrete core is poured; and
   wherein the frame members of at least one of the wall frames comprise:
      longitudinally spaced apart apertures in the flange of the outer member,
      elongate connectors having one end engaged in the spaced apart apertures and an opposite end extending from the outer member for connection to an associated said at least one outer anchor of the at least one of the wall frames to connect the outer member to the associated said at least one outer anchor, the extent of engagement of the connectors in the apertures being adjustable to facilitate adjustment of a spacing between the flange of the outer member and the associated said at least one outer anchor.

2. The system according to claim 1, wherein the cross ties engage the tie members of the frame members to releasably fixedly connect the cross ties to the tie members.

3. The system according to claim 1, wherein the at least one corner securing member comprises an outer corner securing element having a pair of elongate elements oriented relative to each other at a desired angle of the corner.

4. The system according to claim 3, wherein the at least one corner securing member comprises an inner corner securing element spaced inwardly of the outer corner securing element, the inner corner securing element comprising pair of elongate elements oriented relative to each other at a desired angle of the corner.

5. The system according to claim 1, wherein the cross ties of adjoining said wall frames engage the corner securing member that secures the corner between the adjoining said wall frames to releasably fixedly connect the frame members of the adjoining wall frames to the corner securing member.

6. The system according to claim 1, wherein each said wall frame comprises an outer layer connected to its outer members.

7. The system according to claim 6, wherein the outer layer comprises a thermally insulating layer formed from a plurality of sheets that together extend along the full length of the wall.

8. The system according to claim 7, wherein the outer layer of said at least one of the walls frames has a thickness of at least 300 mm (12 inches).

9. The system according to claim 1, wherein each said wall frame comprises an inner layer connected to its inner members.

10. A frame member for interconnecting an outer layer and an inner layer in a thermal mass concrete wall in which the outer layer, the inner layer and the frame member extend substantially the full height of the wall, the frame member comprising:
- an elongate outer member comprising a flange defining a longitudinal axis, the outer member comprising a flange extending between its opposite longitudinal ends, and adapted to have the outer layer connected thereto;
- an elongate inner member substantially parallel to the outer member and adapted to have the inner layer connected thereto;
- a plurality of tie members each having a first end for connection to the inner member and a second end for connection to the outer member, the tie members extending in a transverse direction between the outer and inner members at longitudinally spaced apart locations to interlock the outer and inner members together in a spaced apart, substantially parallel relationship, wherein at least one opening is defined between the tie members and the outer and inner members, the at least one opening being sized to permit flow therethrough of uncured concrete poured between the outer and inner layers to form a concrete core;
- at least one outer anchor associated with the outer member for securing the outer layer relative to the outer member; and
- at least one inner anchor associated with the inner member for securing the inner layer relative to the inner member substantially parallel to the outer layer;
- longitudinally spaced apart apertures in the flange of the outer member,
- elongate connectors having one engaged in the spaced apart apertures and an opposite end extending from the outer member for connection to an associated said at least one outer anchor to connect the outer member to the associated said at least one outer anchor, the extent of engagement of the connectors in the apertures being adjustable to facilitate adjustment of a spacing between the flange of the outer member and the associated said at least one outer anchor.

11. The frame member according to claim 10, wherein the spacing between the flange of the outer member and the associated said at least one outer anchor is adjustable to at least 100 mm (4 inches).

12. The system frame member according to claim 10, wherein the spacing between the flange of the outer member and the associated said at least one outer anchor is adjustable to at least 300 mm (12 inches).

13. The system frame member according to claim 12, wherein the spacing between the flange of the outer member and the associated said at least one outer anchor is adjustable between 100 mm (4 inches) and at least 300 mm (12 inches).

14. The frame member according to claim 10, being formed from a plurality of frame member modules connected together longitudinally to form an elongate frame member made up of the frame member modules.

15. The frame member according to claim 14, wherein coupling formations are provided at longitudinal ends of the frame member modules to facilitate their interconnection.

16. The frame member according to claim 10, comprising a footing member connectable to a longitudinal end of the frame member to facilitate forming a concrete footing for the wall and to facilitate integrating the wall and footing, said footing member comprising: an elongate outer member that extends parallel to the longitudinal axis when the footing member is connected to the longitudinal end of the frame member, the outer member of the footing member adapted to have an outer layer connected thereto; an elongate inner member substantially parallel to the outer member and adapted to have an inner layer connected thereto; a plurality of tie members each having a first end for connection to the inner member of the footing member and a second end for connection to the outer member of the footing member, the tie members of the footing member extending in a transverse direction between the outer and inner members of the footing member at longitudinally spaced apart locations to interlock the outer and inner members of the footing member together in a spaced apart, substantially parallel relationship, wherein at least one opening is defined between the tie members of the footing member and the outer and inner members of the footing member, the at least one opening of the footing member being sized to permit flow therethrough of uncured concrete poured between the outer and inner layers of the footing member to form a concrete core of the footing; at least one outer anchor associated with the outer member of the footing member for securing the outer layer of the footing member relative to the outer member of the footing member; and at least one inner anchor associated with the inner member of the footing member for securing the inner layer of the footing member relative to the inner member of the footing member and substantially parallel to the outer layer of the footing member.

17. The system frame member according to claim 16, wherein one or more coupling formations are provided at a longitudinal end of the footing member to facilitate its removable interconnection with the longitudinal end of the frame member.

18. The frame member according to claim 10, wherein the apertures align with openings in the tie members, said one end of the connectors extending through the apertures to engage the openings.

19. The frame member according to claim 10, wherein the outer member, the inner member and the plurality of tie members are removably connected to one another.

20. The frame member according to claim 10, wherein the inner member comprises:
- a web having a length extending parallel to the longitudinal axis and a width extending in the transverse direction, the web extending away from the tie members, and the length of the web extending between opposite longitudinal ends of the inner member, the web having openings therein; and
- a flange extending between the opposite longitudinal ends of the inner member, the flange being perpendicular to web,
- wherein, in cross section taken perpendicular to the longitudinal axis, the web and the flange define a T shape, and the frame member comprising retaining elements removably engageable with the openings of the web to secure a panel between the retaining elements and the flange of the inner member.

* * * * *

UNITED STATES PATENT AND TRADEMARK OFFICE
CERTIFICATE OF CORRECTION

PATENT NO. : 10,378,204 B2
APPLICATION NO. : 15/561951
DATED : August 13, 2019
INVENTOR(S) : Sanjiv Gosain Page 1 of 1

It is certified that error appears in the above-identified patent and that said Letters Patent is hereby corrected as shown below:

In the Specification

In Column 2, Line 31: "hush" should be --bush--;

In Column 15, Line 49: "car" should be --ear--;

In Column 17, Line 21: "lie" should be --tie--;

In Column 18, Line 9: "3368" should be --33b8--.

Signed and Sealed this
Twenty-fourth Day of December, 2019

Andrei Iancu
*Director of the United States Patent and Trademark Office*